US011708151B2

(12) United States Patent
Alley et al.

(10) Patent No.: US 11,708,151 B2
(45) Date of Patent: *Jul. 25, 2023

(54) LANDING GEAR SHRINK LINK MECHANISM

(71) Applicant: The Boeing Company, Chicago, IL (US)

(72) Inventors: Christopher M. Alley, Seattle, WA (US); Leanne M. Campbell, Snohomish, WA (US); Gabriela K. Defrancisci, Edmonds, WA (US); Gregory J. Vering, Seattle, WA (US); Aaron P. Knock, Seattle, WA (US); Mitchell Mellor, Bothell, WA (US); Justin D. Cottet, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 235 days.

This patent is subject to a terminal disclaimer.

(21) Appl. No.: 17/188,198

(22) Filed: Mar. 1, 2021

(65) Prior Publication Data

US 2021/0276697 A1    Sep. 9, 2021

Related U.S. Application Data

(63) Continuation of application No. 16/049,090, filed on Jul. 30, 2018, now Pat. No. 10,981,646.

(51) Int. Cl.
*B64C 25/20* (2006.01)
*B64C 25/12* (2006.01)
(Continued)

(52) U.S. Cl.
CPC ............. *B64C 25/20* (2013.01); *B64C 25/12* (2013.01); *B64C 25/60* (2013.01); *B64C 2025/008* (2013.01)

(58) Field of Classification Search
CPC ......... B64C 25/18; B64C 25/20; B64C 25/22; B64C 25/60; B64C 2025/008
See application file for complete search history.

(56) References Cited

U.S. PATENT DOCUMENTS

| 2,256,540 A | 9/1941 | Armstrong |
| 2,420,066 A | 5/1947 | Hugh |
| (Continued) | | |

FOREIGN PATENT DOCUMENTS

| EP | 0246949 | 5/1987 |
| EP | 2138398 | 12/2009 |
| (Continued) | | |

OTHER PUBLICATIONS

European Search Report, European Application No. 18173205.8, dated Mar. 18, 2021.

(Continued)

*Primary Examiner* — Joseph W Sanderson
(74) *Attorney, Agent, or Firm* — Perman & Green, LLP

(57) ABSTRACT

A shrink mechanism for use with a landing gear of an aircraft. The landing gear includes an outer cylinder rotatably coupled to a frame of an aircraft about a trunnion axis of rotation and a shock strut assembly movably coupled to the outer cylinder so as to reciprocate along a longitudinal axis of the outer cylinder. The shrink mechanism incudes a first shrink link member pivotally coupled to the outer cylinder, a second shrink link member coupling the first shrink link member to the shock strut assembly, a crank member pivotally coupled to the outer cylinder, a drive member coupling the crank member to a walking beam of a landing gear retract mechanism, and a driven member coupling the crank member to the first shrink link member.

20 Claims, 38 Drawing Sheets

(51) Int. Cl.
*B64C 25/60* (2006.01)
*B64C 25/00* (2006.01)

(56) References Cited

U.S. PATENT DOCUMENTS

| | | | | |
|---|---|---|---|---|
| 2,461,595 | A * | 2/1949 | Foster | B64C 25/20 244/102 R |
| 2,467,015 | A * | 4/1949 | Dreifke | B64C 25/20 244/102 R |
| 2,478,729 | A * | 8/1949 | Westcott, Jr. | B64C 25/20 244/102 SS |
| 2,754,072 | A | 7/1956 | Shapiro | |
| 2,868,482 | A * | 1/1959 | Westcott, Jr. | B64C 25/10 244/102 R |
| 2,933,271 | A | 4/1960 | Maltby | |
| 2,967,682 | A | 1/1961 | Fullam et al. | |
| 3,514,057 | A * | 5/1970 | Biggs | B64C 25/20 244/102 R |
| 3,533,580 | A * | 10/1970 | Lucien | B64C 25/20 244/102 R |
| 3,870,254 | A * | 3/1975 | Watts | B64C 25/26 244/102 SL |
| 4,540,142 | A | 9/1985 | Veaux et al. | |
| 4,586,682 | A * | 5/1986 | Veaux | B64C 25/20 244/102 R |
| 4,749,152 | A | 6/1988 | Veaux et al. | |
| 4,907,760 | A * | 3/1990 | Sealey | B64C 25/60 244/102 R |
| 5,100,083 | A | 3/1992 | Large et al. | |
| 5,299,761 | A | 4/1994 | Robin et al. | |
| 5,429,323 | A | 7/1995 | Derrien et al. | |
| 5,460,340 | A | 10/1995 | White | |
| 5,482,228 | A | 1/1996 | Hoshino | |
| 6,182,925 | B1 | 2/2001 | Kilner et al. | |
| 8,376,272 | B2 | 2/2013 | Bennett et al. | |
| 8,448,900 | B2 | 5/2013 | Mellor et al. | |
| 8,991,753 | B2 | 3/2015 | Mellor et al. | |
| 8,998,133 | B2 | 4/2015 | Cottet | |
| 9,481,452 | B2 | 11/2016 | Lindahl et al. | |
| 9,499,280 | B2 | 11/2016 | Mellor | |
| 9,868,518 | B2 * | 1/2018 | Elliott | B64C 25/34 |
| 10,384,767 | B2 | 8/2019 | Cottet et al. | |
| 10,442,527 | B2 * | 10/2019 | Bennett | B64C 25/10 |
| 10,486,798 | B2 * | 11/2019 | Cottet | B64C 25/34 |
| 10,569,862 | B2 * | 2/2020 | Bennett | B64C 25/60 |
| 10,766,608 | B2 | 9/2020 | Mellor et al. | |
| 10,800,516 | B2 | 10/2020 | Dahl et al. | |
| 10,981,646 | B2 * | 4/2021 | Alley | B64C 25/34 |
| 11,407,500 | B2 * | 8/2022 | Schmidt | B64C 25/20 |
| 2009/0050736 | A1 | 2/2009 | Bennett et al. | |
| 2009/0321560 | A1 | 12/2009 | Luce | |
| 2010/0116930 | A1 | 5/2010 | Griffin | |
| 2010/0181423 | A1 | 7/2010 | Martin et al. | |
| 2010/0219290 | A1 | 9/2010 | Luce | |
| 2010/0288878 | A1 | 11/2010 | Bennett | |
| 2011/0233327 | A1 | 9/2011 | Mellor et al. | |
| 2013/0341457 | A1 | 12/2013 | Wilson | |
| 2016/0052623 | A1 * | 2/2016 | Elliott | B64C 25/18 244/102 R |
| 2017/0253323 | A1 | 9/2017 | Green et al. | |
| 2018/0001998 | A1 | 1/2018 | Bennett | |
| 2018/0162522 | A1 | 6/2018 | Luce | |
| 2018/0208298 | A1 | 7/2018 | Cottett et al. | |
| 2018/0244371 | A1 * | 8/2018 | Simpson | B64C 25/10 |
| 2018/0244372 | A1 * | 8/2018 | Simpson | B64C 25/26 |
| 2018/0244373 | A1 * | 8/2018 | Mellor | B64C 25/20 |
| 2018/0297694 | A1 * | 10/2018 | Cottet | B64C 25/60 |
| 2018/0346102 | A1 * | 12/2018 | Dahl | B64C 25/14 |
| 2019/0039723 | A1 | 2/2019 | Dubrovsky et al. | |
| 2019/0185147 | A1 | 6/2019 | Luce | |

FOREIGN PATENT DOCUMENTS

| | | |
|---|---|---|
| EP | 2489591 | 8/2012 |
| EP | 3213992 | 9/2017 |
| EP | 3335988 | 6/2018 |
| EP | 3437990 | 2/2019 |
| GB | 484938 | 5/1938 |
| GB | 610698 | 10/1948 |
| GB | 670889 | 4/1952 |
| GB | 1216732 | 12/1970 |
| GB | 2137147 | 10/1984 |
| JP | 08338045 | 12/1996 |
| JP | 2011504829 | 2/2011 |
| JP | 2012111479 | 6/2012 |
| WO | 2006094145 | 9/2006 |
| WO | 2009047367 | 4/2009 |
| WO | 2011119283 | 9/2011 |

OTHER PUBLICATIONS

Torsion Sway Bar; dated Apr. 1, 2021; https://carlisuspension.com/product/dodge/dodge-ram-2500-3500/ram-components/13-18-3500-components/torsion-sway-bar/.
CE-9900XJF—XJ/MJ Antirock Front Sway Bar Kit; dated Apr. 1, 2021; https://www.rockjock4x4.com/CE-9900XJF.
European Search Report, European Application No. 18155880 dated Jul. 26, 2018.
Cottet, Justin, et al.; U.S. Appl. No. 15/415,346, filed Jan. 25, 2017.
Cottet, Justin, et al.; U.S. Appl. No. 15/445,652, filed Feb. 28, 2017.
Curry, Norman S. "Landing Gear Design Handbook" Lockheed-Georgia Company; First Edition, Jan. 1992, Revised Jul. 1984.
Cusworth, et al; U.S. Appl. No. 15/490,440, filed Apr. 18, 2017; Aircraft Landing Gear Assembly and Method of Assembling the Same.
Federal Aviation Administration, "Aviation Maintenance Technician Handbook—Airframe, Chapter 13", (2013), downloaded from faa.gov on Aug. 9, 2016.
Mellor, Mitchell, et al.; U.S. Appl. No. 15/444,986, filed Feb. 28, 2017.
Mellor, et al; U.S. Appl. No. 15/484,646, filed Apr. 11, 2017; Levered Landing Gear With Inner Shock Strut.
Simpson, Mark, et al.; U.S. Appl. No. 15/445,836, filed Feb. 28, 2017.
European Search Report, European Application No. 18173205 dated Jul. 18, 2018.
Japanese Office Action, Japanese Application No. 2018021945, dated Apr. 1, 2019.
European Search Report, European Application No. 19152374, dated May 15, 2019.
European Search Report, European Application No. 19188563, dated Dec. 16, 2019.

* cited by examiner

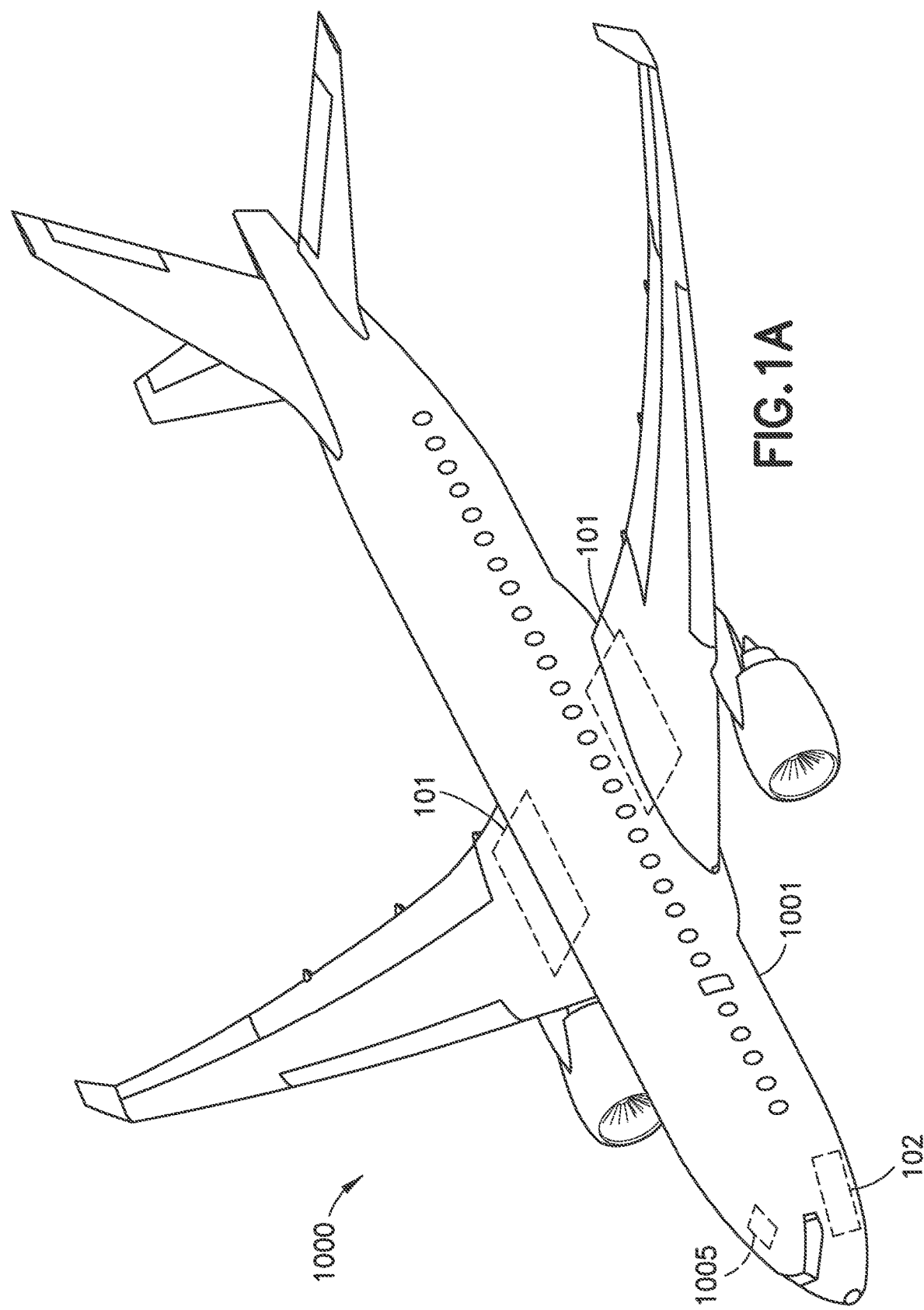

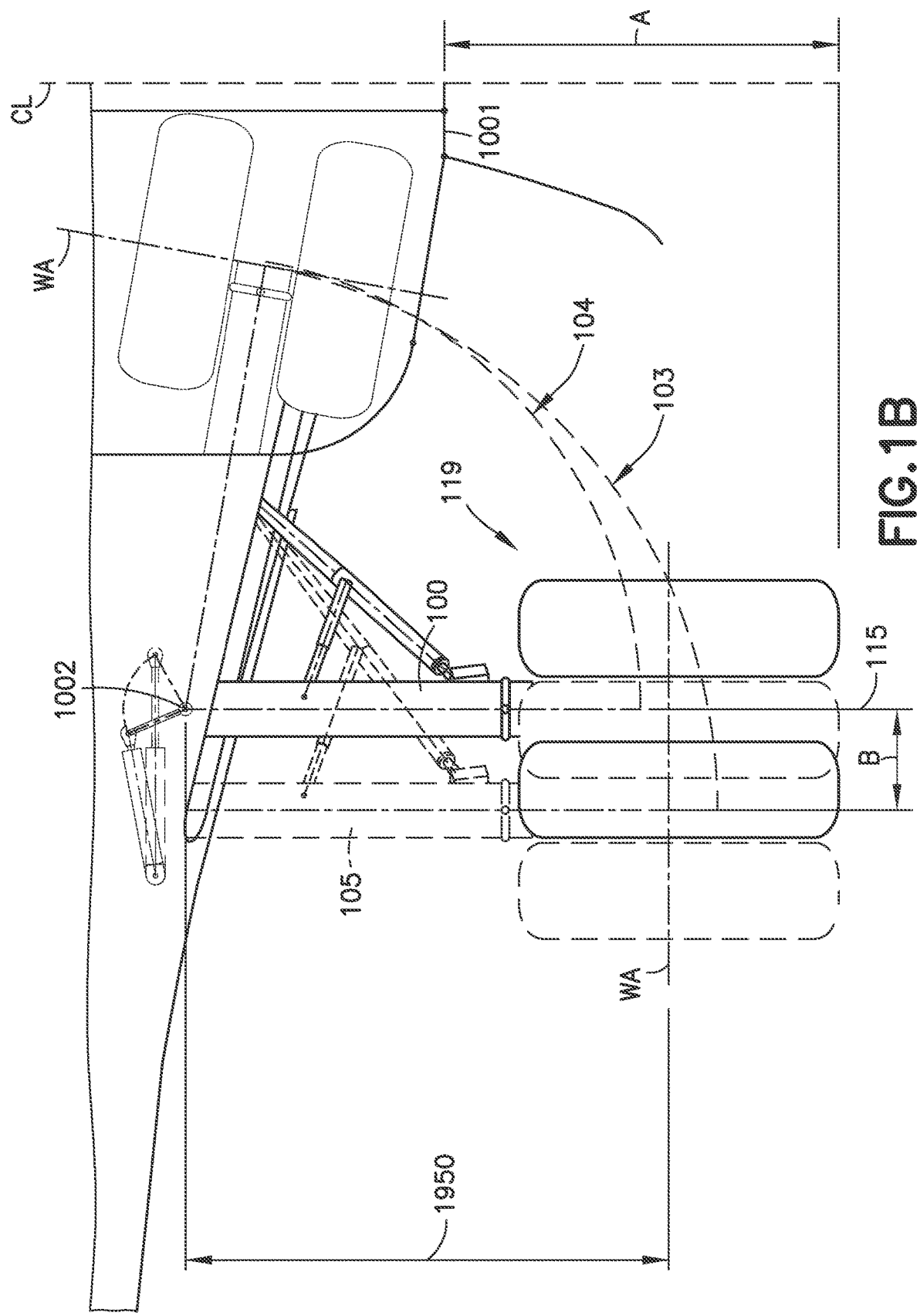

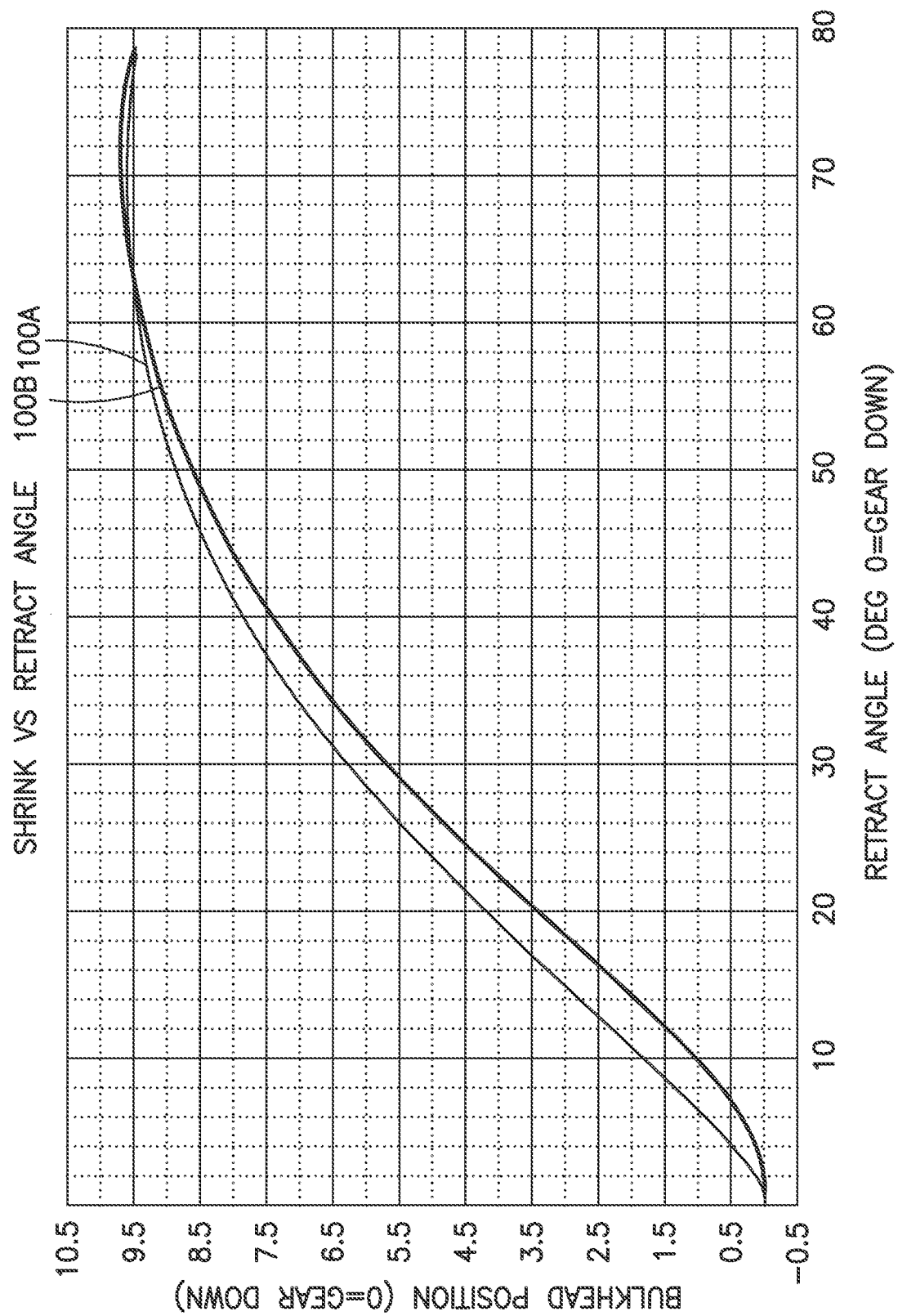

LANDING GEAR SHRINK LINK MECHANISM

CROSS-REFERENCE TO RELATED APPLICATIONS

This application is a continuation of and claims the benefit of U.S. patent application Ser. No. 16/049,090 filed on Jul. 30, 2018 (now U.S. Pat. No. 10,981,646 issued on Apr. 20, 2021), the disclosure of which is incorporated herein by reference in its entirety.

BACKGROUND

1. Field

The exemplary embodiments generally relate to aircraft landing gear components and systems and in particular to landing gear assemblies for extending and retracting landing gear.

2. Brief Description of Related Developments

Aircraft generally include landing gear to facilitate take-off, landing, and taxi. It is generally desired to have tall landing gear for various reasons. These reasons include generating a greater angle of rotation (e.g., angle of attack) of the aircraft during take-off and landing, providing more ground clearance to mount engines, increasing the ride height of the aircraft, etc. Lengthening of the landing gear can cause several issues including requiring moving the landing gear further outboard from the fuselage along the wing to compensate for the increased length of the landing gear on stowage, integrating overwing slides into the aircraft, a larger wheel well, etc. Further, increasing the length of the landing gear increases the static height of the aircraft resulting in the need for new sill waterlines, longer and higher exit slides, a landing gear actuation mechanism redesign, the need for off wing exit slides, landing gear stowage compartment redesign, etc.

Some aircraft utilize telescopic landing gear to provide increased ground clearance where a length of the telescopic landing gear can be decreased for stowage of the landing gear within the wheel well of the aircraft. The telescopic landing gear may also provide for greater angle of rotation of the aircraft at take-off and/or landing. Telescopic landing gear may be used in conventional aircraft to combat the costs of reconfiguring an aircraft's wheel well to incorporate taller landing gear. The length of the telescopic landing gear will shorten when the landing gear is retracted for stowing the landing gear (i.e., the landing gear shortens to fit the existing wheel well) and the landing gear will extend (i.e., its length will increase) when deployed for ground maneuvering (e.g., take-off, landing, taxiing, etc.) to take advantage of a taller landing gear.

SUMMARY

The following is a non-exhaustive list of examples, which may or may not be claimed, of the subject matter according to the present disclosure.

One example of the subject matter according to the present disclosure relates to a landing gear including an outer cylinder rotatably coupled to a frame of an aircraft about a trunnion axis of rotation, a shock strut assembly movably coupled to the outer cylinder so as to reciprocate along a longitudinal axis of the outer cylinder, and a shrink mechanism including a first shrink link member pivotally coupled to the outer cylinder, a second shrink link member coupling the first shrink link member to the shock strut assembly, a crank member pivotally coupled to the outer cylinder, a drive member coupling the crank member to a walking beam (a.k.a. retract actuator beam) of a landing gear retract mechanism, and a driven member coupling the crank member to the first shrink link member.

Another example of the subject matter according to the present disclosure relates to a shrink mechanism for use with a landing gear of an aircraft, the landing gear including an outer cylinder rotatably coupled to a frame of an aircraft about a trunnion axis of rotation and a shock strut assembly movably coupled to the outer cylinder so as to reciprocate along a longitudinal axis of the outer cylinder, the shrink mechanism including a first shrink link member pivotally coupled to the outer cylinder, a second shrink link member coupling the first shrink link member to the shock strut assembly, a crank member pivotally coupled to the outer cylinder, a drive member coupling the crank member to a walking beam (a.k.a. retract actuator beam) of a landing gear retract mechanism, and a driven member coupling the crank member to the first shrink link member.

Still another example of the subject matter according to the present disclosure relates to an aircraft including a frame, and a landing gear coupled to the frame, the landing gear including an outer cylinder rotatably coupled to a frame of an aircraft about a trunnion axis of rotation, a shock strut assembly movably coupled to the outer cylinder so as to reciprocate along a longitudinal axis of the outer cylinder, and a shrink mechanism including a first shrink link member pivotally coupled to the outer cylinder, a second shrink link member coupling the first shrink link member to the shock strut assembly, a crank member pivotally coupled to the outer cylinder, a drive member coupling the crank member to a walking beam (a.k.a. retract actuator beam) of a landing gear retract mechanism, and a driven member coupling the crank member to the first shrink link member.

Further still another example of the subject matter according to the present disclosure relates to a method of operating a landing gear of an aircraft, the method including rotating the landing gear about a trunnion axis of rotation, where the trunnion axis of rotation is defined by an outer cylinder of the landing gear, and moving a shock strut assembly relative to the outer cylinder with a shrink mechanism, where the outer cylinder at least partially surrounds the shock strut assembly and the shrink mechanism includes a first shrink link member pivotally coupled to the outer cylinder, a second shrink link member coupling the first shrink link member to the shock strut assembly, a crank member pivotally coupled to the outer cylinder, a drive member coupling the crank member to a walking beam (a.k.a. retract actuator beam) of a landing gear retract mechanism, and a driven member coupling the crank member to the first shrink link member.

BRIEF DESCRIPTION OF THE DRAWINGS

Figure 1C:
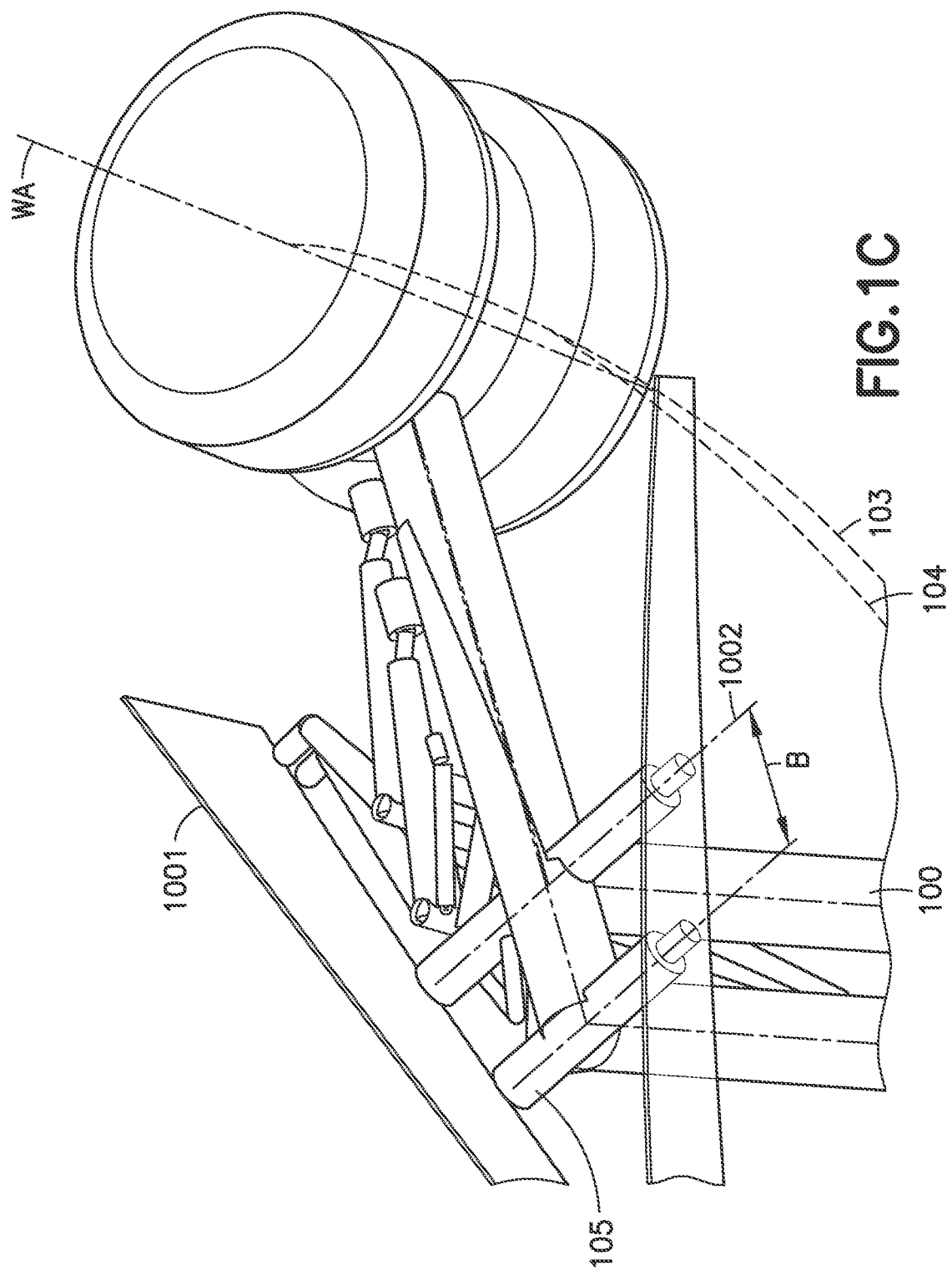
Figure 2:
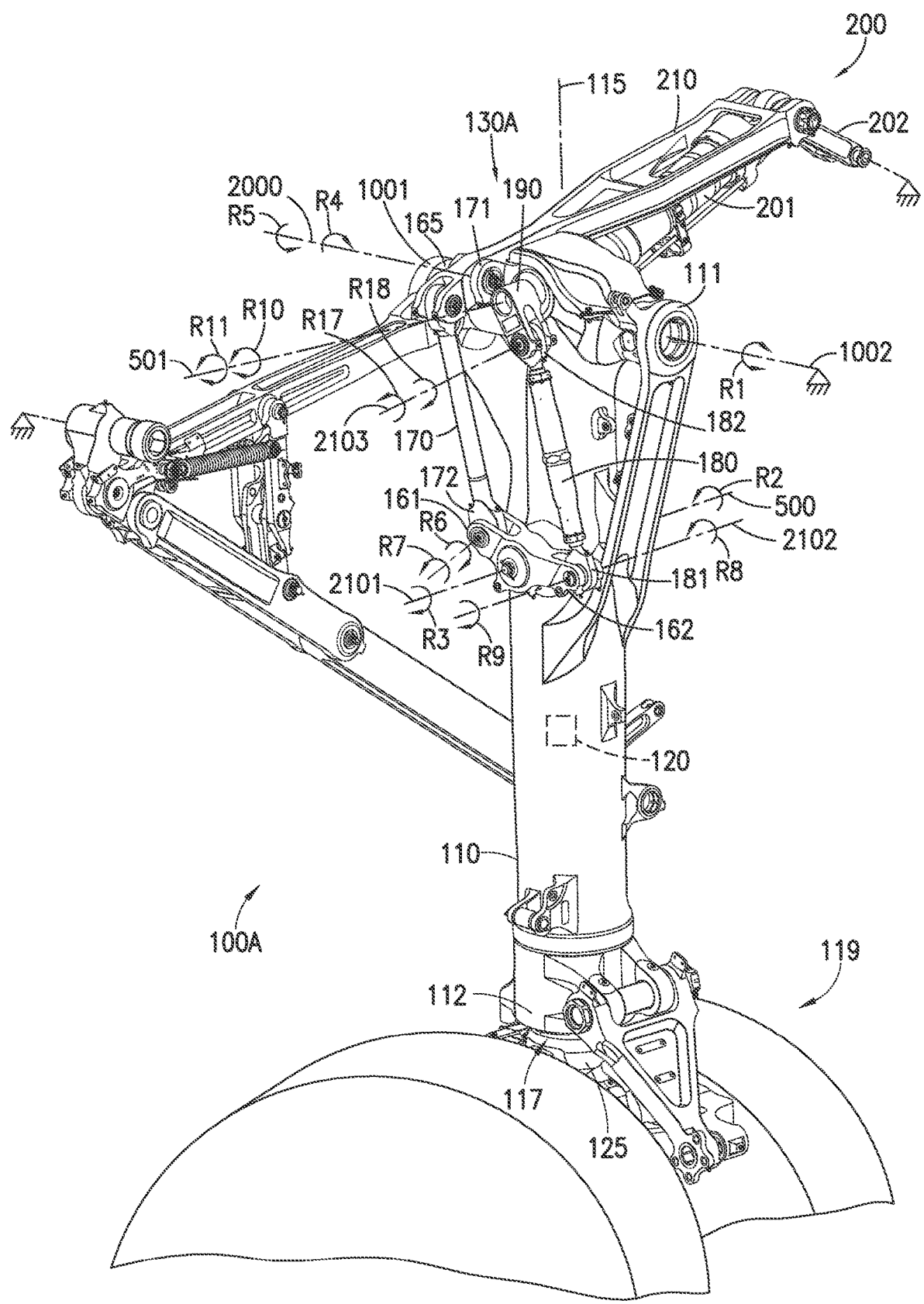
Figure 3A:
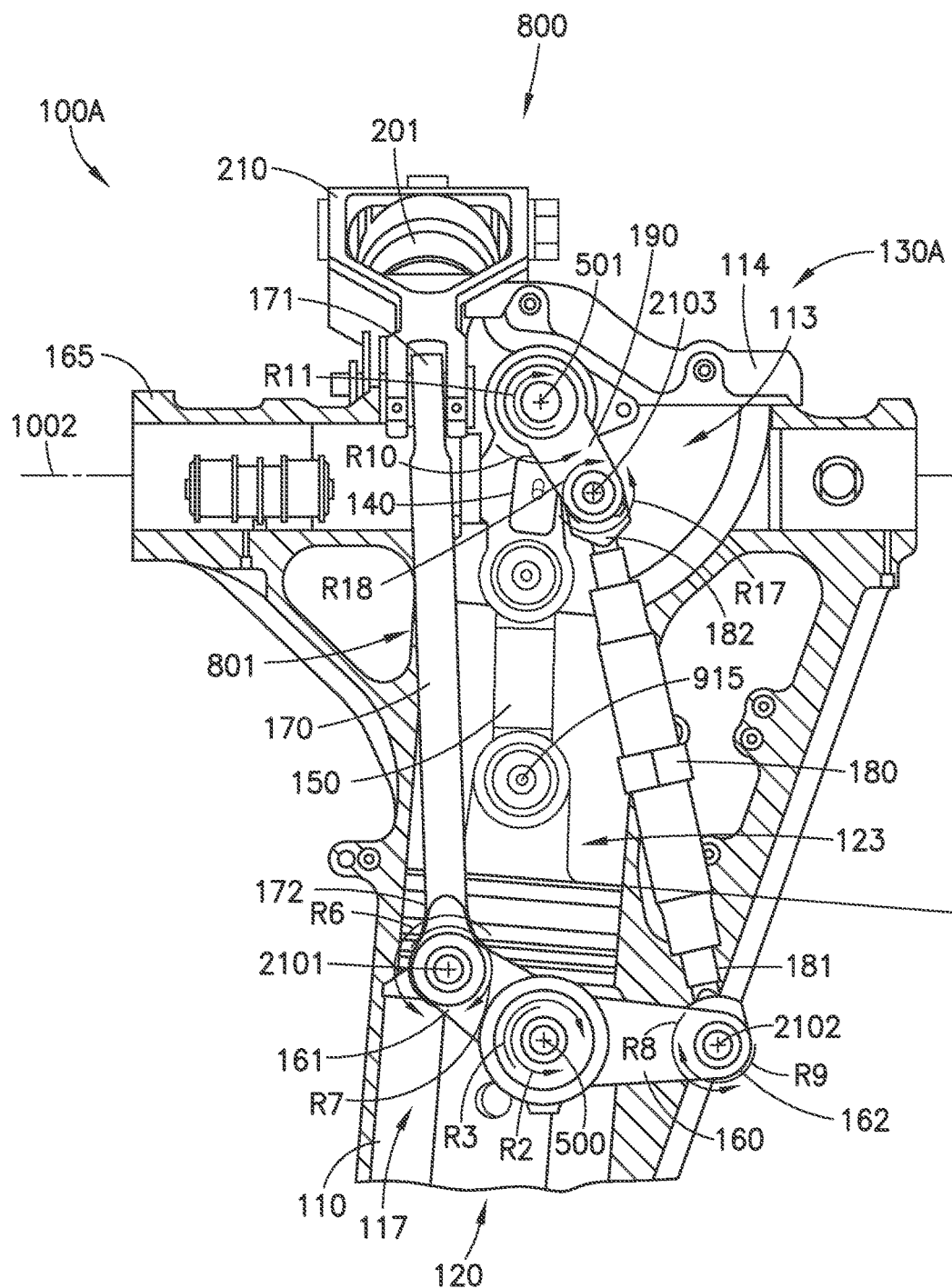
Figure 3B:
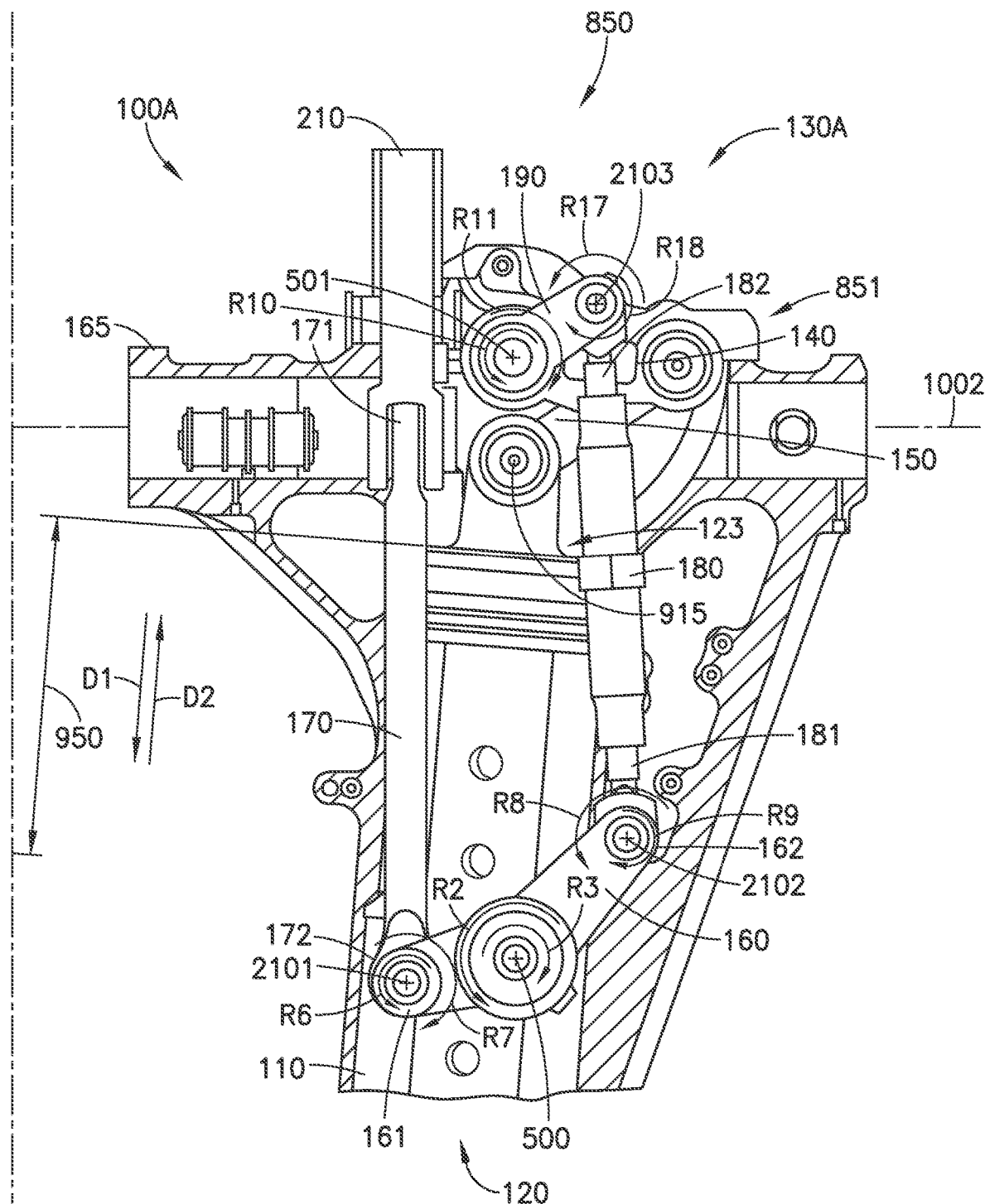
Figure 4:
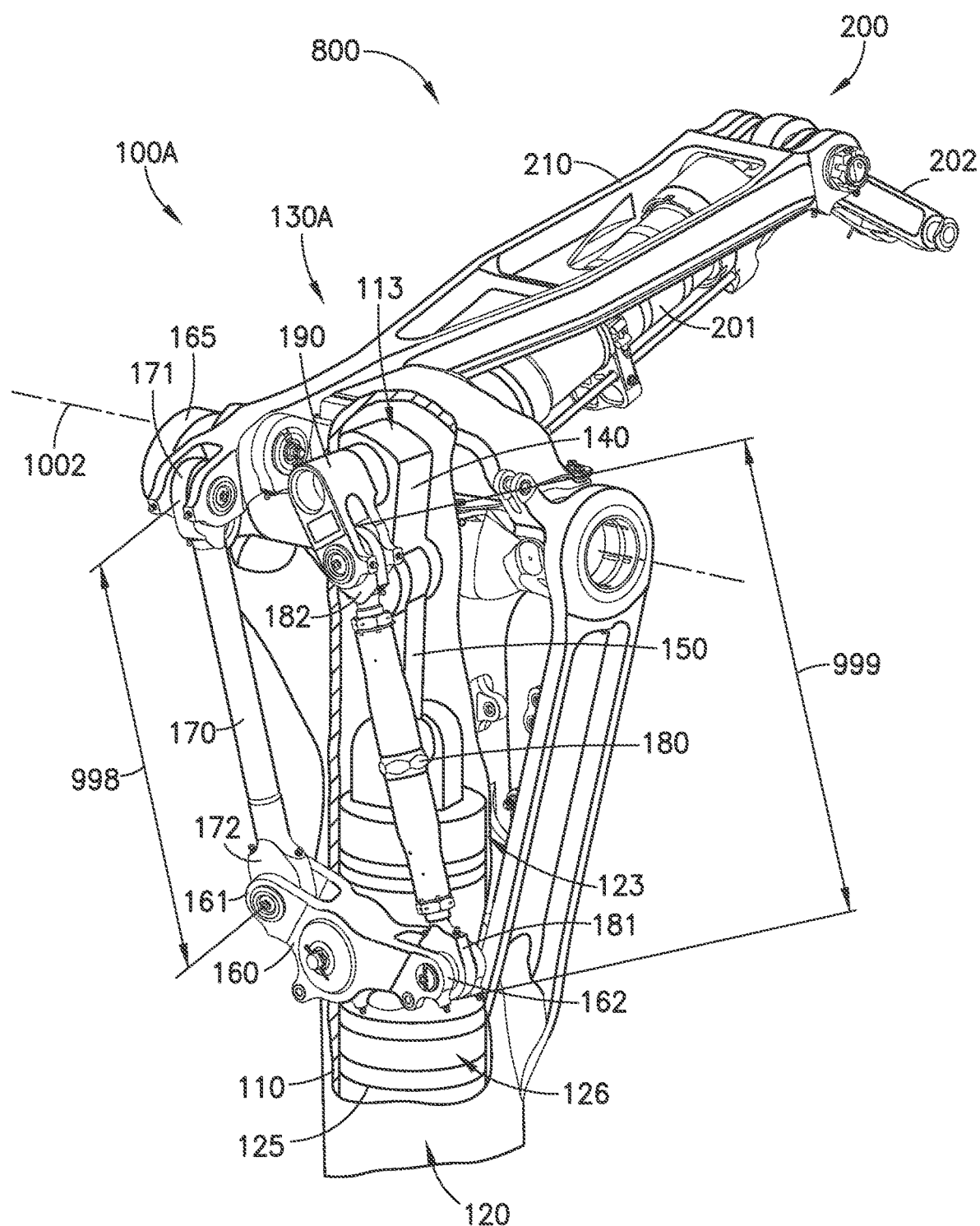
Figure 5:
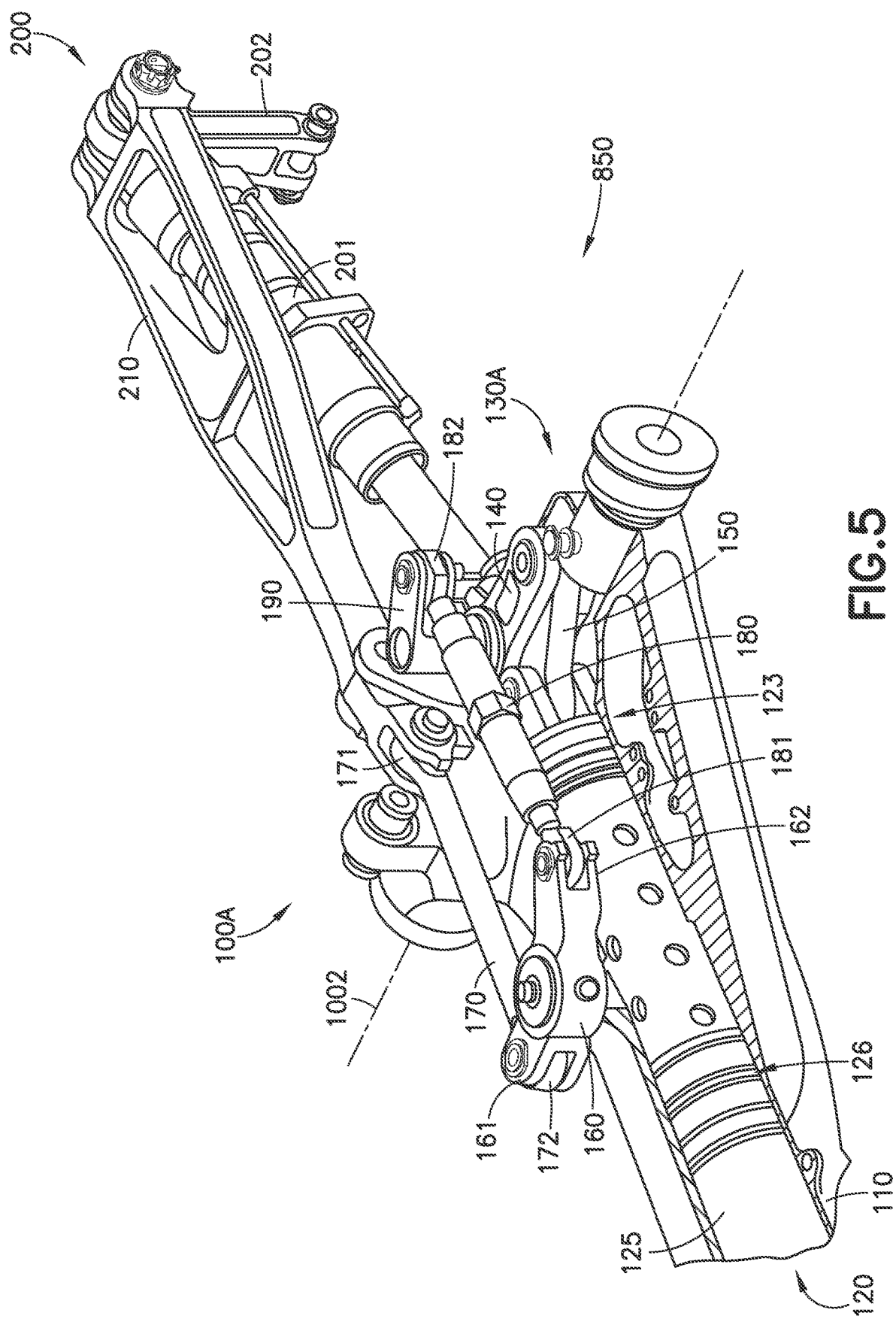
Figure 6:
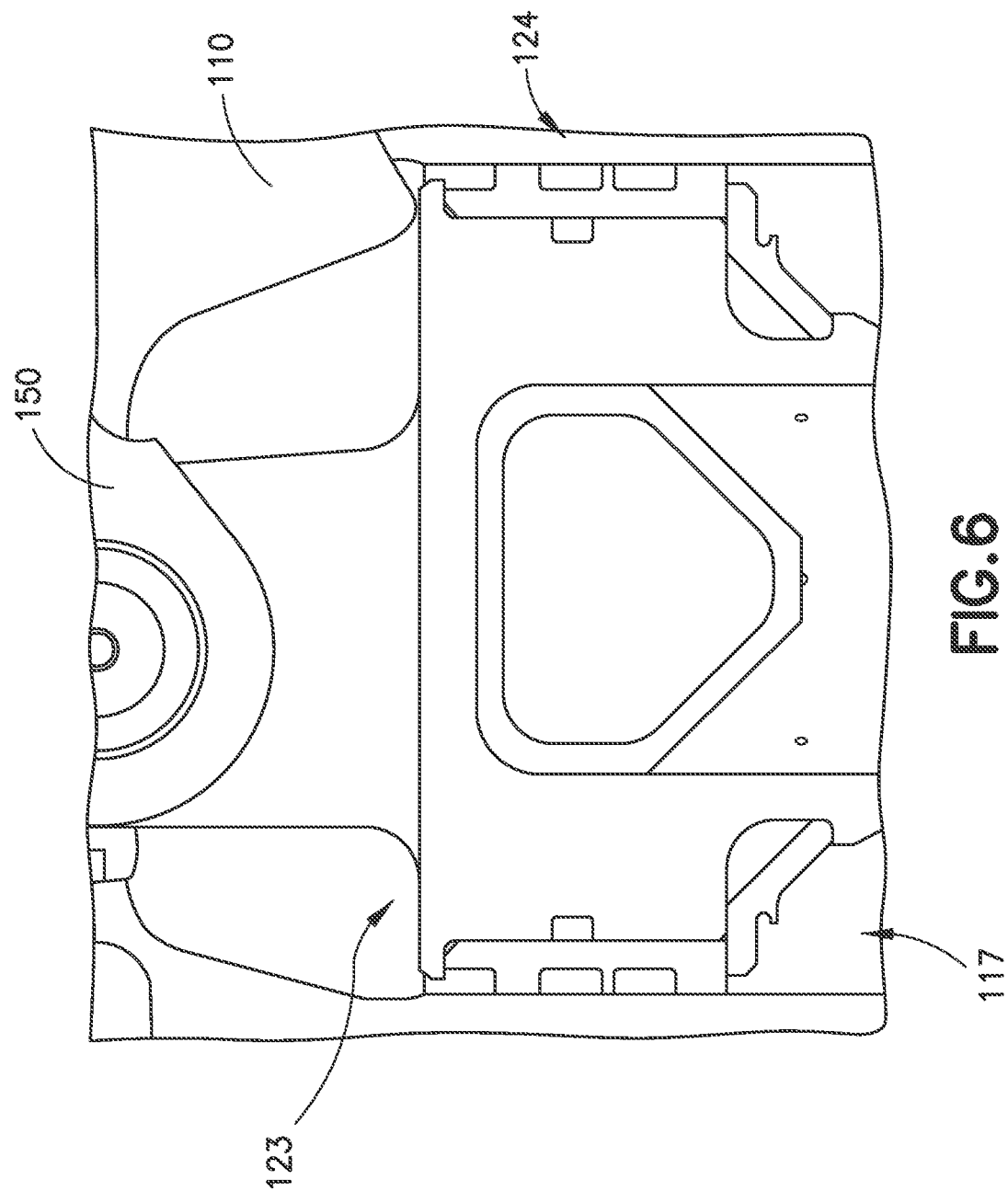
Figure 7:
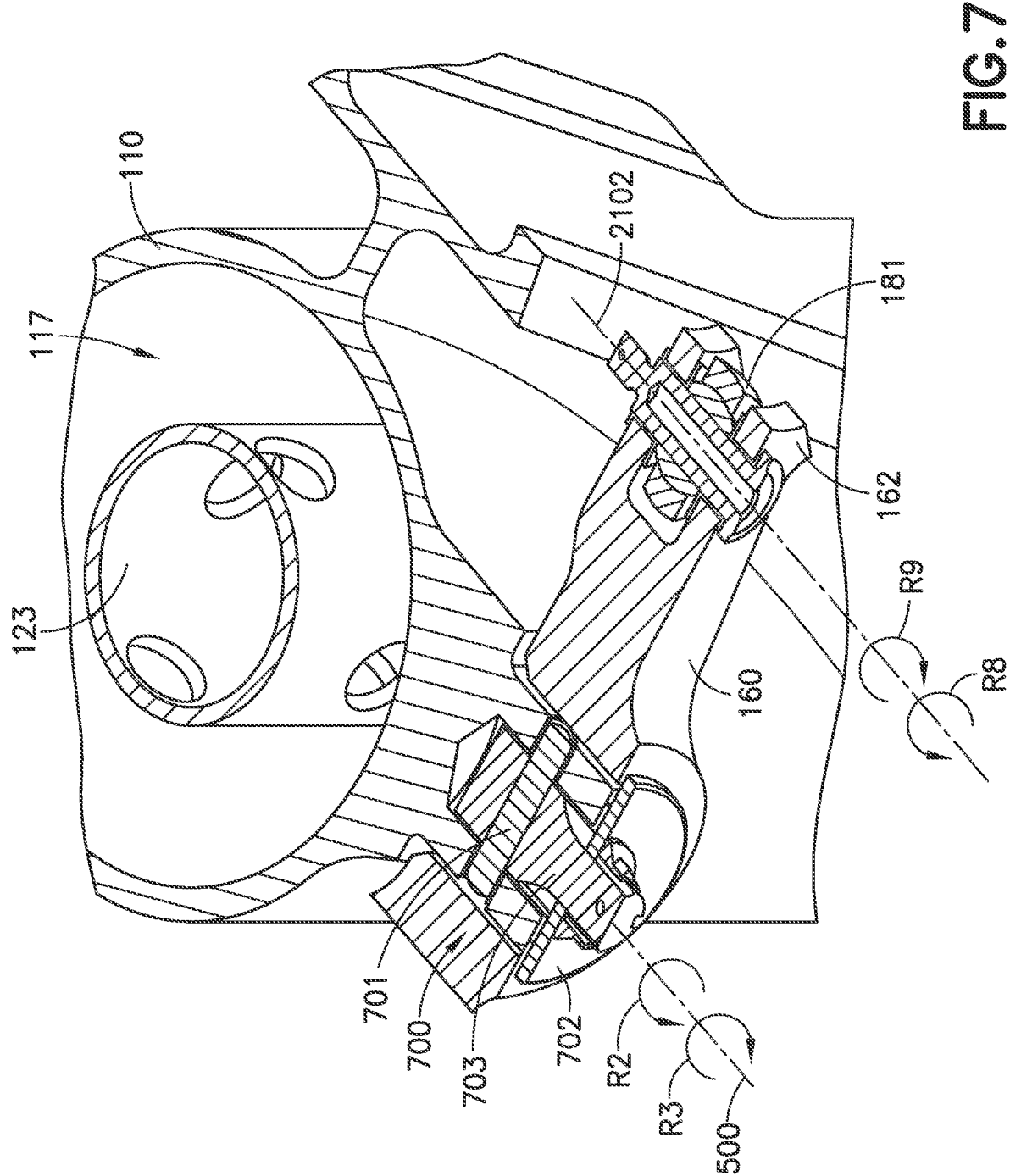
Figure 8:
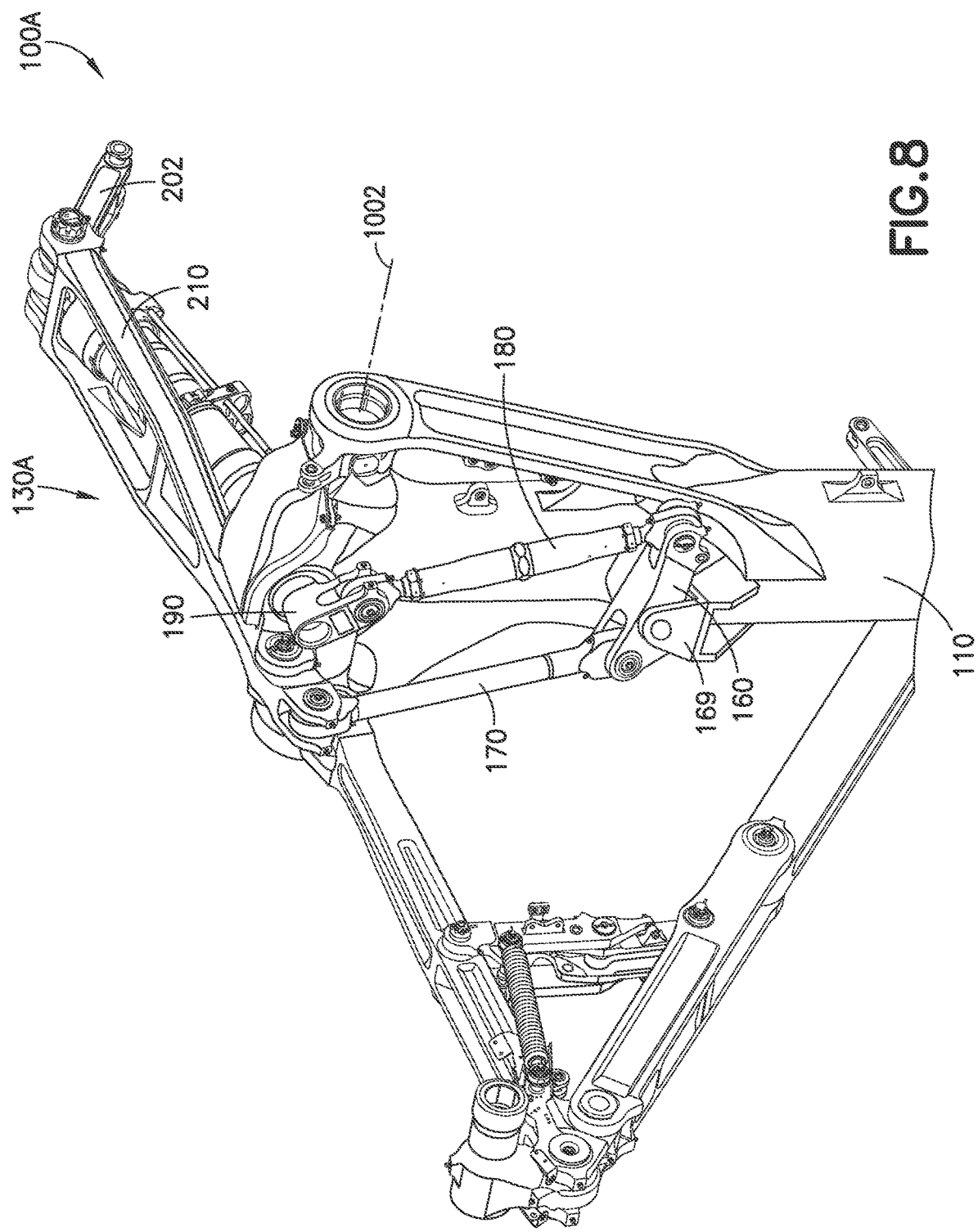
Figure 9:
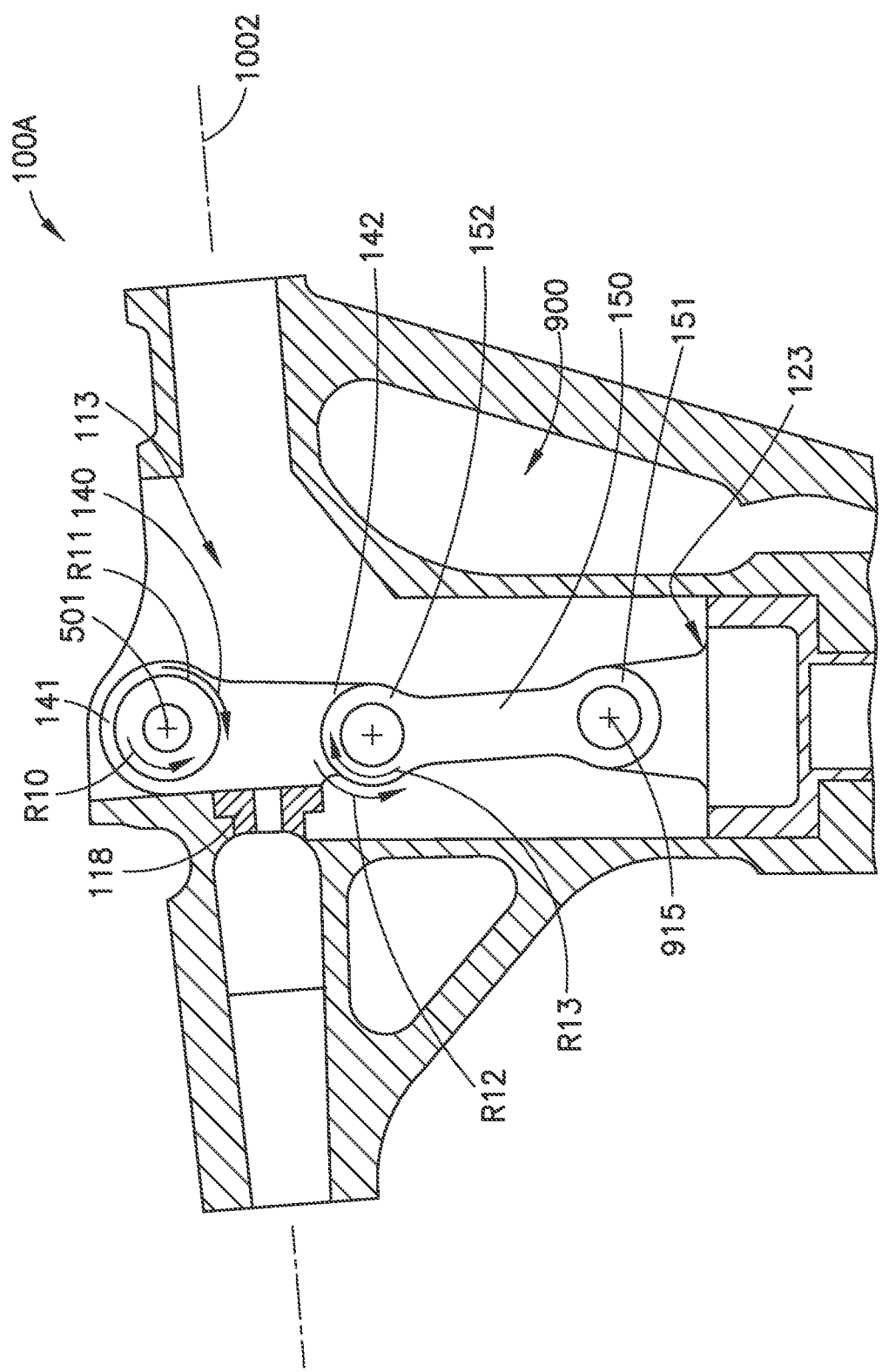
Figure 10:
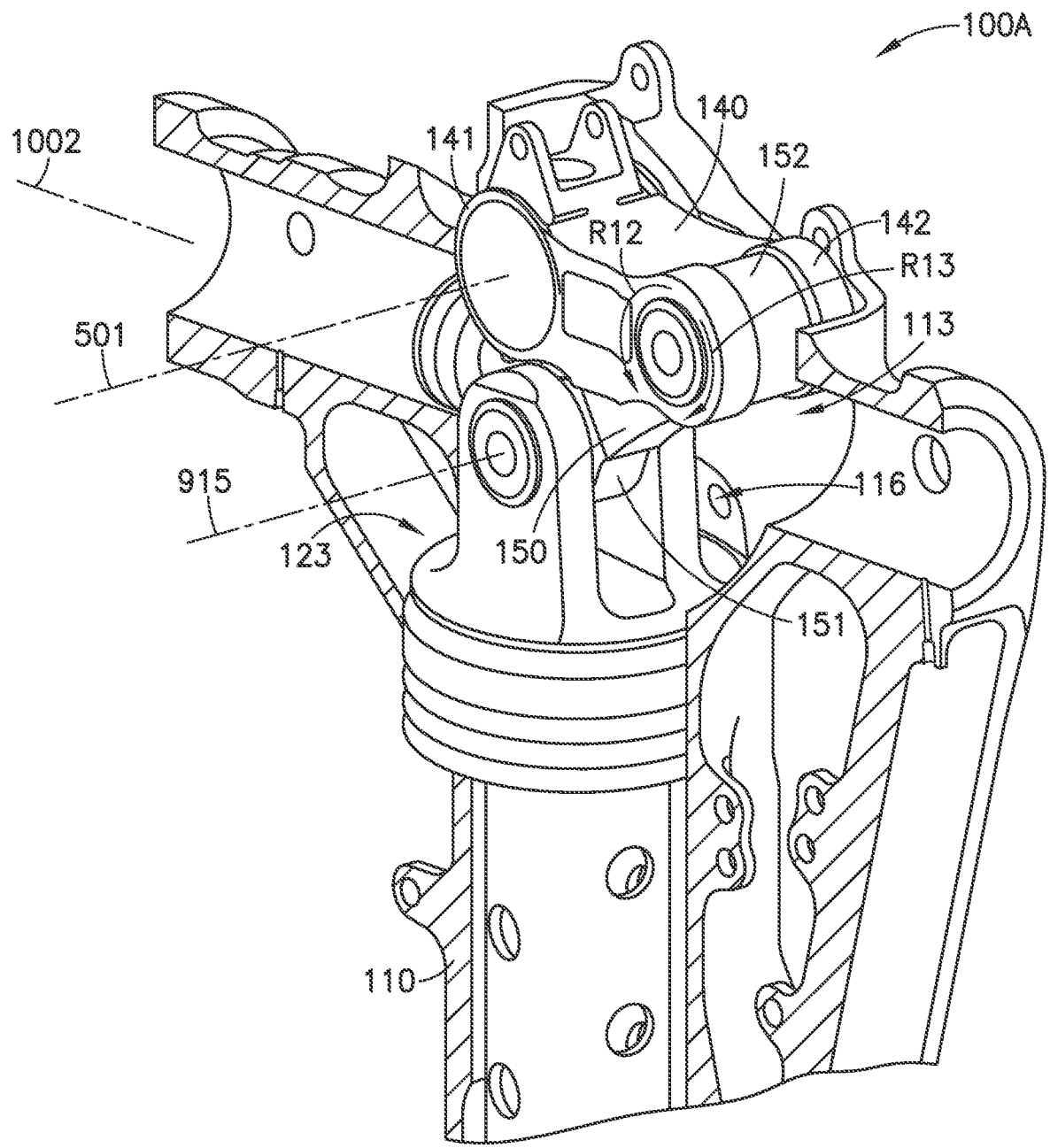
Figure 11:
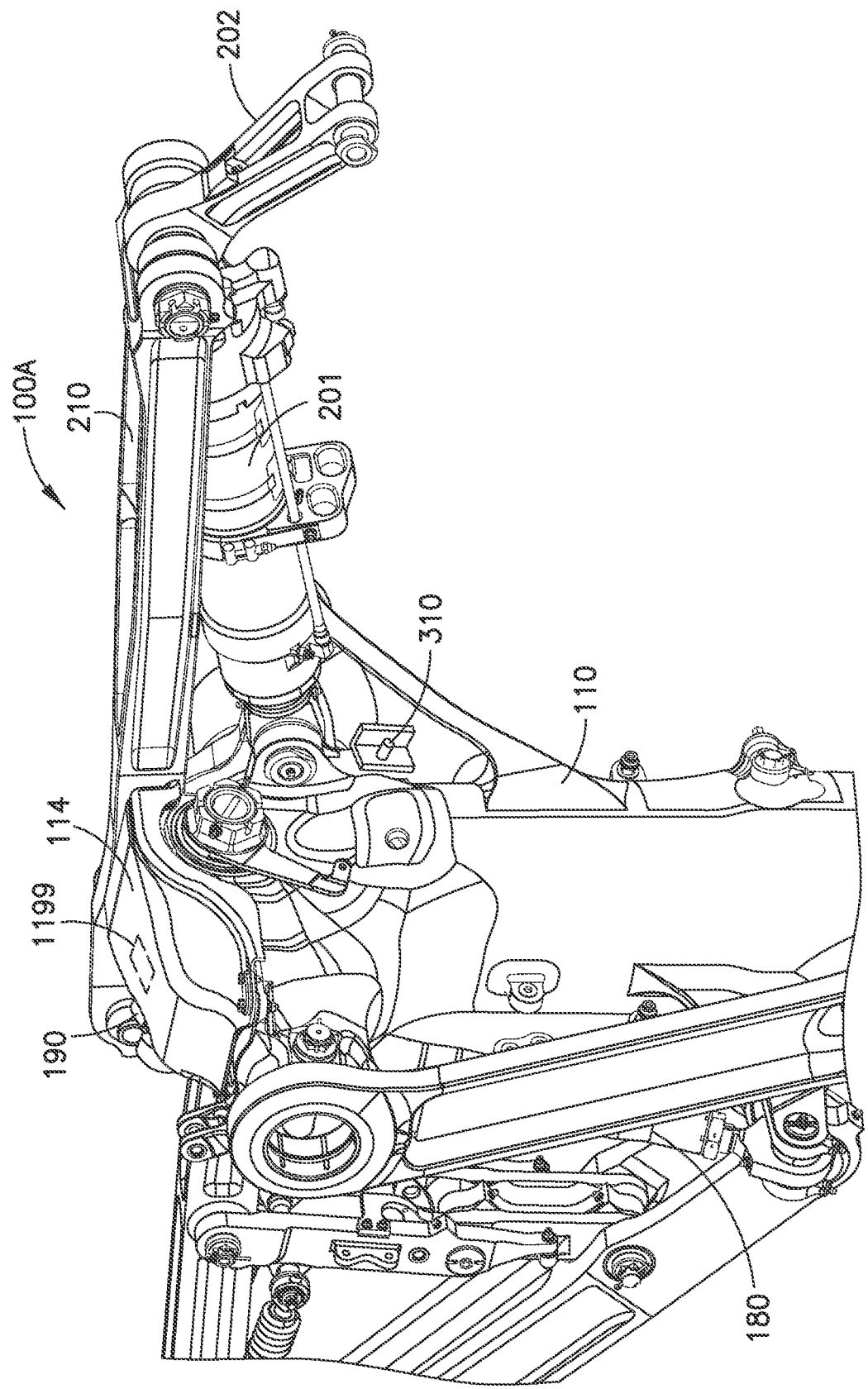
Figure 12:
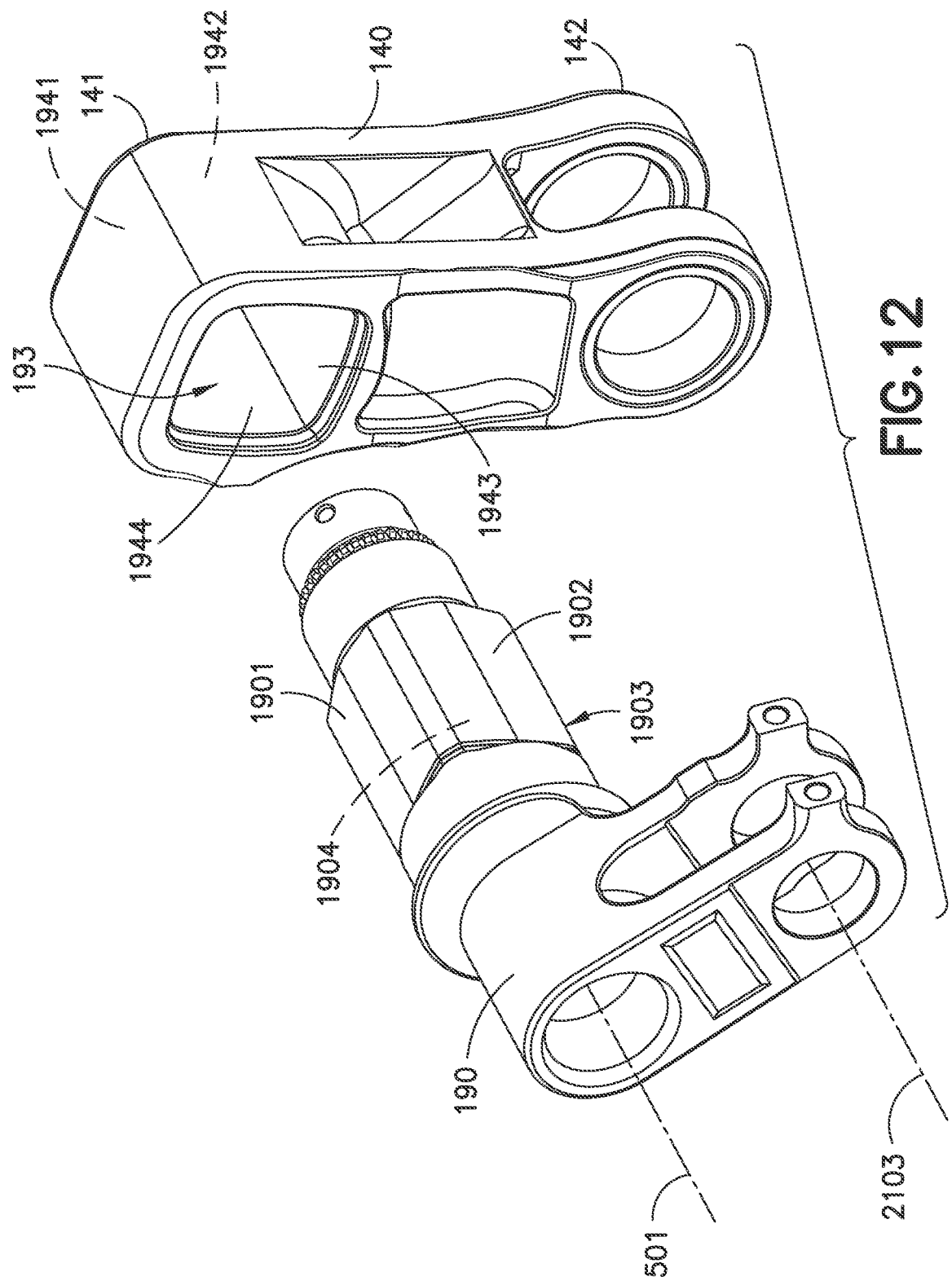
Figure 13:
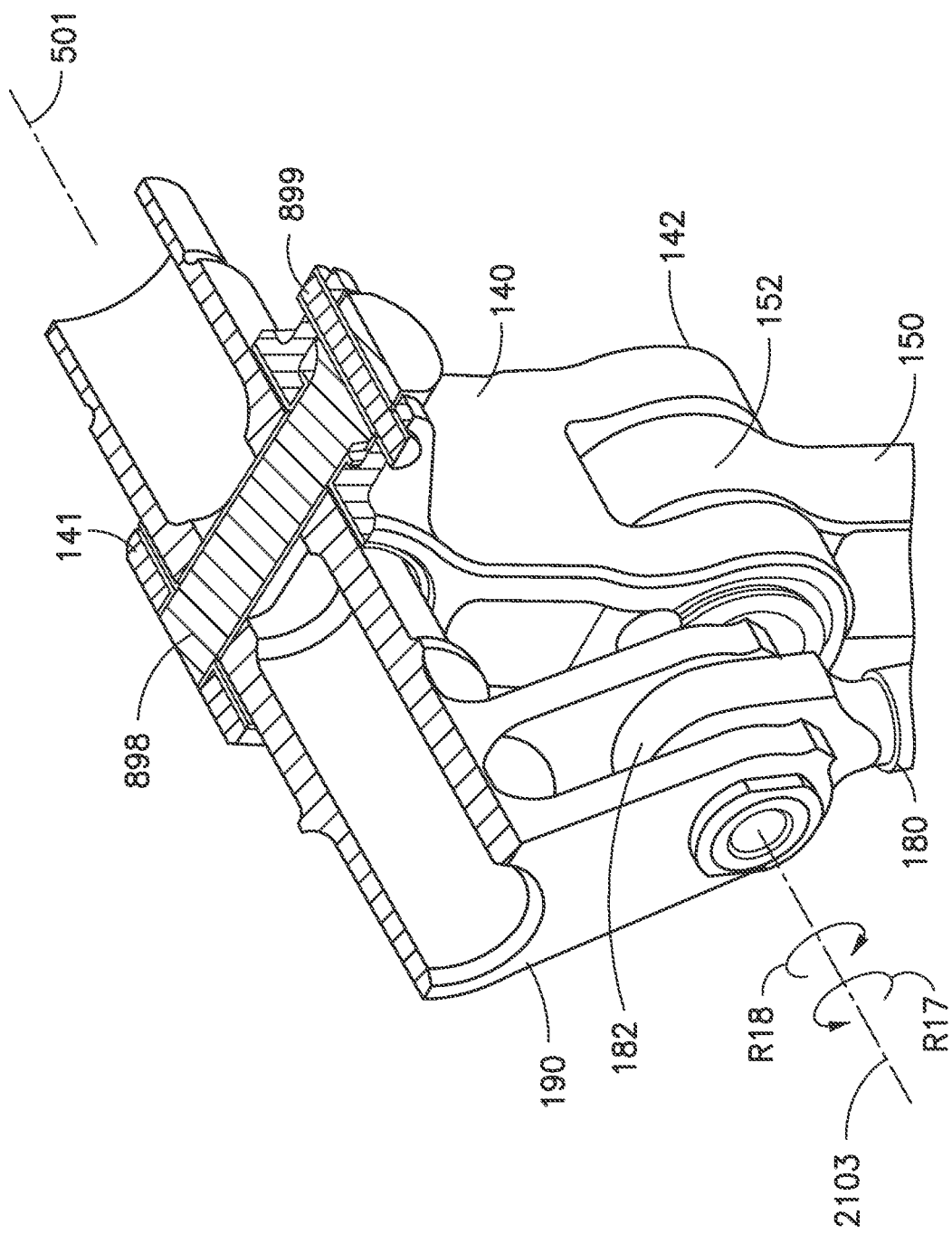
Figure 14:
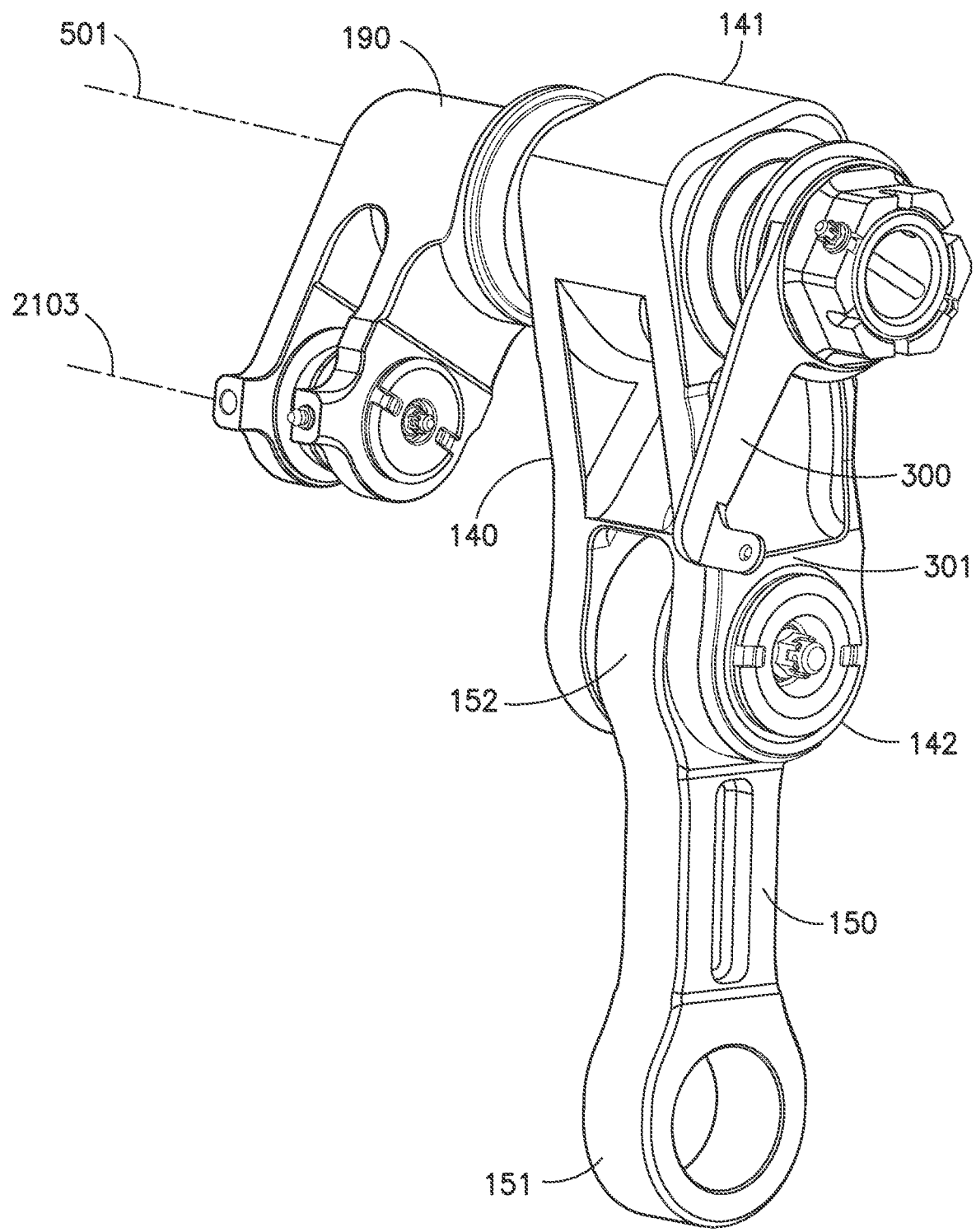
Figure 15:
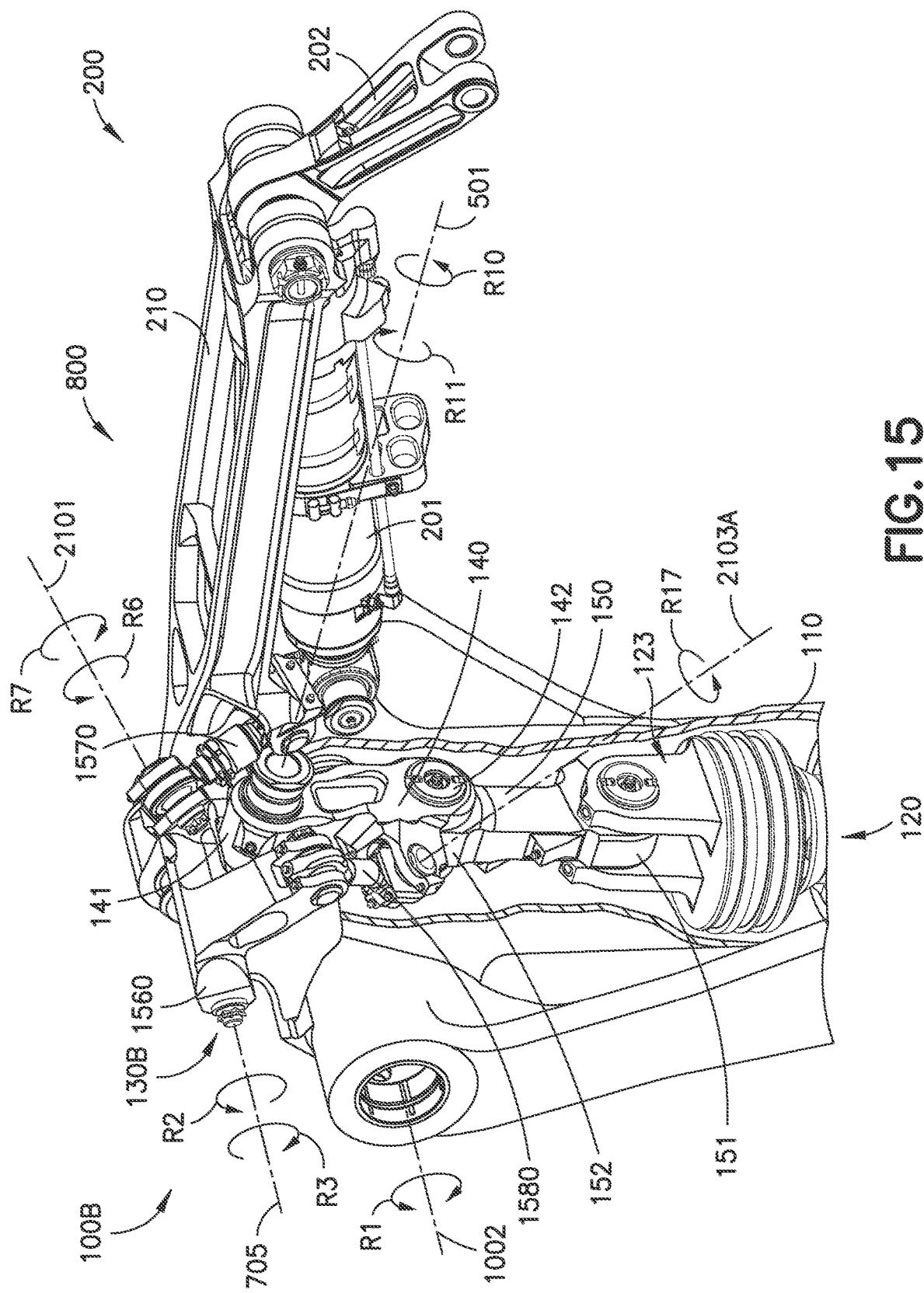
Figure 16:
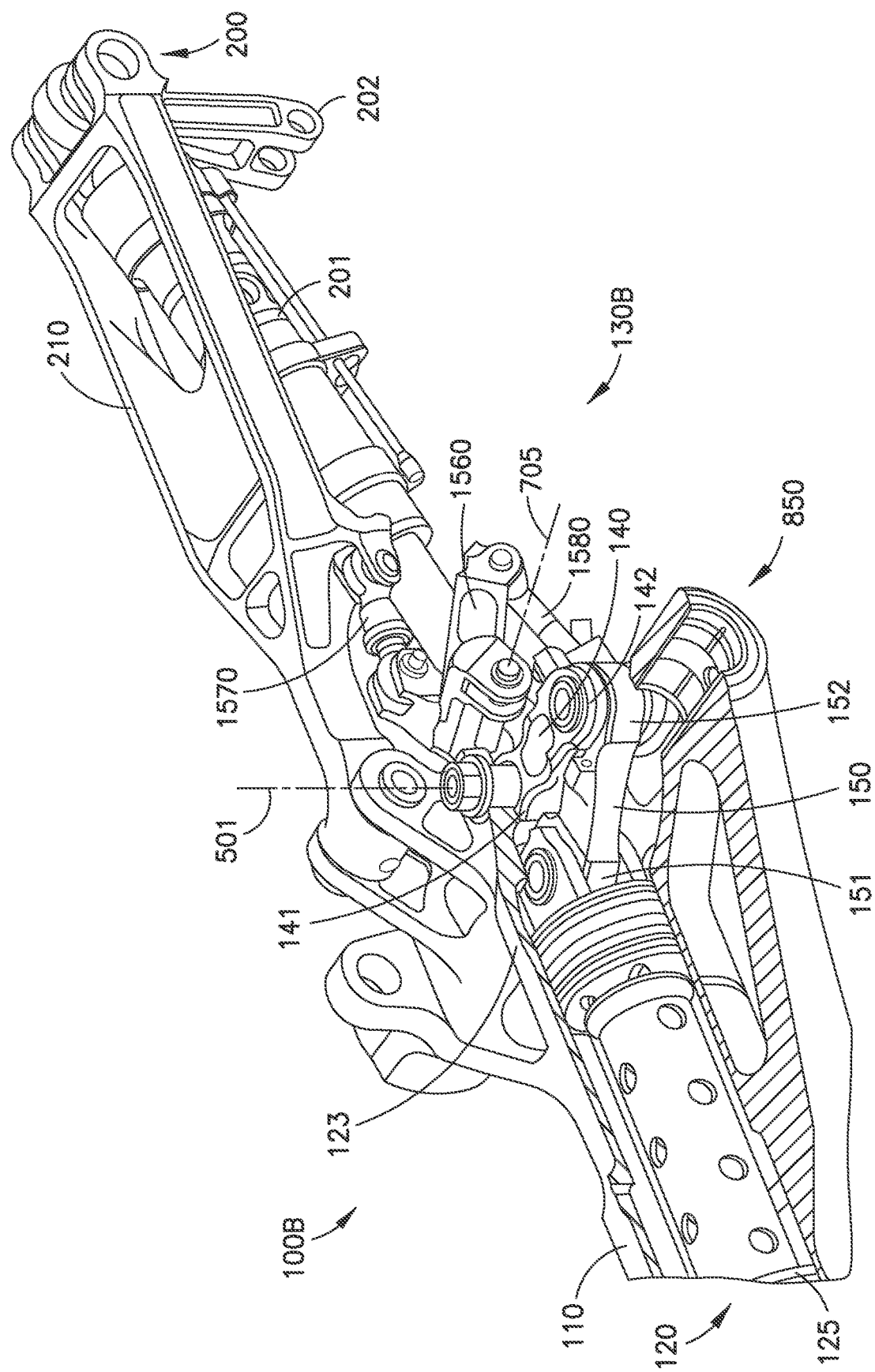
Figure 17A:
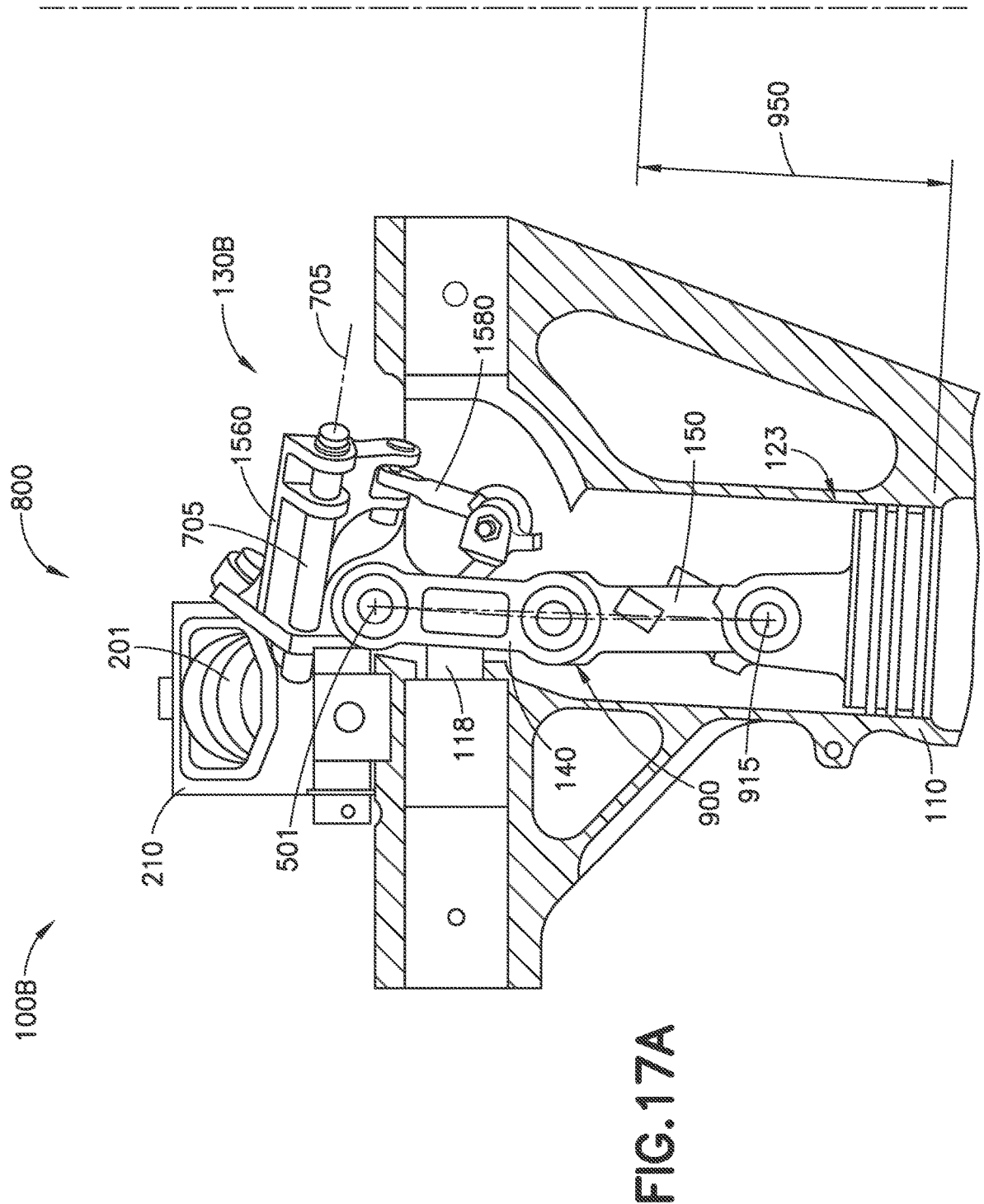
Figure 17B:
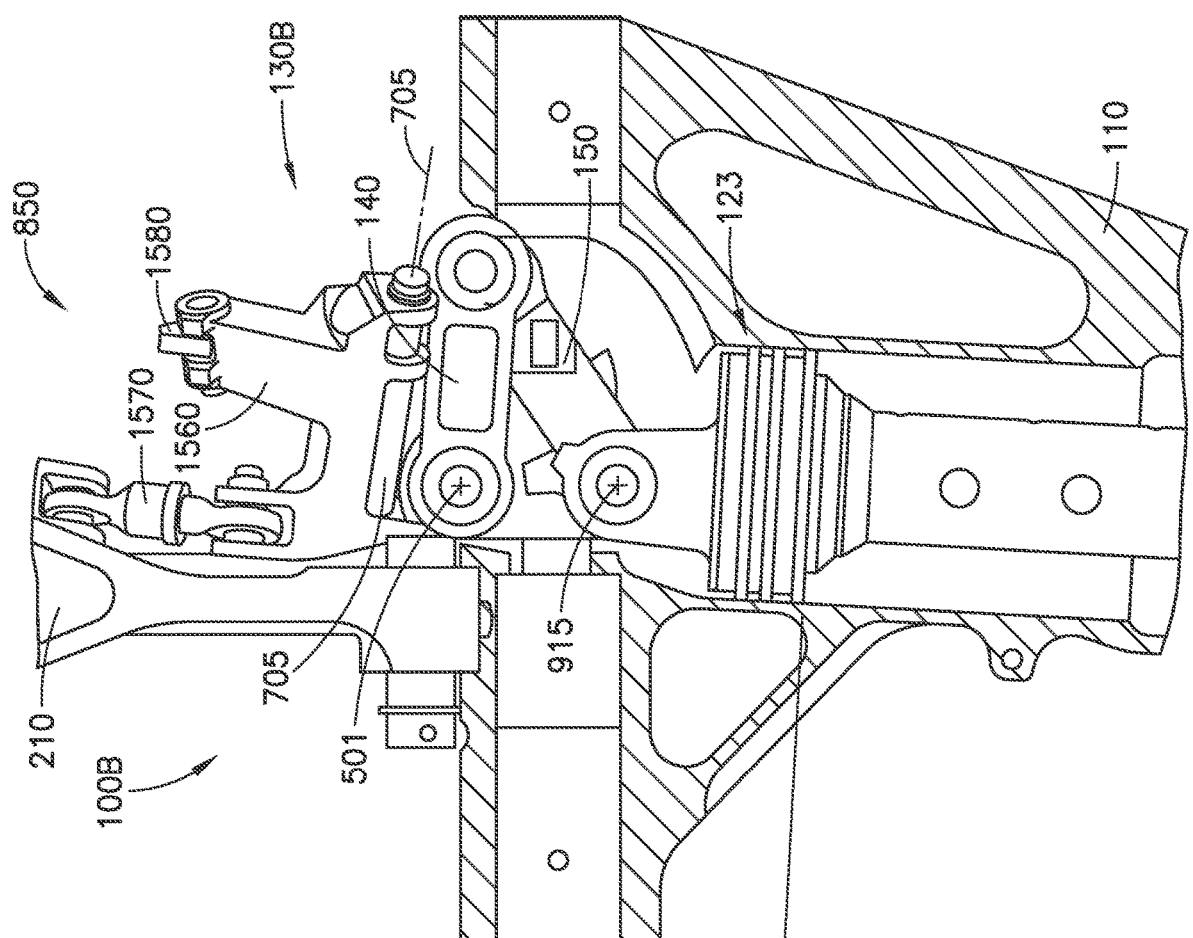
Figure 18:
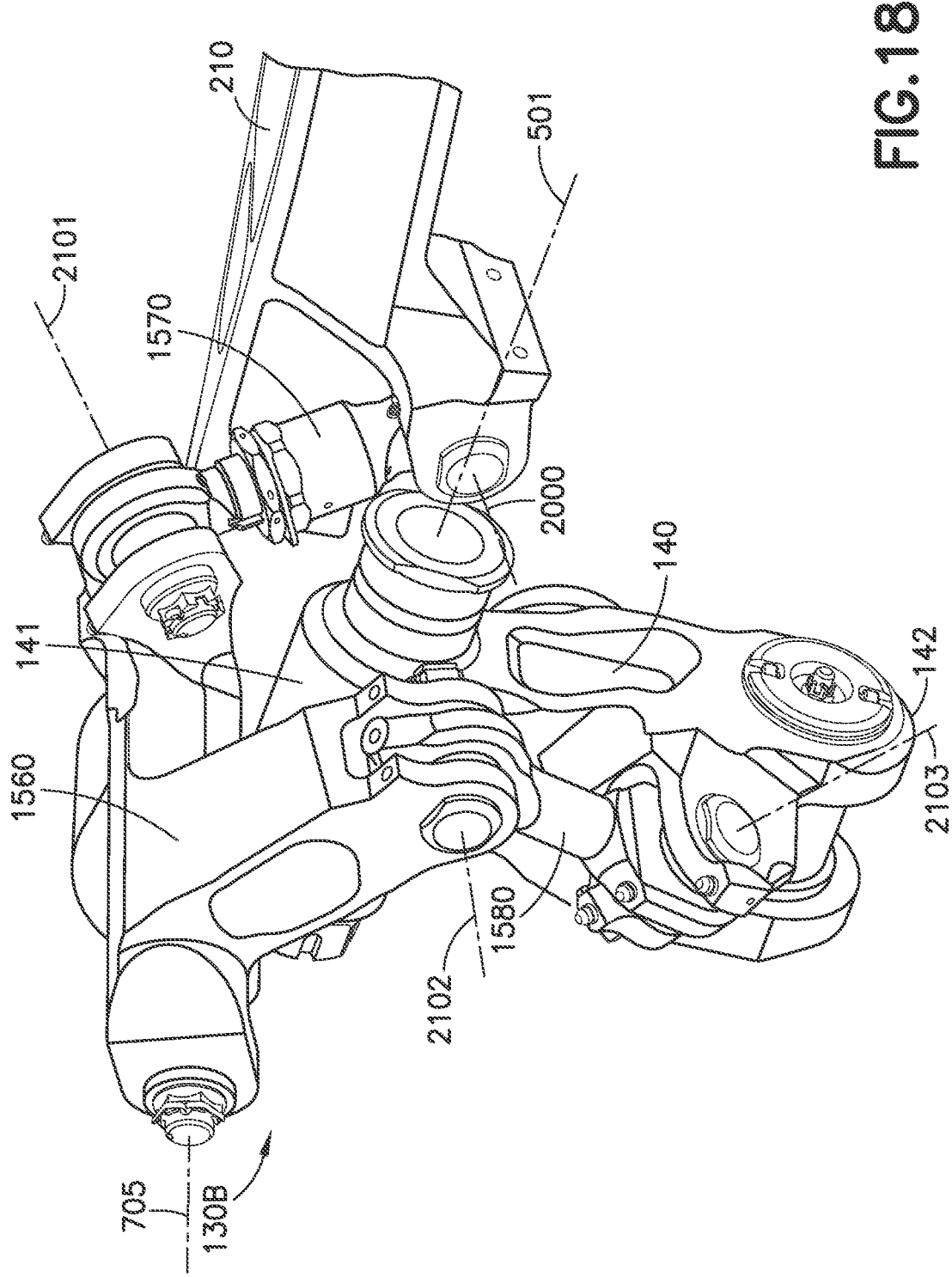
Figure 19:
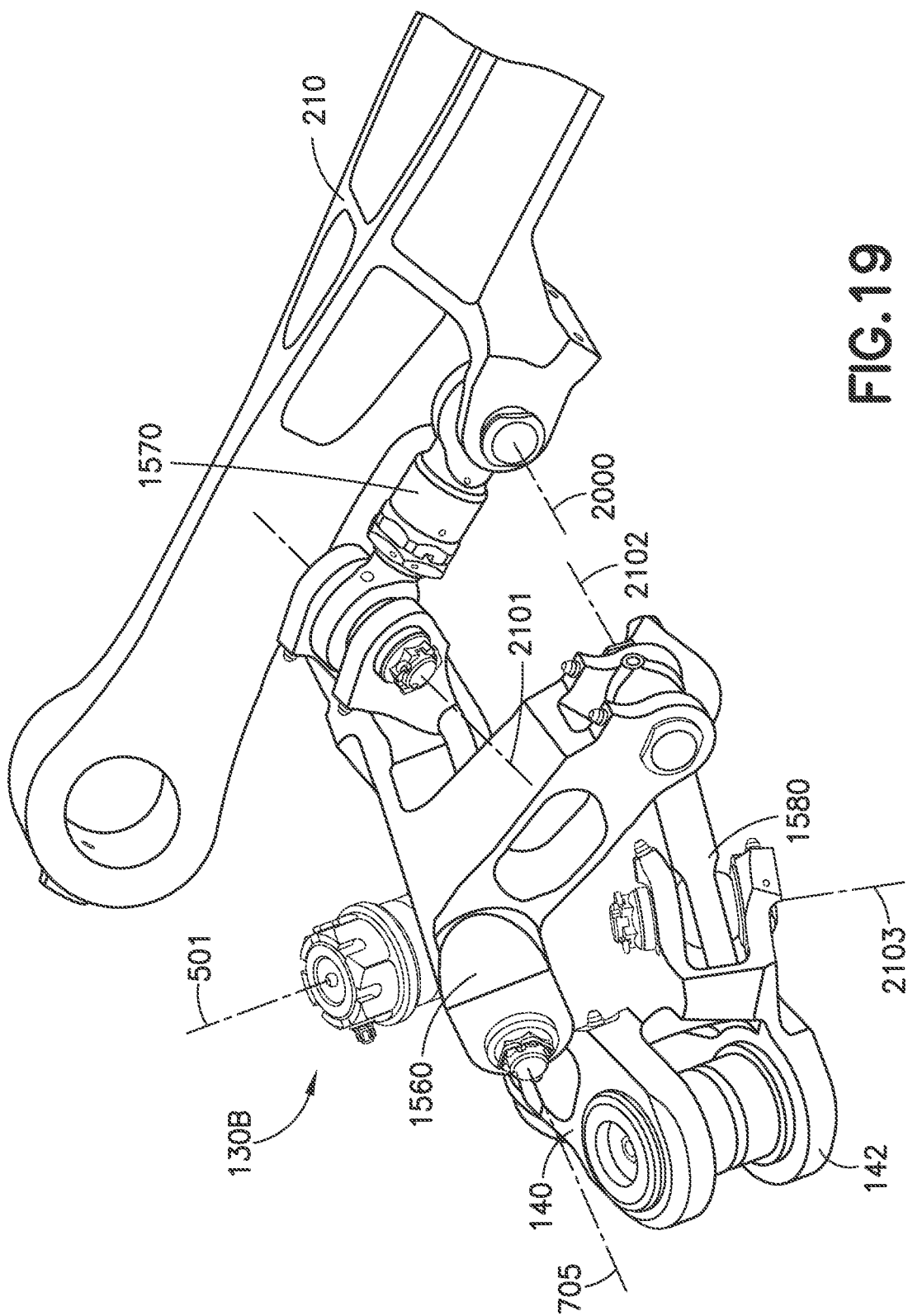
Figure 20:
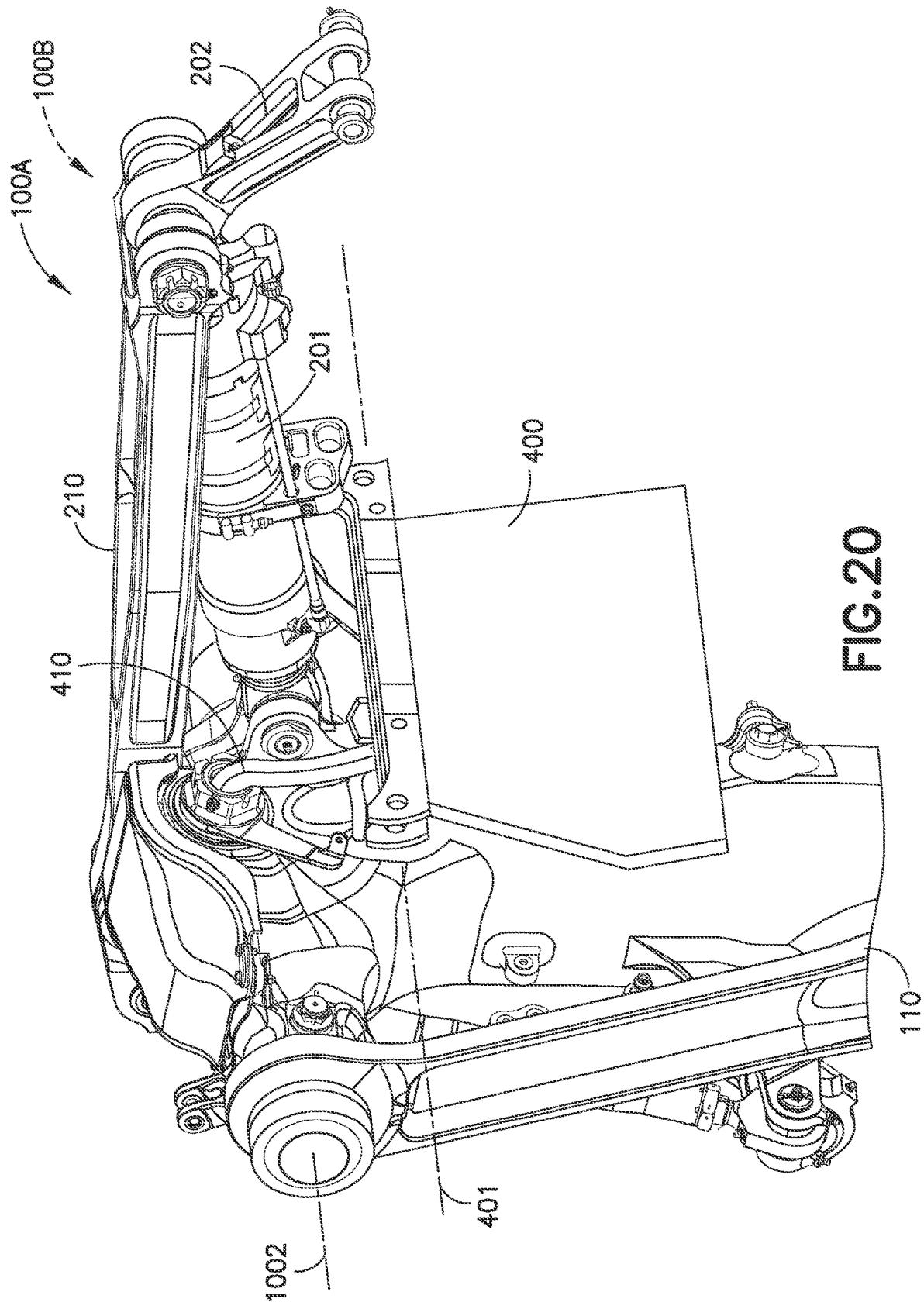
Figure 21:
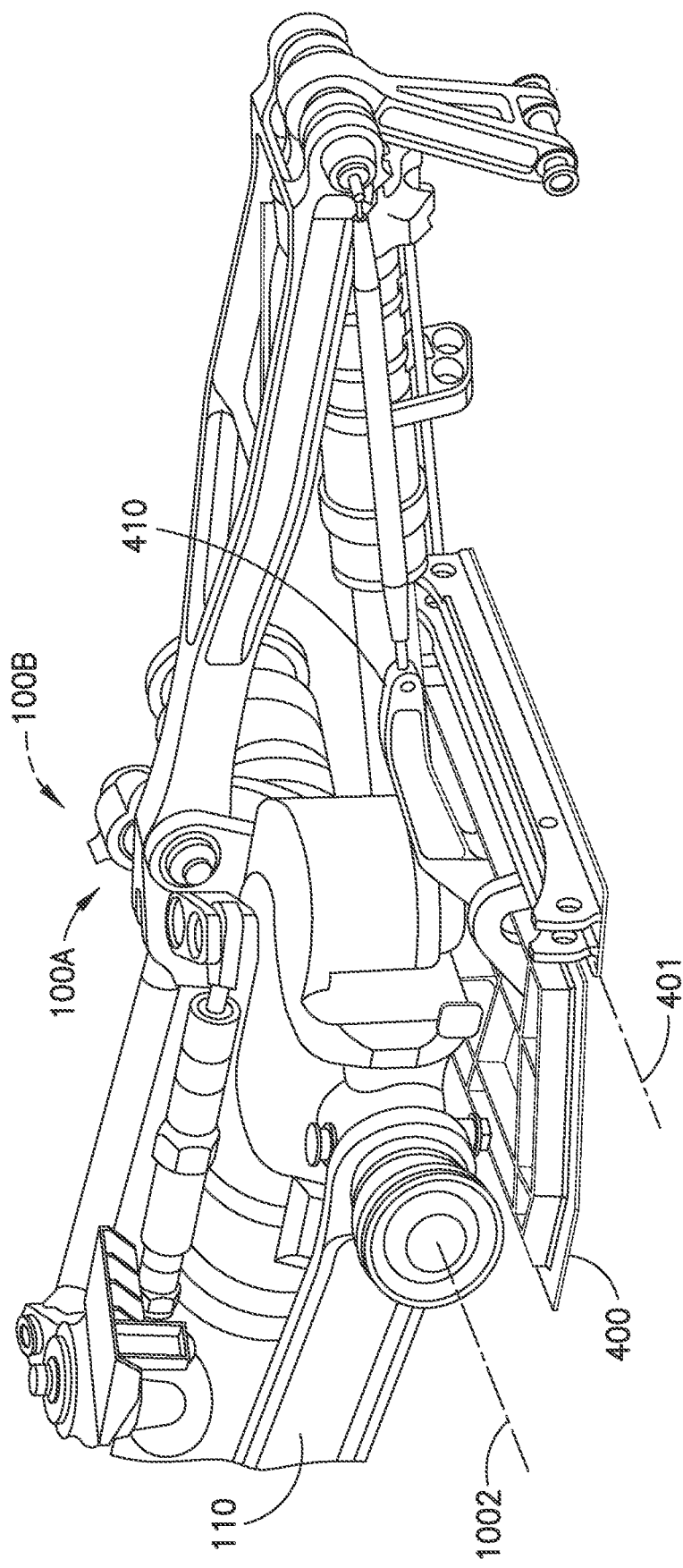
Figure 22:
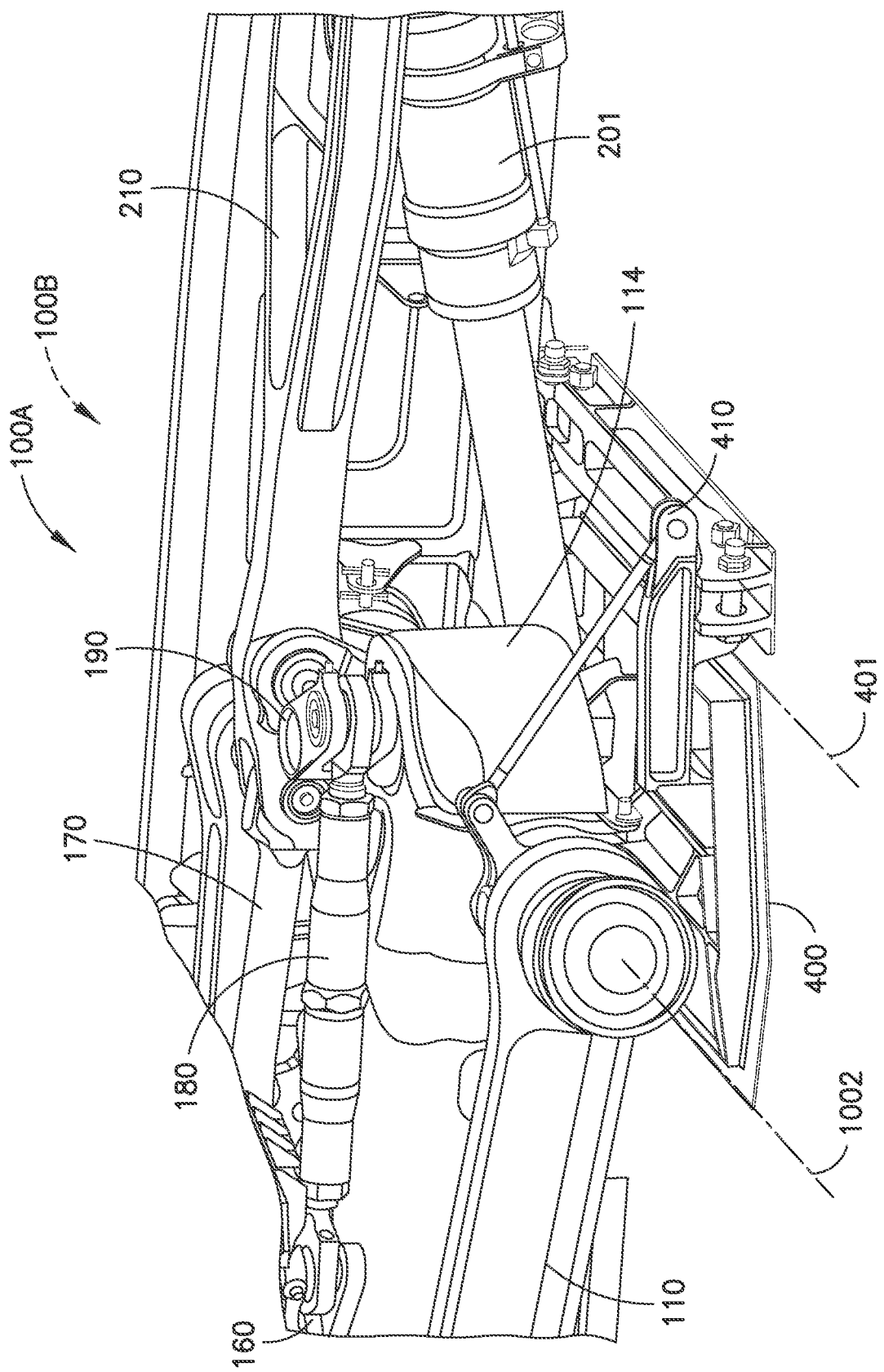
Figure 24A:
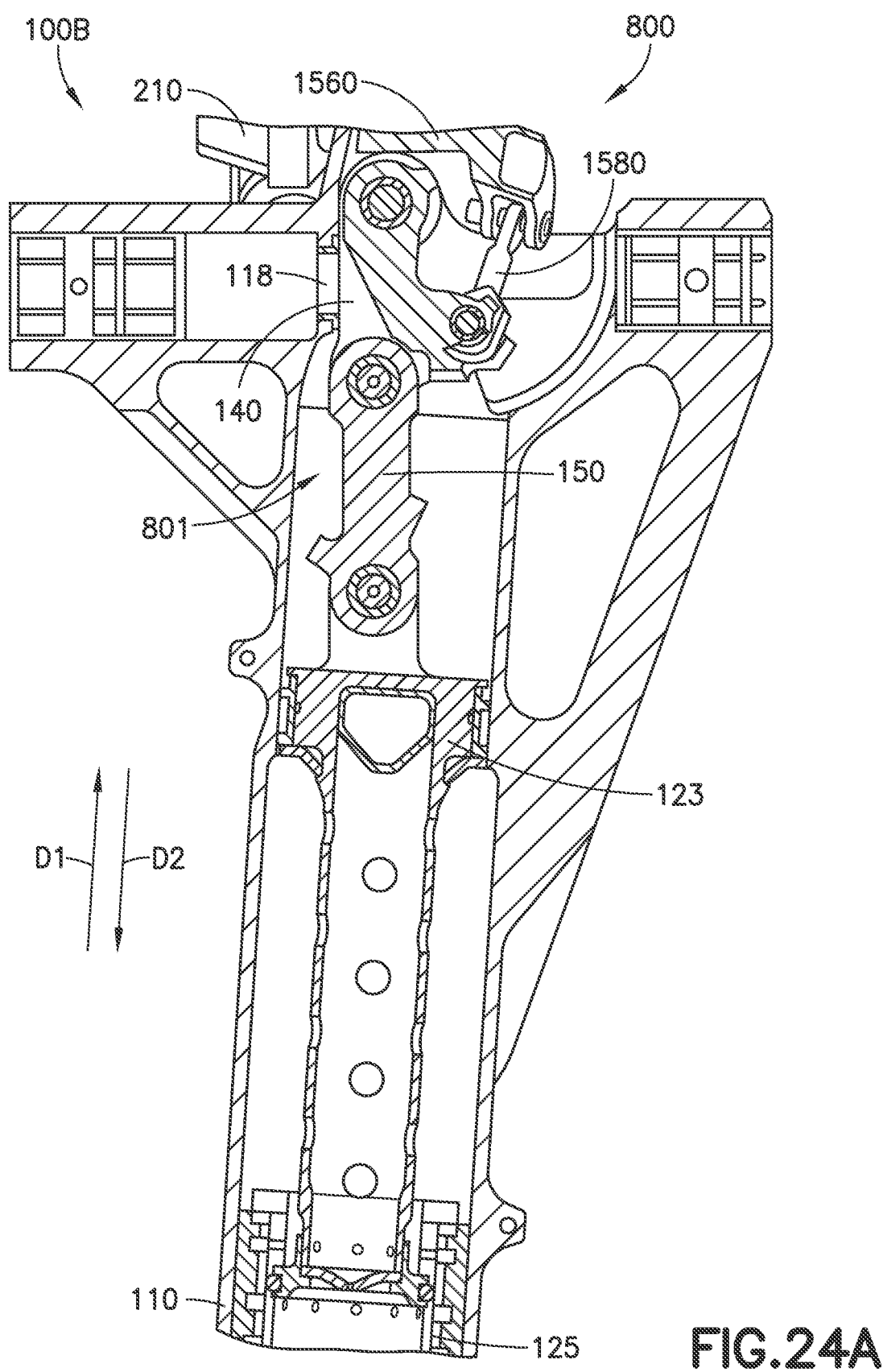
Figure 24B:
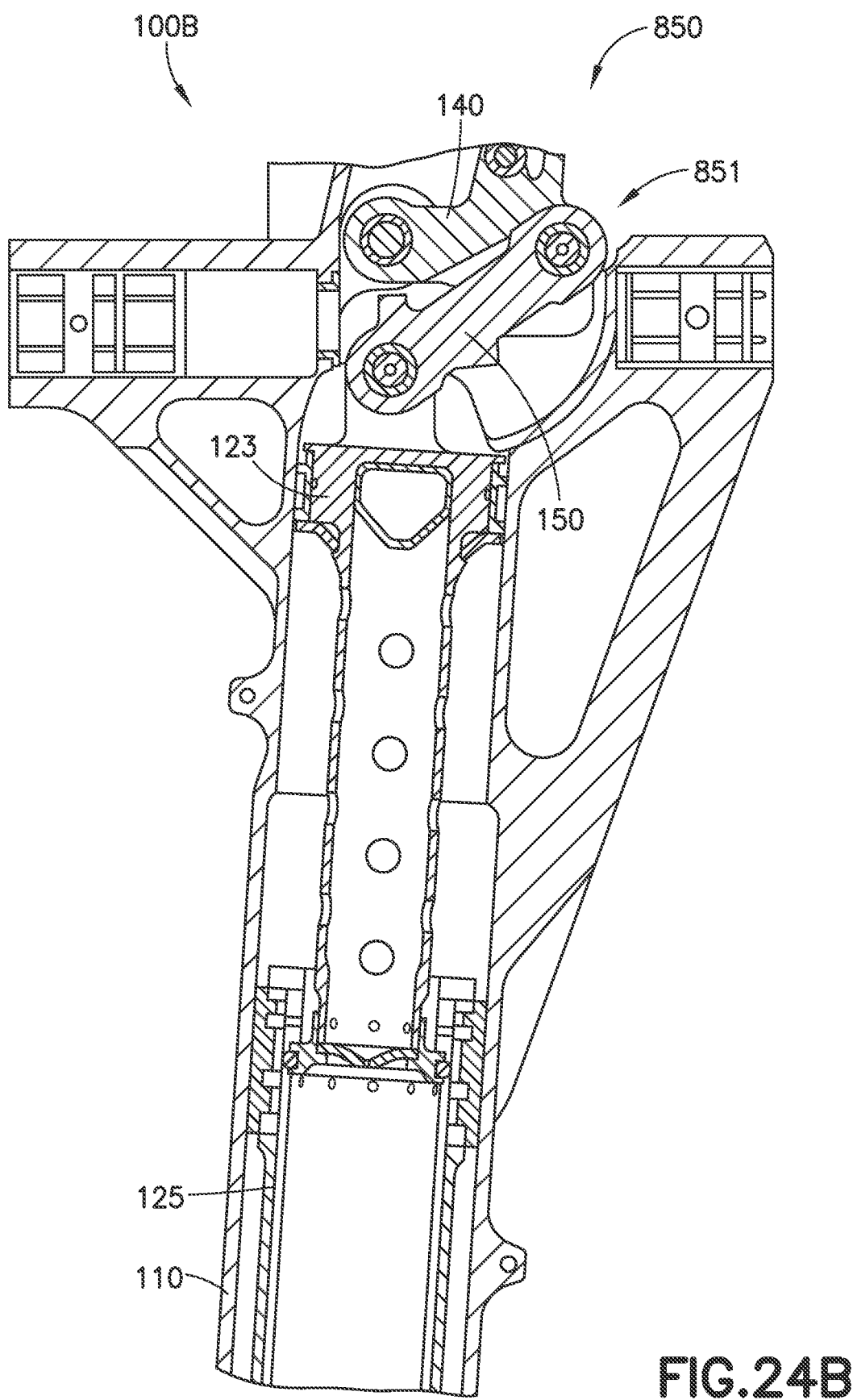
Figure 25A:
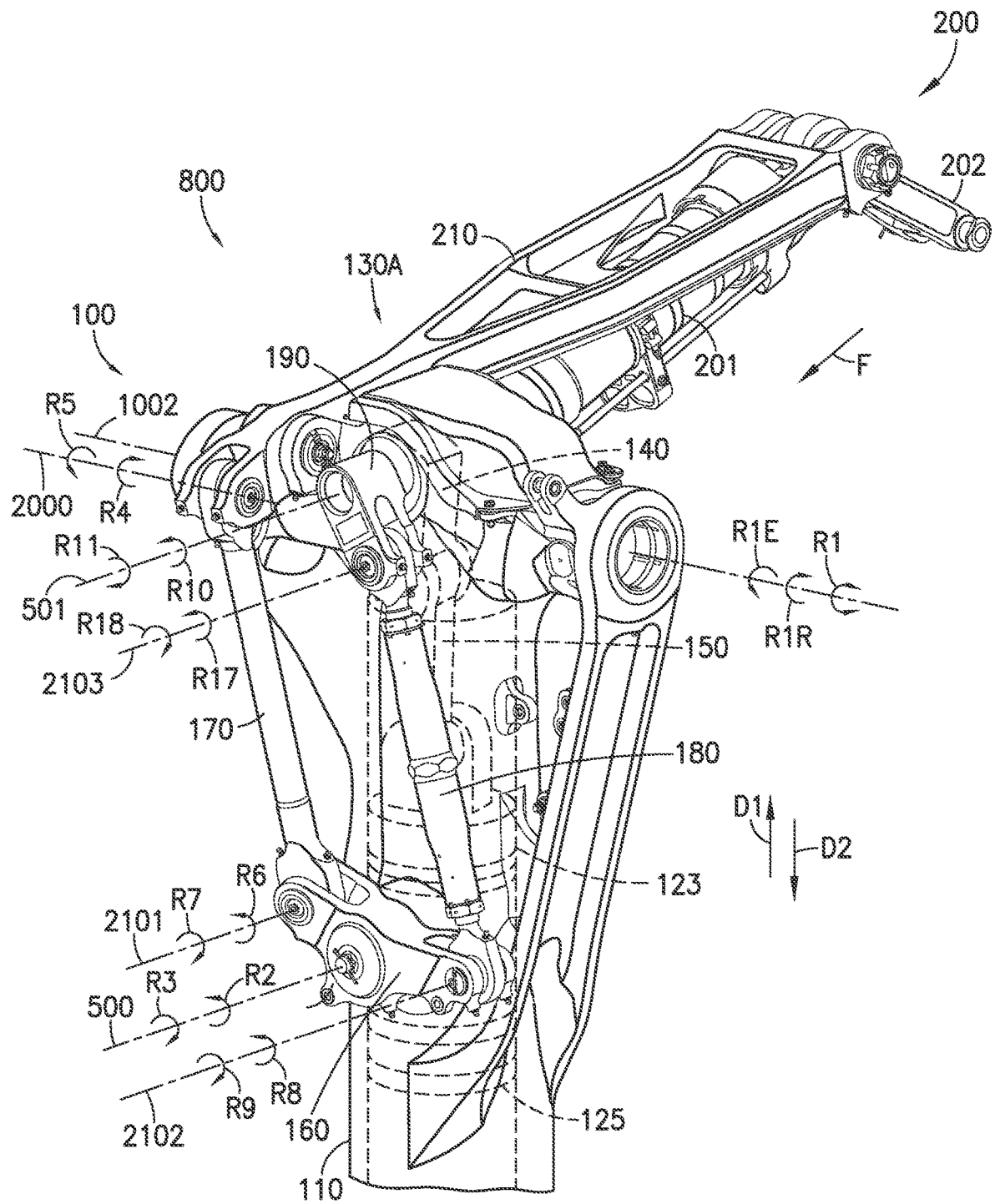
Figure 25B:
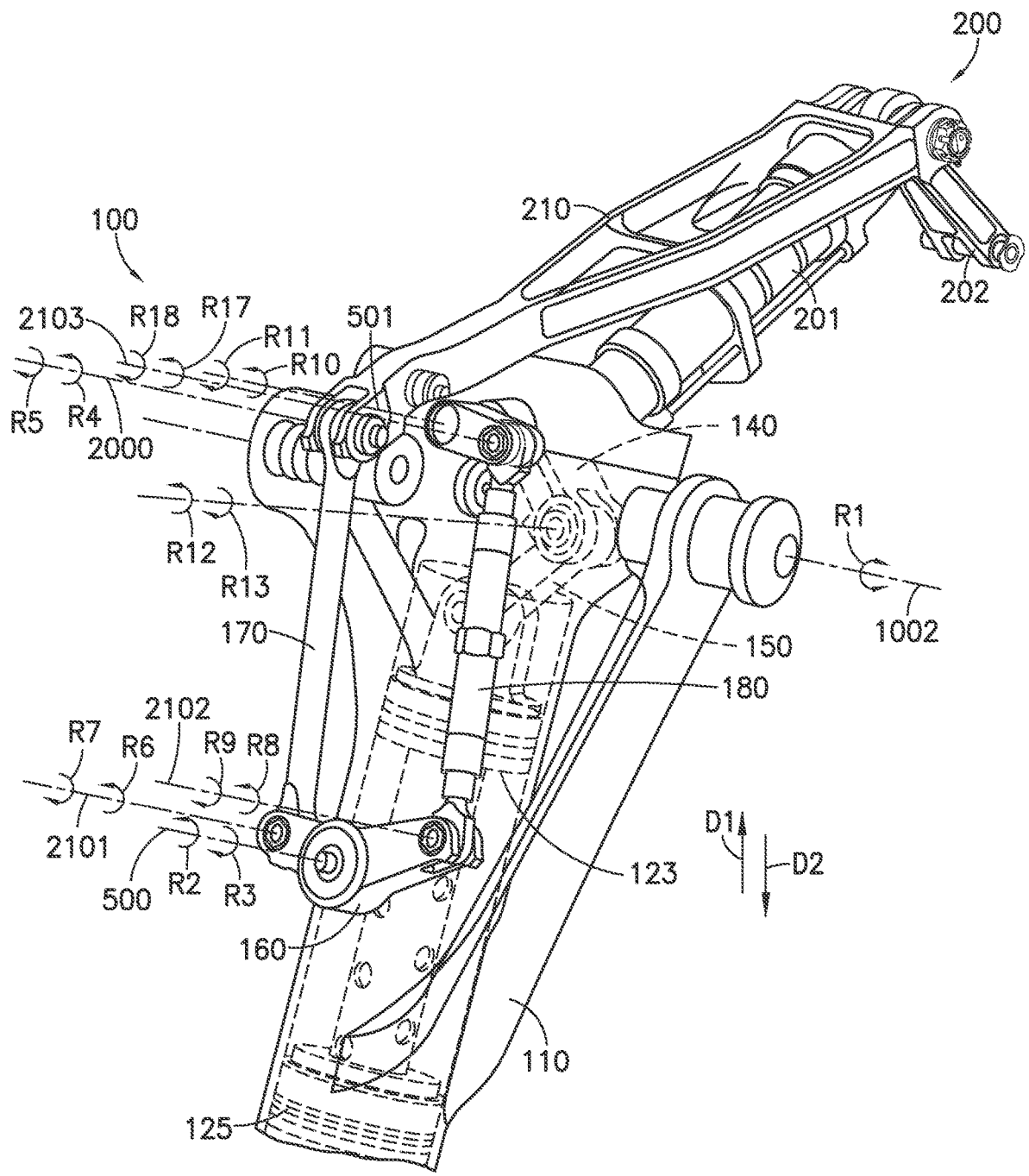
Figure 25C:
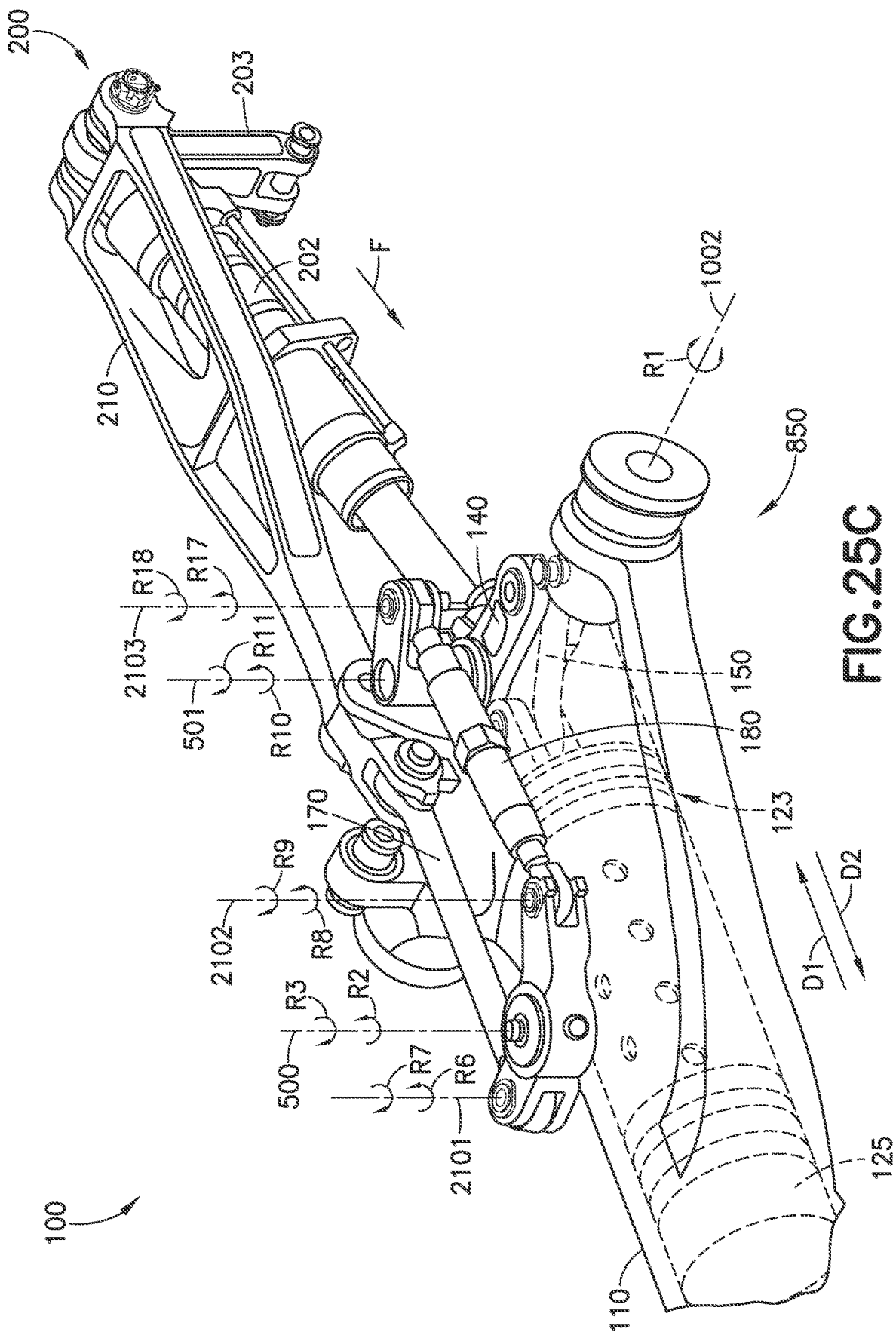
Figure 26A:
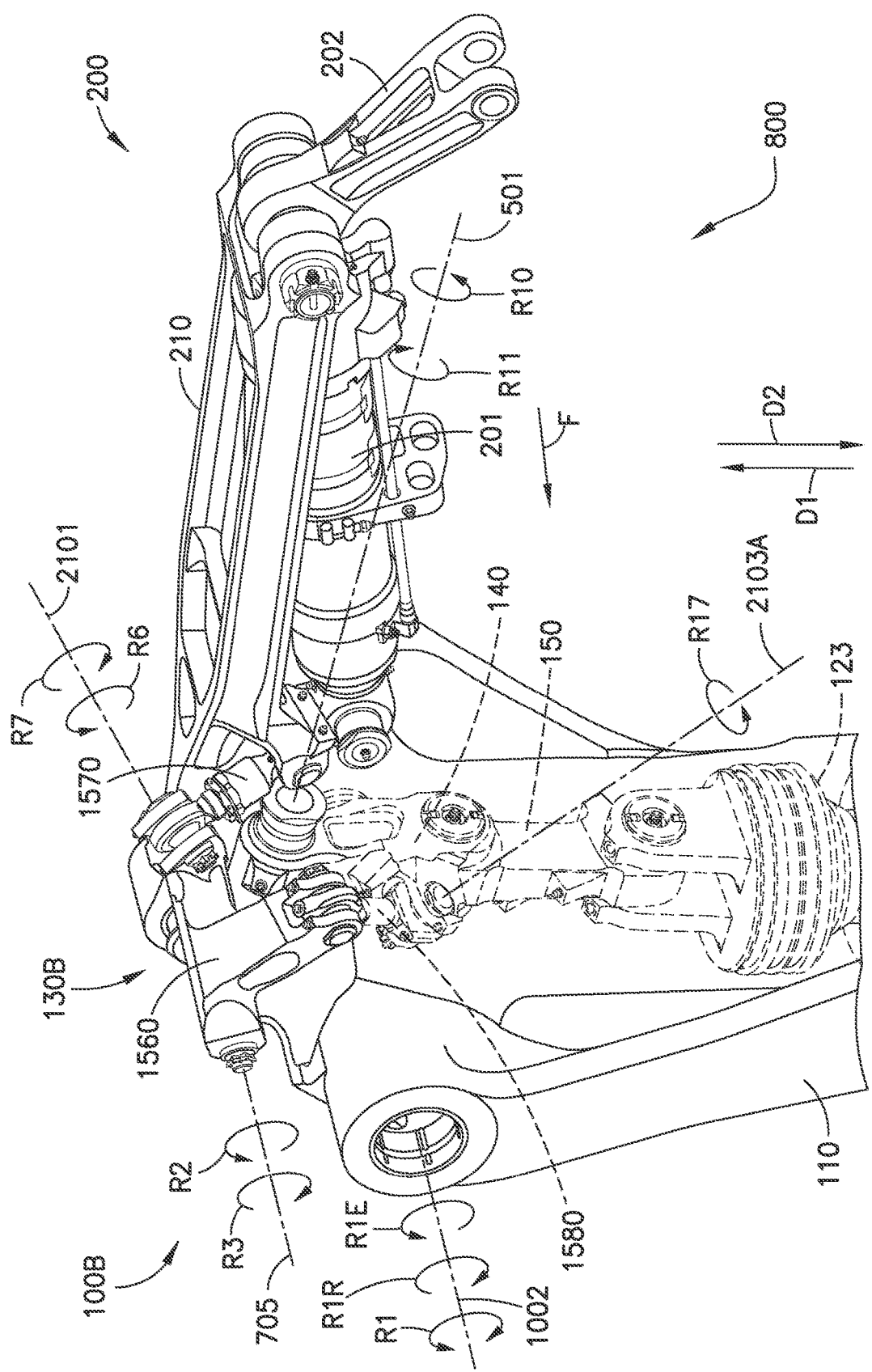
Figure 26B:
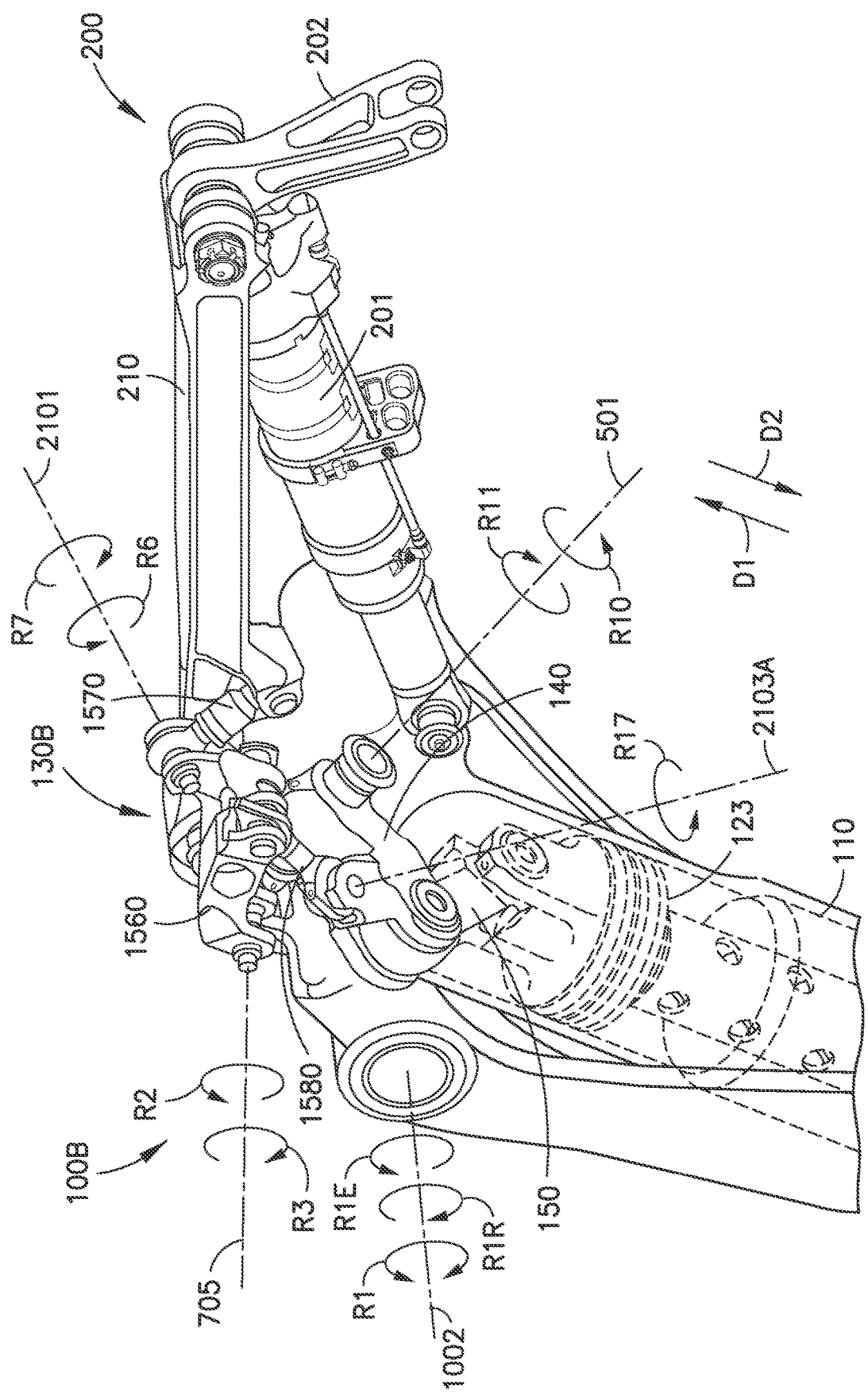
Figure 26C:
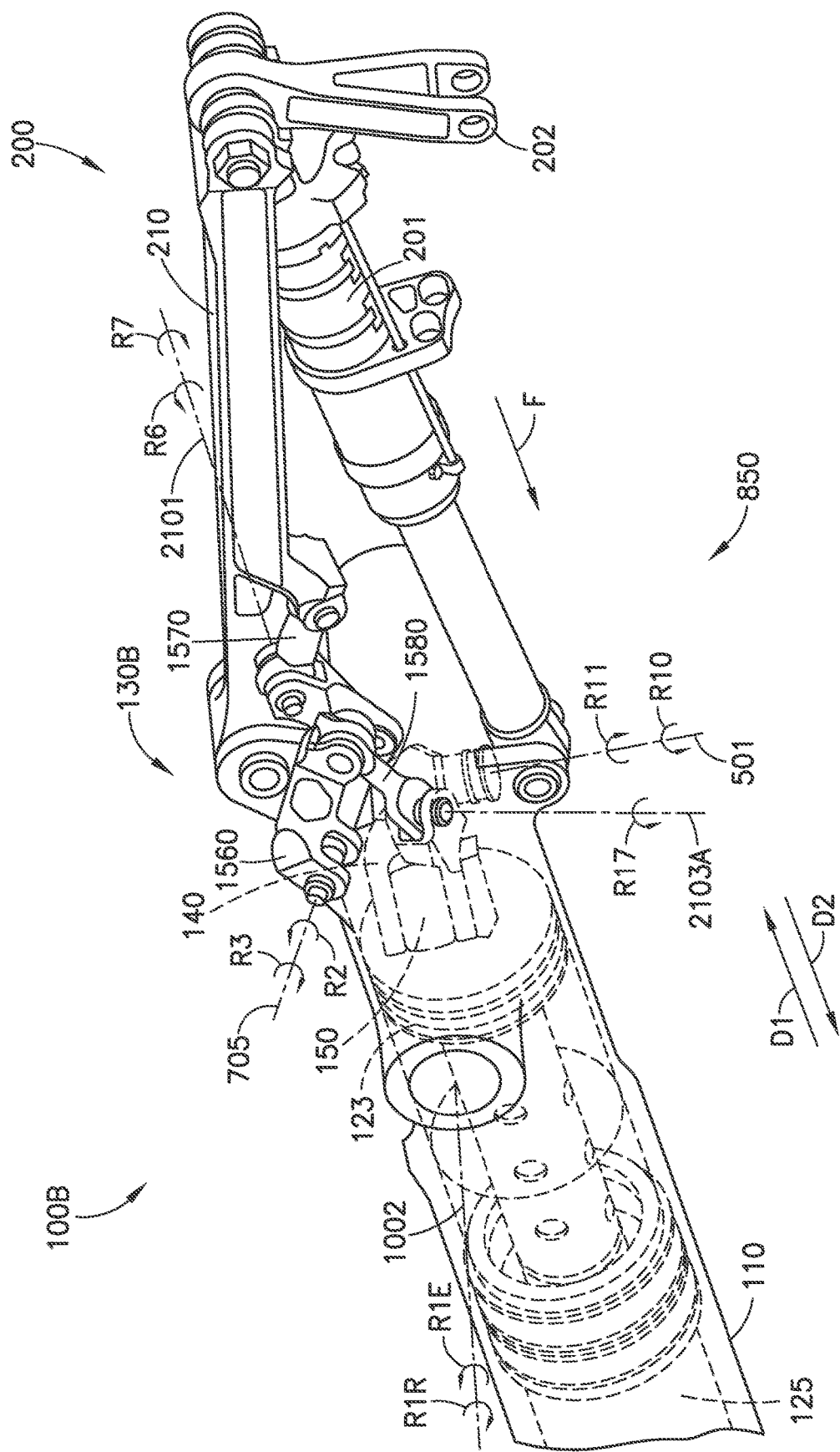
Figure 27:
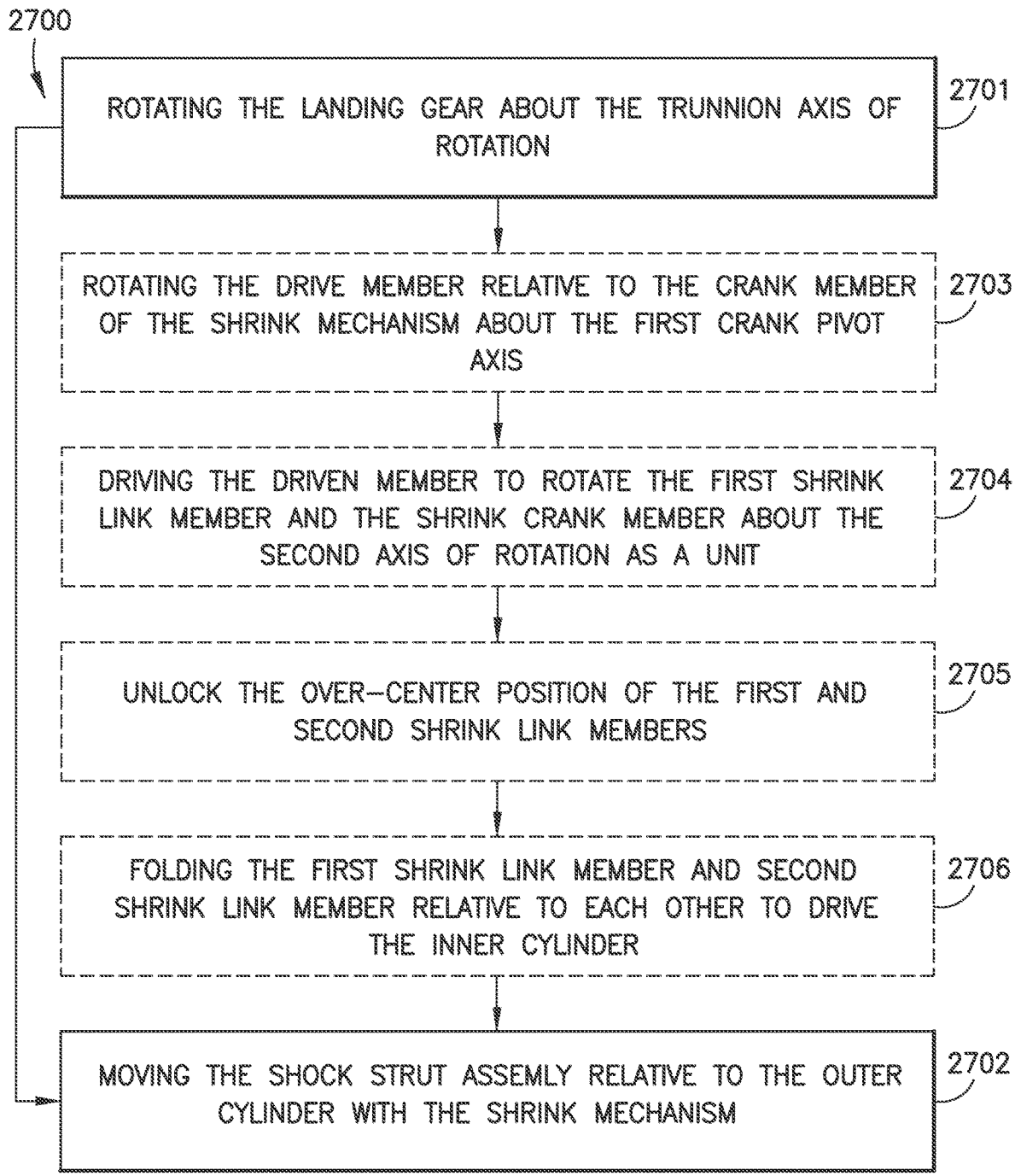
Figure 28:
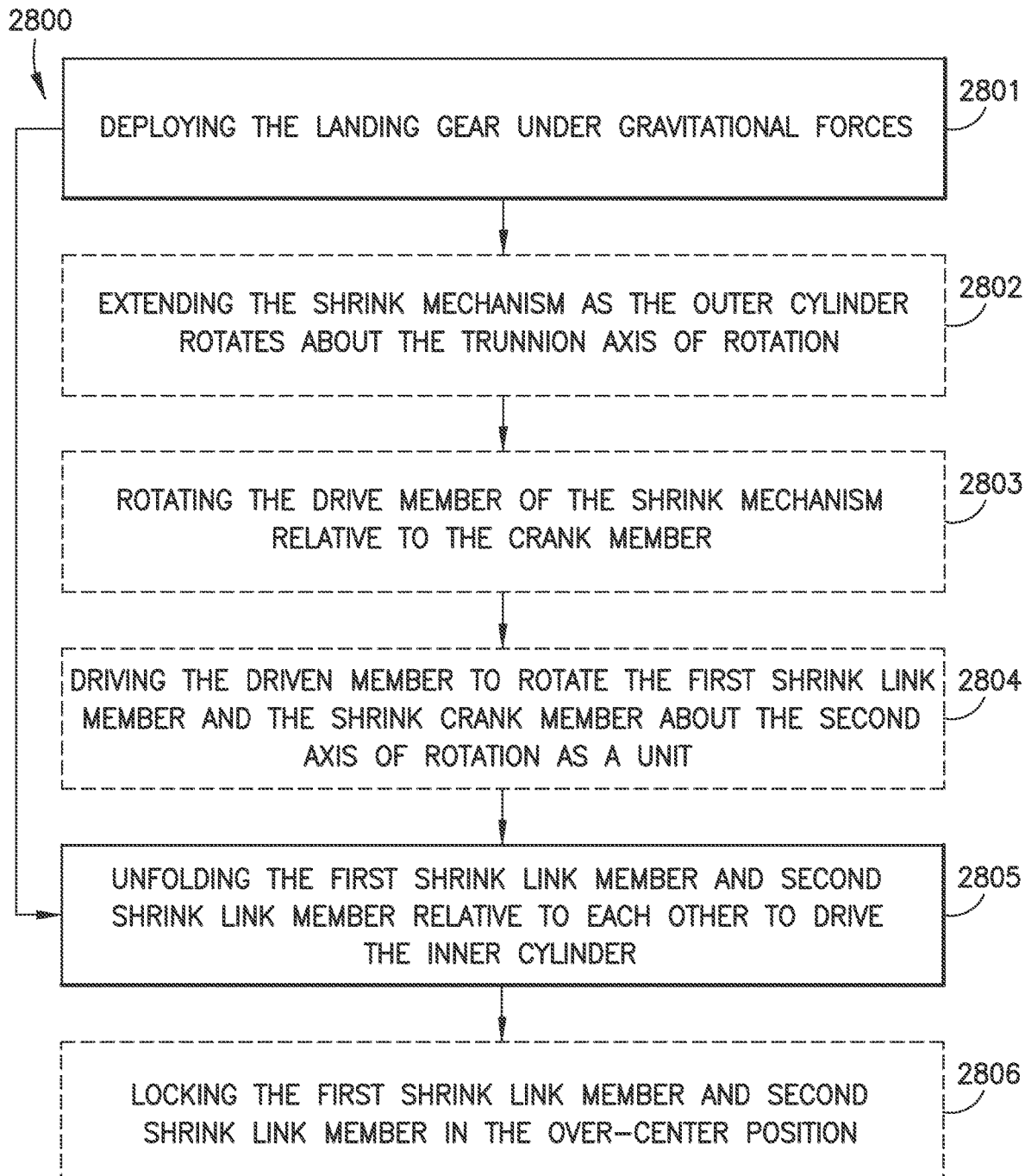
Figure 29:
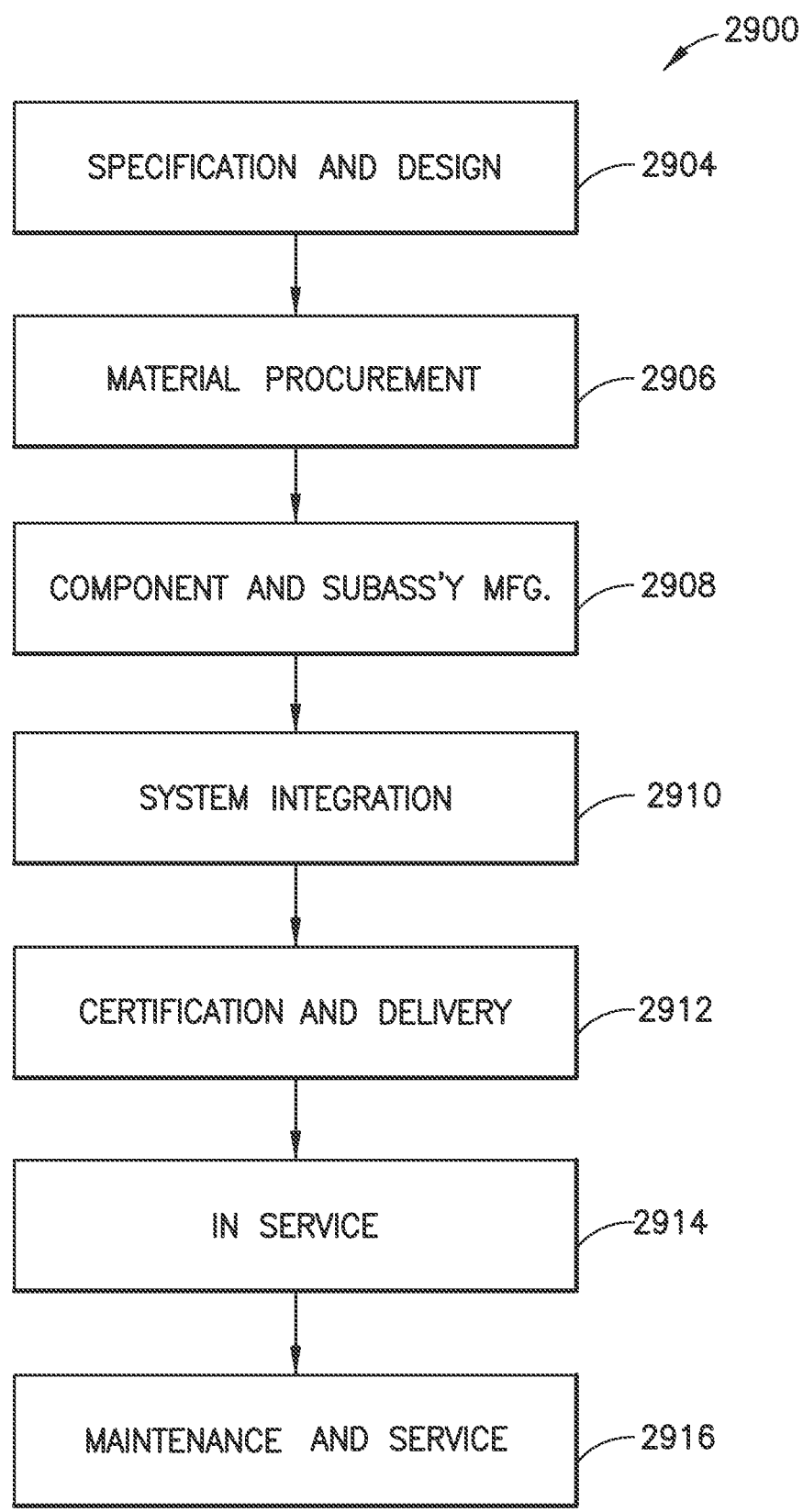

Having thus described examples of the present disclosure in general terms, reference will now be made to the accompanying drawings, which are not necessarily drawn to scale, and wherein like references characters designate the same or similar parts throughout the several views, and wherein:

FIGS. 1A-1C are schematic illustrations of an aircraft and landing gear in accordance with one or more aspects of the present disclosure;

FIG. 2 is a schematic perspective view illustration of the landing gear of FIGS. 1A-1C in an extended configuration in accordance with one or more aspects of the present disclosure;

FIGS. 3A and 3B are collectively (and should be viewed with each other) a schematic partial cross-sectional side view illustration of a comparison between portions of the landing gear of FIG. 2 in retracted and extended configurations in accordance with one or more aspects of the present disclosure;

FIG. 4 is a schematic perspective partial cross-sectional view illustration of a portion the landing gear of FIG. 2 in an extended configuration in accordance with one or more aspects of the present disclosure;

FIG. 5 is a schematic perspective partial cross-sectional view illustration of the landing gear of FIG. 2 in a retracted configuration in accordance with one or more aspects of the present disclosure;

FIG. 6 is a schematic cross-sectional side view illustration of a portion the landing gear of FIG. 2 in accordance with one or more aspects of the present disclosure;

FIG. 7 is a schematic perspective cross-section view illustration of a portion the landing gear of FIG. 2 in accordance with one or more aspects of the present disclosure;

FIG. 8 is a schematic perspective view illustration of a portion of the landing gear of FIG. 2 in accordance with one or more aspects of the present disclosure;

FIG. 9 is a schematic partial cross-sectional side view illustration of a portion of the landing gear of FIG. 2 in accordance with one or more aspects of the present disclosure;

FIG. 10 is a schematic perspective cross-sectional view illustration of a portion of the landing gear of FIG. 2 in accordance with one or more aspects of the present disclosure;

FIG. 11 is a schematic perspective view illustration of a portion of the landing gear of FIG. 2 in accordance with one or more aspects of the present disclosure;

FIG. 12 is a schematic perspective view illustration of a portion of the landing gear of FIG. 2 in accordance with one or more aspects of the present disclosure;

FIG. 13 is a schematic perspective partial cross-sectional view illustration of a portion of the landing gear of FIG. 2 in accordance with one or more aspects of the present disclosure;

FIG. 14 is a schematic perspective view illustration of a portion of the landing gear of FIG. 2 in accordance with one or more aspects of the present disclosure;

FIG. 15 is a schematic perspective partial cross-sectional view illustration of the landing gear of FIGS. 1A-1C in an extended configuration in accordance with one or more aspects of the present disclosure;

FIG. 16 is a schematic perspective partial cross-sectional view illustration of the landing gear of FIG. 15 in a retracted configuration in accordance with one or more aspects of the present disclosure;

FIGS. 17A and 17B are collectively (and should be viewed with each other) a schematic cross-sectional side view illustration of a comparison between portions of the landing gear of FIG. 15 in retracted and extended configurations in accordance with one or more aspects of the present disclosure;

FIG. 18 is a schematic perspective view illustration of a portion of the landing gear of FIG. 15 in accordance with one or more aspects of the present disclosure;

FIG. 19 is a schematic perspective view illustration of a portion of the landing gear of FIG. 15 in accordance with one or more aspects of the present disclosure;

FIG. 20 is a schematic perspective view illustration of a portion of the landing gear of FIGS. 1A-1C in accordance with one or more aspects of the present disclosure;

FIG. 21 is a schematic perspective view illustration of a portion of the landing gear of FIGS. 1A-1C in accordance with one or more aspects of the present disclosure;

FIG. 22 is a schematic perspective view illustration of a portion of the landing gear of FIGS. 1A-1C in accordance with one or more aspects of the present disclosure;

FIG. 23 is an exemplary graph illustrating the shrink length of the landing gear versus the retract angle of the landing gear in accordance with one or more aspects of the present disclosure;

FIG. 24A is a schematic cross-sectional side view illustration of the landing gear of FIG. 15 in an extended configuration in accordance with one or more aspects of the present disclosure;

FIG. 24B is a schematic cross-sectional side view illustration of the landing gear of FIG. 15 in a retracted configuration in accordance with one or more aspects of the present disclosure;

FIGS. 25A-25C are schematic perspective view illustrations of a retraction sequence of the landing gear of FIG. 2 in accordance with one or more aspects of the present disclosure;

FIGS. 26A-26C are schematic perspective view illustrations of a retraction sequence of the landing gear of FIG. 15 in accordance with one or more aspects of the present disclosure;

FIG. 27 is a flow chart of a method of retraction of the landing gear of FIGS. 1A-1C in accordance with one or more aspects of the present disclosure;

FIG. 28 is a flow chart of a method of extension of the landing gear of FIGS. 1A-1C in accordance with one or more aspects of the present disclosure; and FIG. 29 is a block diagram of aircraft production and service methodology.

DETAILED DESCRIPTION

Referring to FIGS. 1A-1C, 2, and 15, an exemplary aircraft 1000 and landing gear 100, 100A, 100B with a shrinking mechanism 130A, 130B is illustrated incorporating aspects of the present disclosure. In order to achieve a greater angle of attack/rotation of the aircraft on takeoff and/or landing, maintain current static ride heights and current attachment locations of a conventional landing gear, without having to redesign the aircraft, the shrink mechanism 130A, 130B for landing gear 100, 100A, 100B described herein increases height of the aircraft during takeoff and shortens a length of the landing gear in a stowing position following takeoff for stowage in the current landing gear bay with little to no modification of the aircraft. In particular, the landing gear 100, 100A, 100B described herein is cost efficient and is not overly complex, while still satisfying the static height, takeoff and/or landing height and stowage requirements of the landing gear.

Illustrative, non-exhaustive examples, which may or may not be claimed, of the subject matter according to the present disclosure are provided below.

The aspects of the present disclosure described herein may provide landing gear which is generally referred to as landing gear 100 and more specifically referred to as landing gear 100A, 100B. The landing gear 100, 100A, 100B shrinks when retracted into a wheel well of the aircraft 1000 so that the landing gear 100, 100A, 100B can be stowed within a frame 1001 of the aircraft 1000. When extended, the landing gear 100, 100A, 100B provides for increased ground clearance so that, e.g., larger more efficient engines can be fitted of the aircraft 1000. The aspects of the present disclosure described herein provide the landing gear 100, 100A, 100B with the shrink mechanism 130A, 130B which generally has a configuration that provides a low static ride height of the aircraft, a tall takeoff height of the aircraft and a shortened landing gear length for stowage of the landing gear 100, 100A, 100B within the aircraft 1000.

In one aspect, while the landing gear 100, 100A, 100B described herein is described with respect to a commercial passenger jet, referred to herein as the aircraft 1000, in other aspects the aircraft may be any suitable aircraft having a fixed wing, variable sweep wing, or rotary wing. The landing gear 100, 100A, 100B may also be used in any suitable position on the aircraft 1000, such as a main landing gear 101 located towards a longitudinal center of the aircraft 1000, or in other aspects a nose landing gear 102 located towards a longitudinal front of the aircraft 1000. As will be described herein, the landing gear 100, 100A, 100B is configured to couple to one or more of the frame 1001 and the landing gear components (e.g., landing gear retract mechanism 200 including an actuator 201, a reaction link 202, a walking beam 210 (i.e., also referred to as a retract actuator beam), etc.) of the aircraft 1000 for providing the low static ride height, the tall take-off height, and effecting shrinking of the length landing gear 100, 100A, 100B for retraction of the landing gear 100, 100A, 100B.

Referring to FIGS. 1B and 1C, the landing gear 100 is illustrated in an extended/deployed and stowed/retracted position. A conventional tall landing gear 105 is also illustrated for comparison of the landing gear attachment locations relative to the frame 1001 of the aircraft 1000. In one aspect, the landing gear 100 provides the same static ride height A (e.g., the distance from the ground to the lowest point on the aircraft 1000 such as the bottom of the frame 1001) as the conventional tall landing gear 105 while being coupled to the frame 1001 further inboard, relative to the centerline CL of the frame 1001, by a predetermined distance B. As can be seen best in FIG. 1B, upon retraction, the location of the landing gear wheel assembly 119 and wheel axis WA are located at a common location (e.g., within the wheel compartment of the aircraft 1000 with little to no modification of the wheel bay) as illustrated by the retraction path 103 of the conventional tall landing gear 105 and the retraction path 104 of the landing gear 100. As such, the landing gear 100 may be fit to an aircraft while maintaining the existing conventional landing gear bay of the aircraft, sill waterlines, etc., i.e., the aircraft 1000 does not have to be redesigned in order to accommodate the landing gear 100 and receive the increased takeoff and/or landing height and aircraft rotation benefits of the landing gear 100.

Referring now to FIGS. 2-10, in one aspect, the landing gear 100A includes an outer cylinder 110, a shock strut assembly 120, a wheel assembly 119 coupled to the shock strut assembly 120, and a shrink mechanism 130A. In one aspect, the landing gear 100A further includes a cover 114 (FIG. 11), a sensor actuator arm 300 (FIG. 14), a sensor 310 (FIG. 11), a door 400 (FIGS. 20-22), and a door drive member 410 (FIGS. 20-22). A landing gear retract mechanism 200 is coupled to the landing gear 100A for extending/retracting the landing gear 100A and driving the shrink mechanism 130A.

The outer cylinder 110 includes a first end 111 and a second end 112 longitudinally spaced from the first end 111 along longitudinal axis 115. The outer cylinder 110 further includes a shrink link cavity 113 (FIGS. 3A and 3B) and an inner cavity 117. The inner cavity 117 is configured such that the shock strut assembly 120 is at least partially disposed within the inner cavity 117. The shrink link cavity 113 is configured to at least partially house portions of the shrink mechanism 130A. In one aspect, the outer cylinder 110 is a single, rigid member such that the shrink link cavity 113 and an inner cavity 117 are integrally formed with the outer cylinder 110. The outer cylinder 110 is rotatably coupled to the frame 1001 of the aircraft 1000 about a trunnion axis of rotation 1002, such that the outer cylinder 110 rotates about the trunnion axis of rotation 1002 in direction R1 (FIG. 2). In one aspect, the first end 111 of the outer cylinder 110 forms a landing gear trunnion 165 and is rotatably coupled to the frame 1001 of the aircraft 1000 about the trunnion axis of rotation 1002, effectively coupling the outer cylinder 110 to the frame 1001. In one aspect, the outer cylinder 110 further includes a cover 114 (FIG. 11) configured to enclose first and second shrink link members 140, 150 within the outer cylinder 110, a fluid drainage aperture 116 (FIG. 10) configured to drain condensation or fluid that may penetrate/ accumulate in the shrink link cavity 113 or the inner cavity 117, and an over-center stop surface 118 (FIGS. 9, 17A, and 17B).

The shock strut assembly 120 includes a bulkhead 123 (FIG. 6) movably coupled to the inner cavity 117 of the outer cylinder 110 so as to form a first seal 124 (FIG. 6) with the inner cavity 117. The bulkhead 123 is further coupled to the shrink mechanism 130A to effect reciprocating movement of the shock strut assembly 120 within the inner cavity 117 so as to shrink and extend the landing gear 100A. The inner cylinder 125 is movably coupled to both the inner cavity 117 of the outer cylinder 110 and the bulkhead 123 so as to form a second seal 126 (FIG. 5) with the inner cavity 117 and so that the inner cylinder 125 is movable relative to (such as during compression and rebound of the shock strut assembly 120) and with the bulkhead 123 (such as during shrinking and extending of the landing gear 100A) within the inner cavity 117 of the outer cylinder 110. The shrink mechanism 130A effects relative movement of both the bulkhead 123 and the inner cylinder 125, as a unit, in directions D1, D2 (FIGS. 3A and 3B) so as to one of both increase or decrease a length 1950 (FIG. 1B) of the landing gear 100A depending on a respective deployed/extended configuration 800 or retracted/folded configuration 850 of the landing gear 100A. In one aspect, the length 1950 may be increased or decreased depending on the retracted configuration 850 or the deployed configuration 800 by moving the shock strut assembly 120, with the shrink mechanism 130A, by a distance 950. The distance 950 may be about 10 inches or in other aspects the distance may be more or less than about 10 inches.

Still referring to FIGS. 2-10, the shrink mechanism 130A of landing gear 100A includes the first shrink link member 140, the second shrink link member 150, a crank member 160, a drive member 170, and a driven member 180. The crank member 160 includes a first end 161 and a second end 162. In one aspect, the crank member 160 is rotatably coupled to the outer cylinder 110 about a first axis of rotation 500 such that the crank member 160 rotates about the first axis of rotation 500 in directions R2, R3. In one aspect, the crank member 160 is coupled to the outer cylinder 110 between the first end 111 and the second end 112 of the outer cylinder 110. For example, as illustrated in FIG. 7, the crank member 160 is coupled to the outer cylinder 110 in any suitable manner such as by a cross-bolt assembly 700 including a cross-bolt 701, a pivot washer 702, and a stud 703. In one aspect, the crank member 160 is coupled to the outer cylinder with a bracket 169 as illustrated in FIG. 8.

The drive member 170 includes a first end 171 and a second end 172. The first end 171 of the drive member 170 is rotatably coupled to the walking beam 210 of the landing gear retract mechanism 200 at a walking beam pivot axis 2000 (FIG. 2) such that the drive member 170 and the walking beam 210 pivot relative to one another about the walking beam pivot axis 2000 in directions R4, R5. The second end 172 of the drive member 170 is rotatably coupled to the first end 161 of the crank member 160 at a first crank pivot axis 2101 such that the drive member 170 and the crank member 160 pivot relative to one another about the first crank pivot axis 2101 in directions R6, R7. In one aspect, the drive member 170 is coupled to the crank member 160 with a clevis joint, while in other aspects, they may be coupled together with spherical bearings or any other suitable coupling (it is noted that each of the rotatable couplings between the links of the shrink mechanism 130A, 130B described herein may be coupled in a manner that is substantially similar to the rotatable coupling between the drive member 170 and the crank member 160 to transmit torque between each link and to change a direction of the force applied by the walking beam 210 to shrink and extend the landing gear 100, 100A, 100B). The drive member 170 is configured to effectively couple the crank member 160 to the walking beam 210 of the landing gear retract mechanism 200. The drive member 170, via the walking beam 210, drives rotational motion of the crank member 160 about the first axis of rotation 500 in directions R2, R3. In one aspect, the drive member 170 has an adjustable length 998 (FIG. 4).

The driven member 180 includes a first end 181 and a second end 182. The first end 181 is coupled to the second end 162 of the crank member 160 at a second crank pivot axis 2102 such that the driven member 180 and the crank member 160 pivot relative to one another about the second crank pivot axis 2102 in directions R8, R9. The second end 182 is coupled to the first shrink link member 140. The driven member 180 is configured to effectively couple the crank member 160 to the first shrink link member 140 such that the crank member 160 drives the first shrink link member 140 in rotation about a second axis of rotation 501. In one aspect, the drive member 170 and the driven member 180 extend substantially along the longitudinal axis 115 of the outer cylinder 110 adjacent one another. In one aspect, the driven member 180 has an adjustable length 999 (FIG. 4).

Referring now to FIGS. 3A-5, and 9-10, the first shrink link member 140 includes a first end 141 (FIGS. 9 and 10) rotatably coupled to the outer cylinder 110 and a second end 142 (FIGS. 9 and 10) rotatably coupled to the second shrink link member 150. The first shrink link member 140 is disposed at least partially within the shrink link cavity 113 of the outer cylinder 110. In one aspect, the first shrink link member 140 is disposed within the shrink link cavity 113 such that the first shrink link member 140 is enclosed by the outer cylinder 110. For example, the cover 114 (FIG. 11) may enclose the first shrink link member 140 within the shrink link cavity 113 of the outer cylinder 110. The cover 114 may include vent apertures 1199 to allow for air flow into and out of the shrink link cavity 113 and the inner cavity 117 during extension and retraction of the shock strut assembly 120 relative to the outer cylinder 110 The first shrink link member 140 is rotatably coupled to the outer cylinder 110 such that the first shrink link member 140 rotates relative to the outer cylinder 110 about the second axis of rotation 501 in directions R10, R11. The second axis of rotation 501 is spaced, along the longitudinal axis 115 of the outer cylinder 110, from the first axis of rotation 500. In one aspect, the first axis of rotation 500 and the second axis of rotation 501 are substantially parallel with one another (as seen in FIG. 2). In one aspect, the first shrink link member 140 further includes a shrink crank member 190 that couples the first shrink link member 140 to the driven member 180.

The second shrink link member 150 includes a first end 151 and a second end 152 (FIGS. 9 and 10). In one aspect, the second shrink link member 150 is disposed within the shrink link cavity 113 such that the second shrink link member 150 is enclosed by the outer cylinder 110. For example, the cover 114 (FIG. 11) may enclose the second shrink link member 150 (and the first shrink link member 140) within the shrink link cavity 113. The first end 151 of the second shrink link member 150 is rotatably coupled to the bulkhead 123 of the shock strut assembly 120 about axis of rotation 915 (FIGS. 9 and 10). The second end 152 of the second shrink link member 150 is rotatably coupled to the second end 142 of the first shrink link member 140, effectively coupling the first shrink link member 140 to the shock strut assembly 120. The first shrink link member 140 and the second shrink link member 150 are rotatably coupled to each other so as to fold and unfold relative to each other in directions R12, R13. For example, the driven member 180 is coupled to the first shrink link member 140 so as to effect, under impetus of the drive member 170, folding and unfolding of the second shrink link member 150 relative to the first shrink link member 140. As the driven member 180 pivotally coupled to the first shrink link member 140 drives rotation of the first shrink link member 140 and thus folding/unfolding of the first and second shrink link members 140, 150, extension or retraction of the shock strut assembly 120 relative to the outer cylinder 110 and along the longitudinal axis 115 is effected. When unfolded, the first shrink link member 140 and the second shrink link member 150 lock in an over-center position 900 (FIG. 9). In one aspect, an over-center stop surface 118 (FIGS. 9, 17A, and 17B) of the outer cylinder 110 is configured to releasably couple with one or more of the first shrink link member 140 and the second shrink link member 150 to effect over-center locking of the first shrink link member 140 and the second shrink link member 150 in the over-center position 900. In one aspect, the over-center stop surface 118 is integral with the outer cylinder 110, while in other aspect, the over-center stop surface 118 is a removable member that may be replaced. The over-center position 900 may be maintained due to a preload on at least one or more of the first shrink link member 140 and the second shrink link member 150. For example, one or more of the drive member 170, crank member 160, and driven member 180 may be sized in length so that, when in the deployed configuration 800, the shrink mechanism 130A acts as a spring mechanism that forces the first and second shrink link members 140, 150 into the over-center position 900 (FIG. 9) so that one or more of the first and second shrink link members 140, 150 couples with the over-center stop surface 118. In the retracted configuration 850, the preload on the shrink mechanism 130A may be relaxed compared to that of the deployed configuration 800.

Referring now to FIGS. 2 and 12-14, the shrink crank member 190 is coupled to the first shrink link member 140 so that the shrink crank member 190 and the first shrink link member 140 rotate as a unit about the second axis of rotation

501. The shrink crank member 190 is disposed adjacent the first end 141 of the first shrink link member 140. In one aspect, a crank member receiver 193 of the first shrink link member 140 is configured to receive the shrink crank member 190 so that the shrink crank member 190 is rotationally fixed relative to the first shrink link member 140. For example, the shrink crank member 190 may include mating polygonal surfaces 1901-1904 that couple with polygonal surfaces 1941-1944 of the crank member receiver 193. It is noted that although the mating surfaces are illustrated as having a square configuration, the mating surfaces may have any suitable configuration including triangular, hexagonal, octagonal, splined, etc. that transfers torque between the first shrink link member 140 and the shrink crank member 190. In one aspect, the shrink crank member 190 is coupled to the first shrink link member 140 with a cross-bolt 898 and a pin 899 (FIG. 13). In another aspect, the shrink crank member 190 and the first shrink link member 140 may be constructed as a single unitary member. At least part of the shrink crank member 190 extends through the outer cylinder 110. The driven member 180 is coupled to the shrink crank member 190 at a third crank pivot axis 2103 such that the driven member 180 and the shrink crank member 190 pivot relative to one another about the third crank pivot axis 2103 in directions R17, R18. The driven member 180 and the shrink crank member 190 pivoting relative to one another about the third crank pivot axis 2103 drives rotation of the first shrink link member 140 about the second axis of rotation 501. As noted above, rotation of the first shrink link member 140 about the second axis of rotation 501 effects extension and retraction of the shock strut assembly 120 relative to the outer cylinder 110 and along the longitudinal axis 115.

The sensor actuator arm 300 (FIG. 14) is coupled to the first shrink link member 140. The sensor actuator arm 300 is coupled to the first shrink link member 140 so as to rotate with the first shrink link member 140. The sensor 310 (FIG. 11) is coupled to the outer cylinder 110 and is configured to sense the sensor actuator arm 300 upon extension of the shock strut assembly 120. For example, the sensor actuator arm 300 includes a target 301 and the sensor 310 is a proximity sensor configured to sense the target 301. It is noted that the sensor actuator arm 300 may include any suitable sensor input and the sensor 310 may be any suitable sensor configured to sense the respective sensor input of the sensor actuator arm 300. The sensor 310 may be coupled to any suitable controller 1005 (FIG. 1) of the aircraft 1000, where the controller 1005 is configured to effect an indication to an operator or maintenance crew of the aircraft 1000 that the shrink mechanism 130A is at a predetermined position relative to, for example, the outer cylinder 110.

Referring now to FIGS. 15-19, the landing gear 100B is substantially similar to landing gear 100A unless otherwise noted. For example, the landing gear 100B includes the outer cylinder 110, the wheel assembly 119, the shock strut assembly 120, and a shrink mechanism 130B. The landing gear retract mechanism 200 is coupled to the landing gear 100B for extending/retracting the landing gear 100B and driving the shrink mechanism 130B.

The shrink mechanism 130B of landing gear 100B includes crank member 1560, drive member 1570, driven member 1580, and the first and second shrink link members 140, 150. Each component of the shrink mechanism 130B of the landing gear 100B functions in a manner substantially similar to that of the components of the shrink mechanism 130A of landing gear 100A. For example, the shrink mechanism 130B effects extension and retraction of the shock strut assembly 120 relative to the outer cylinder 110 and along the longitudinal axis 115 to increase or decrease length 1950 (FIG. 1B) of the landing gear 100B depending on a respective deployed configuration 800 or a retracted configuration 850 of the landing gear 100B. In one aspect, the length 1950 may be increased or decreased depending on the retracted configuration 850 or the deployed configuration 800 by moving the shock strut assembly 120, with the shrink mechanism 130B, by a distance 950. The distance 950 may be about 10 inches or in other aspects the distance may be more or less than about 10 inches.

In this aspect, the crank member 1560 is pivotally coupled to the outer cylinder 110 at the first end 111, relative to the trunnion axis of rotation 1002, of the outer cylinder 110 opposite the second end 112 of the outer cylinder 110. Here, the crank member 1560 is coupled to the outer cylinder 110 about first axis of rotation 705 as illustrated in FIGS. 15, 17A, and 17B. In this aspect, the first axis of rotation 705 and the second axis of rotation 501 cross one another (FIG. 16). It is noted that the crank member 1560 may be coupled to the outer cylinder 110 in any suitable manner that effects rotational motion of the crank member 1560 about the first axis of rotation 705. In this aspect, the driven member 1580 is pivotally coupled to the first shrink link member 140 adjacent the second end 142 so as to drive rotation of the first shrink link member 140 about the second axis of rotation 501 and effect extension or retraction of the shock strut assembly 120 relative to the outer cylinder 110 and along the longitudinal axis 115 in a manner similar to that of landing gear 100A. In one aspect, the landing gear 100B may further include the door 400 (FIGS. 20-22) and the door drive member 410 (FIGS. 20-22)

Referring now to FIGS. 20-22, the door 400 is pivotally coupled to the frame 1001 about a door pivot axis 401. In one aspect, the door drive member 410 couples the door 400 to the outer cylinder 110 so that rotation of the outer cylinder 110 about the trunnion axis of rotation 1002 effects pivoting of the door 400, about the door pivot axis 401, between opened (when the landing gear 100A, 100B is extended as in FIG. 20) and closed (when the landing gear 100A, 100B is retracted as in FIGS. 21 and 22) positions. In one aspect, the door drive member 410 is an articulated member that couples the door 400 to the walking beam 210 (FIGS. 20 and 21) so that rotation of the outer cylinder 110 about the trunnion axis of rotation 1002 and movement of the walking beam 210 effects pivoting of the door 400 about the door pivot axis 401 between the open and closed positions. In other aspects, the door drive member 410 may be a single rigid member or any other suitable member to effect pivoting of the door 400 between the open and closed positions.

Referring now to FIGS. 3A, 3B, 17A, 17B, and 23, an exemplary graph for the landing gear 100A, 100B is illustrated showing shrink length (e.g., distance 950) versus retract angle (e.g., the angle of the landing gear 100A, 100B relative to the frame 1001 of the aircraft 1000 as the landing gear 100A, 100B rotates about the trunnion axis of rotation 1002). As the landing gear 100A, 100B is retracted upon, e.g., takeoff, the bulkhead 123 position is tracked indicating the distance 950 the bulkhead 123 travels relative to the outer cylinder 110. As illustrated in FIG. 23, the distance 950 increases to about 10 inches (and the landing gear 100A, 100B shrinks a corresponding distance to shrink the length 1950) as the landing gear 100A, 100B retracts form a zero (0) degree angle (i.e., the landing gear 100A, 100B extended) to between about a sixty (60) degree angle and about an eighty (80) degree angle.

Referring now to FIGS. 2, 24A, 24B, 25A-25C, 26A-26C and 27, a method 2700 for operating, for example, landing gear 100A, 100B is illustrated. In one aspect, the landing gear 100A, 100B is situated in a deployed configuration 800 such as during ground operations, takeoff, and landing of the aircraft 1000. While the landing gear 100A is in a deployed configuration 800, the shrink mechanism 130A is in an extended position 801 as illustrated in, e.g., FIGS. 24A, 25A, and 26A.

In order to retract the landing gear 100A, 100B, for example, after takeoff the landing gear retract mechanism 200 is operated to rotate the landing gear 100A, 100B about the trunnion axis of rotation 1002 (FIG. 27, Block 2701), where the trunnion axis of rotation is defined by the outer cylinder 110 of the landing gear 100A, 100B. For example, the walking beam 210 is actuated by the actuator 201 to rotate the outer cylinder 110 about the trunnion axis of rotation 1002 and retract the landing gear 100A, 100B. The outer cylinder 110 is rotatably fixed to the frame 1001 of the aircraft 1000 about the trunnion axis of rotation 1002. Force F (FIGS. 25A and 26A) is applied, by the actuator 201, to the walking beam 210. Due to the outer cylinder 110 being rotatably fixed to the frame 1001 of the aircraft 1000, the outer cylinder 110 is forced to rotate about the trunnion axis of rotation 1002 in direction R1R (FIGS. 25A and 26A). As to the outer cylinder 110 rotates about the trunnion axis of rotation 1002 in direction R1R, the shock strut assembly 120 is moved relative to the outer cylinder 110 in direction D1 by the shrink mechanism 130A, 130B (FIG. 27, Block 2702). The drive member 170, 1570 of the shrink mechanism 130A, 130B being rotatably coupled to the walking beam 210, rotates relative to the crank member 160, 1560 about the first crank pivot axis 2101 in direction R7 which forces the crank member 160, 1560 to rotate about the first axis of rotation 500, 705 in direction R2 (FIG. 27, Block 2703). With respect to landing gear 100A, as the drive member 170 and the crank member 160 are rotated relative to one another, the driven member 180 is forced to pivot relative to the shrink crank member 190 about the third crank pivot axis 2103 in direction R17 which rotates the first shrink link member 140 and the shrink crank member 190 as a unit about the second axis of rotation 501 in direction R10 (FIG. 27, Block 2704). With respect to landing gear 100B, as the drive member 1570 and the crank member 1560 are rotated relative to one another, the driven member 1580 is forced to pivot relative to the first shrink link member 140 about the third crank pivot axis 2103A in direction R17 which rotates the first shrink link member 140 about the second axis of rotation 501 in direction R10 (FIG. 27, Block 2704).

As the first shrink link member 140 rotates about the second axis of rotation 501 in direction R10, the over-center position 900 is unlocked (i.e., the first shrink link member 140 folds relative to the second shrink link member 150) to effect moving of the inner cylinder 125 and the bulkhead 123 of the shock strut assembly 120 in direction D1 and shrinking of the landing gear 100A, 100B (FIG. 27, Block 2705). The first shrink link member 140 and second shrink link member 150 fold relative to each other and drive the shock strut assembly 120 along the longitudinal axis 115 from the second end 112 of the outer cylinder 110 to the first end 111 of the outer cylinder 110 (FIG. 27, Block 2706). As the landing gear 100A, 100B shrinks and is rotated into the retracted configuration 850 (shown in FIGS. 25C and 26C), the inner cylinder 125, transiting from the second end 112 to the first end 111 of the outer cylinder 110, carries the wheel assembly 119 towards the first end 111 of the outer cylinder 110 to shrink the length 1950 (FIG. 1B) of the landing gear 100A, 100B.

Referring now to FIGS. 2, 24A, 24B, 25A-25C, 26A-26C and 28, a method 2800 for extending landing gear 100A, 100B is illustrated. The landing gear 100A, 100B is situated in a retracted configuration 850 (FIGS. 25C and 26C) disposed within the frame 1001 of the aircraft 1000. While the landing gear 100A, 100B is in the retracted configuration 850, the shrink mechanism 130A, 130B is in a retracted position 851 as illustrated in, e.g., FIGS. 25C and 26C.

In order to extend the landing gear 100A, 100B, for example, before landing, a sequence opposite to that described above is initiated by, e.g., deploying the landing gear 100A, 100B under gravitational forces (FIG. 28, Block 2801). As the outer cylinder 110 rotates about the trunnion axis of rotation 1002 in direction R1E and travels to deployed configuration 800 under gravitational forces, the shrink mechanism 130A, 130B is extended (FIG. 28, Block 2802). For example, the drive member 170, 1570 of the shrink mechanism 130A, 130B being rotatably coupled to the walking beam 210 rotates relative to the crank member 160, 1560 about the first crank pivot axis 2101 in direction R6 which forces the crank member 160, 1560 to rotate about the first axis of rotation 500, 705 in direction R3 (FIG. 28, Block 2803). As the drive member 170, 1570 and the crank member 160, 1560 are rotated relative to one another, the driven member 180 is forced to pivot relative to the shrink crank member 190 about the third crank pivot axis 2103 in direction R18 which rotates the first shrink link member 140 and the shrink crank member 190 as a unit about the second axis of rotation 501 in direction R11 (or in the case of landing gear 100B the driven member 1580 pivots relative to the first shrink link member 140 in direction R18 so as to rotate the first shrink link member 140 about the second axis of rotation 501 in direction R11) (FIG. 28, Block 2804). As the first shrink link member 140 rotates in direction R11, the first shrink link member 140 and second shrink link member 150 unfold relative to each other and drive the shock strut assembly 120 along the longitudinal axis 115 from the first end 111 of the outer cylinder 110 to the second end 112 of the outer cylinder 110 (FIG. 28, Block 2805). The first shrink link member 140 and second shrink link member 150 unfold to an extended position and are locked in the over-center position 900 (FIG. 28, Block 2806). As the landing gear 100A, 100B deploys the preload in the shrink mechanism 130A, 130B increases so as to hold the first shrink link member 140 and the second shrink link member 150 in the over-center position 900.

Examples of the present disclosure may be described in the context of aircraft manufacturing and service method 2900 as shown in FIG. 29. In other aspects, the examples of the present disclosure may be applied in any suitable industry, such as, e.g., automotive, maritime and aerospace. With respect to aircraft manufacturing, during pre-production, illustrative method 2900 may include specification and design (FIG. 29, Block 2904) of aircraft 1000 and material procurement (FIG. 29, Block 2906). During production, component and subassembly manufacturing (FIG. 29, Block 2908) and system integration (FIG. 29, Block 2910) of aircraft 1000 may take place, which may include manufacturing and installation of the landing gear 100. Thereafter, aircraft 1000 may go through certification and delivery (FIG. 29, Block 2912) to be placed in service (FIG. 29, Block 2914). While in service, aircraft 1000 may be scheduled for routine maintenance and service (FIG. 29, Block 2916). Routine maintenance and service may include modification, reconfiguration, refurbishment, etc. of one or more systems of aircraft 1000, which may include installation of the landing gear 100 as described herein.

Each of the processes of illustrative method 2900 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

Apparatus(es) and method(s) shown or described herein may be employed during any one or more of the stages of the manufacturing and service method 2900. For example, components or subassemblies corresponding to component and subassembly manufacturing (FIG. 29, Block 2908) may be fabricated or manufactured in a manner similar to components or subassemblies produced while aircraft 1000 is in service (FIG. 29, Block 2914). Also, one or more examples of the apparatus(es), method(s), or combination thereof may be utilized during production of the aircraft 1000, for example, by substantially expediting assembly of or reducing the cost of aircraft 1000. Similarly, one or more examples of the apparatus or method realizations, or a combination thereof, may be utilized, for example and without limitation, while aircraft 1000 is in service (FIG. 29, Block 2914) and/or during maintenance and service (FIG. 29, Block 2916).

The following clauses (A1-D19) are provided in accordance with the aspects of the present disclosure:

A1. A landing gear comprising:
an outer cylinder rotatably coupled to a frame of an aircraft about a trunnion axis of rotation;
a shock strut assembly movably coupled to the outer cylinder so as to reciprocate along a longitudinal axis of the outer cylinder; and
a shrink mechanism including
a first shrink link member pivotally coupled to the outer cylinder,
a second shrink link member coupling the first shrink link member to the shock strut assembly,
a crank member pivotally coupled to the outer cylinder,
a drive member coupling the crank member to a walking beam (a.k.a. retract actuator beam) of a landing gear retract mechanism, and
a driven member coupling the crank member to the first shrink link member.

A2. The landing gear of clause A1, wherein:
the crank member pivots about a first axis of rotation; and
the first shrink link member pivots about a second axis of rotation that is spaced, along the longitudinal axis of the outer cylinder, from the first axis of rotation.

A3. The landing gear of clause A2, wherein the first axis of rotation and the second axis of rotation are substantially parallel with one another.

A4. The landing gear of clause A2, wherein the drive member and the driven member extend substantially along the longitudinal axis adjacent one another.

A5. The landing gear of clause A2, wherein the first axis of rotation and the second axis of rotation cross one another.

A6. The landing gear of clause A1, further comprising:
a shrink crank member coupled to the first shrink link so that the shrink crank member and the first shrink link rotate as a unit; and
wherein the driven member is coupled to the shrink crank member so as to drive rotation of the first shrink link and effect extension and retraction of the shock strut assembly relative to the outer cylinder and along the longitudinal axis.

A7. The landing gear of clause A6, wherein the first shrink link includes a first end rotatably coupled to the outer cylinder and a second end rotatably coupled to the second shrink link, the shrink crank member being disposed adjacent the first end of the first shrink link.

A8. The landing gear of clause A6, wherein the first shrink link includes a crank member receiver configured to receive the shrink crank member so that the shrink crank member is rotationally fixed relative to the first shrink link.

A9. The landing gear of clause A8, wherein the crank member receiver includes polygonal surfaces and the shrink crank member includes mating polygonal surfaces that couple with the polygonal surfaces of the crank member receiver.

A10. The landing gear of clause A6, wherein at least part of the shrink crank member extends through the outer cylinder.

A11. The landing gear of clause A1, further comprising:
a sensor actuator arm coupled to the first shrink link so as to rotate with the first shrink link; and
a sensor coupled to the outer cylinder;
wherein the sensor is configured to sense the sensor actuator arm upon extension of the shock strut assembly.

A12. The landing gear of clause A11, wherein the sensor actuator arm includes a target and the sensor is a proximity sensor configured to sense the target.

A13. The landing gear of clause A1, wherein the outer cylinder includes a shrink link cavity and the first shrink link member and the second shrink link member are disposed within the shrink link cavity and are enclosed by the outer cylinder.

A14. The landing gear of clause A13, wherein the outer cylinder includes a cover configured to enclose the first shrink link member and the second shrink link member within the shrink link cavity.

A15. The landing gear of clause A13, wherein the shrink link cavity includes a fluid drainage aperture.

A16. The landing gear of clause A1, wherein:
the first shrink link includes a first end rotatably coupled to the outer cylinder and a second end rotatably coupled to the second shrink link; and
the driven member is pivotally coupled to the first shrink link adjacent the second end so as to drive rotation of the first shrink link and effect extension or retraction of the shock strut assembly relative to the outer cylinder and along the longitudinal axis.

A17. The landing gear of clause A1, wherein the driven member is coupled to the first shrink link so as to effect, under impetus of the drive member, folding and unfolding of the second shrink link relative to the first shrink link.

A18. The landing gear of clause A1, wherein one or more of the drive member and the driven member has an adjustable length.

A19. The landing gear of clause A1, wherein the outer cylinder includes a first end having the trunnion axis of rotation and a second end longitudinally spaced from the first end, the crank member being pivotally coupled to the outer cylinder between the first end and the second end.

A20. The landing gear of clause A1, wherein the outer cylinder includes a first end having the trunnion axis of rotation and a second end longitudinally spaced from the first end, the crank member being pivotally coupled to the outer cylinder at the first end opposite, relative to the trunnion axis of rotation, the second end.

A21. The landing gear of clause A1, wherein the outer cylinder includes a shrink link cavity and the first shrink link member and the second shrink link member are disposed within the shrink link cavity.

A22. The landing gear of clause A21, wherein the shrink link cavity includes a fluid drainage aperture.

A23. The landing gear of clause A1, wherein the first shrink link member and the second shrink link member are rotatably coupled to each other so as to fold and unfold relative to each other and lock in an over-center position when unfolded.

A24. The landing gear of clause A23, wherein the outer cylinder includes an over-center stop surface configured to couple with one or more of the first shrink link member and the second shrink link member to effect over-center locking of the first shrink link member and the second shrink link member.

A25. The landing gear of clause A1, further comprising:
a door pivotally coupled to the frame about a door pivot axis; and
a door drive member coupling the door to the outer cylinder so that rotation of the outer cylinder about the trunnion axis of rotation effects pivoting of the door about the door pivot axis.

A26. The landing gear of clause A1, further comprising:
a door pivotally coupled to the frame about a door pivot axis; and
a door drive member coupling the door to the walking beam so that rotation of the outer cylinder about the trunnion axis of rotation effects pivoting of the door about the door pivot axis.

A27. The landing gear of clause A1, wherein the outer cylinder includes an inner cavity and the shock strut assembly comprises:
a bulk head movably coupled to the inner cavity so as to form a first seal with the inner cavity, the bulk head being coupled to the shrink mechanism; and
an inner cylinder movably coupled to both the inner cavity and the bulk head so as to form a second seal with the inner cavity and so that the inner cylinder is movable with the bulk head relative to the outer cylinder;
wherein the shrink mechanism effects relative movement of both the bulk head and the inner cylinder so as to one of both increase or decrease a length of the landing gear depending on a respective deployed or retracted configuration of the landing gear.

B1. A shrink mechanism for use with a landing gear of an aircraft, the landing gear including an outer cylinder rotatably coupled to a frame of an aircraft about a trunnion axis of rotation and a shock strut assembly movably coupled to the outer cylinder so as to reciprocate along a longitudinal axis of the outer cylinder, the shrink mechanism comprising:
a first shrink link member pivotally coupled to the outer cylinder,
a second shrink link member coupling the first shrink link member to the shock strut assembly,
a crank member pivotally coupled to the outer cylinder,
a drive member coupling the crank member to a walking beam (a.k.a. retract actuator beam) of a landing gear retract mechanism, and
a driven member coupling the crank member to the first shrink link member.

B2. The shrink mechanism of clause B1, wherein:
the crank member pivots about a first axis of rotation; and
the first shrink link member pivots about a second axis of rotation that is spaced, along the longitudinal axis of the outer cylinder, from the first axis of rotation.

B3. The shrink mechanism of clause B2, wherein the first axis of rotation and the second axis of rotation are substantially parallel with one another.

B4. The shrink mechanism of clause B2, wherein the drive member and the driven member extend substantially along the longitudinal axis adjacent one another.

B5. The shrink mechanism of clause B2, wherein the first axis of rotation and the second axis of rotation cross one another.

B6. The shrink mechanism of clause B1, further comprising:
a shrink crank member coupled to the first shrink link so that the shrink crank member and the first shrink link rotate as a unit; and
wherein the driven member is coupled to the shrink crank member so as to drive rotation of the first shrink link and effect extension and retraction of the shock strut assembly relative to the outer cylinder and along the longitudinal axis.

B7. The shrink mechanism of clause B6, wherein the first shrink link includes a first end rotatably coupled to the outer cylinder and a second end rotatably coupled to the second shrink link, the shrink crank member being disposed adjacent the first end of the first shrink link.

B8. The shrink mechanism of clause B6, wherein the first shrink link includes a crank member receiver configured to receive the shrink crank member so that the shrink crank member is rotationally fixed relative to the first shrink link.

B9. The shrink mechanism of clause B8, wherein the crank member receiver includes polygonal surfaces and the shrink crank member includes mating polygonal surfaces that couple with the polygonal surfaces of the crank member receiver.

B10. The shrink mechanism of clause B6, wherein at least part of the shrink crank member extends through the outer cylinder.

B11. The shrink mechanism of clause B1, further comprising:
a sensor actuator arm coupled to the first shrink link so as to rotate with the first shrink link; and
a sensor coupled to the outer cylinder;
wherein the sensor is configured to sense the sensor actuator arm upon extension of the shock strut assembly.

B12. The shrink mechanism of clause B11, wherein the sensor actuator arm includes a target and the sensor is a proximity sensor configured to sense the target.

B13. The shrink mechanism of clause B1, wherein the outer cylinder includes a shrink link cavity and the first shrink link member and the second shrink link member are disposed within the shrink link cavity and are enclosed by the outer cylinder.

B14. The shrink mechanism of clause B1, wherein:
the first shrink link includes a first end rotatably coupled to the outer cylinder and a second end rotatably coupled to the second shrink link; and
the driven member is pivotally coupled to the first shrink link adjacent the second end so as to drive rotation of the first shrink link and effect extension or retraction of the shock strut assembly relative to the outer cylinder and along the longitudinal axis.

B15. The shrink mechanism of clause B1, wherein the driven member is coupled to the first shrink link so as to effect, under impetus of the drive member, folding and unfolding of the second shrink link relative to the first shrink link.

B16. The shrink mechanism of clause B1, wherein one or more of the drive member and the driven member has an adjustable length.

B17. The shrink mechanism of clause B1, wherein the outer cylinder includes a first end having the trunnion axis of rotation and a second end longitudinally spaced from the first end, the crank member being pivotally coupled to the outer cylinder between the first end and the second end.

B18. The shrink mechanism of clause B1, wherein the outer cylinder includes a first end having the trunnion axis of rotation and a second end longitudinally spaced from the first end, the crank member being pivotally coupled to the outer cylinder at the first end opposite, relative to the trunnion axis of rotation, the second end.

B19. The shrink mechanism of clause B1, wherein the outer cylinder includes a shrink link cavity and the first shrink link member and the second shrink link member are disposed within the shrink link cavity.

B20. The shrink mechanism of clause B1, wherein the first shrink link member and the second shrink link member are rotatably coupled to each other so as to fold and unfold relative to each other and lock in an over-center position when unfolded.

B21. The shrink mechanism of clause B20, wherein the outer cylinder includes an over-center stop surface configured to couple with one or more of the first shrink link member and the second shrink link member to effect over-center locking of the first shrink link member and the second shrink link member.

C1. An aircraft comprising:
a frame; and
a landing gear coupled to the frame, the landing gear including
an outer cylinder rotatably coupled to a frame of an aircraft about a trunnion axis of rotation;
a shock strut assembly movably coupled to the outer cylinder so as to reciprocate along a longitudinal axis of the outer cylinder; and
a shrink mechanism including
a first shrink link member pivotally coupled to the outer cylinder,
a second shrink link member coupling the first shrink link member to the shock strut assembly,
a crank member pivotally coupled to the outer cylinder,
a drive member coupling the crank member to a walking beam (a.k.a. retract actuator beam) of a landing gear retract mechanism, and
a driven member coupling the crank member to the first shrink link member.

C2. The aircraft of clause C1, wherein:
the crank member pivots about a first axis of rotation; and
the first shrink link member pivots about a second axis of rotation that is spaced, along the longitudinal axis of the outer cylinder, from the first axis of rotation.

C3. The aircraft of clause C2, wherein the first axis of rotation and the second axis of rotation are substantially parallel with one another.

C4. The aircraft of clause C2, wherein the drive member and the driven member extend substantially along the longitudinal axis adjacent one another.

C5. The aircraft of clause C2, wherein the first axis of rotation and the second axis of rotation cross one another.

C6. The aircraft of clause C1, further comprising:
a shrink crank member coupled to the first shrink link so that the shrink crank member and the first shrink link rotate as a unit; and
wherein the driven member is coupled to the shrink crank member so as to drive rotation of the first shrink link and effect extension and retraction of the shock strut assembly relative to the outer cylinder and along the longitudinal axis.

C7. The aircraft of clause C6, wherein the first shrink link includes a first end rotatably coupled to the outer cylinder and a second end rotatably coupled to the second shrink link, the shrink crank member being disposed adjacent the first end of the first shrink link.

C8. The aircraft of clause C6, wherein the first shrink link includes a crank member receiver configured to receive the shrink crank member so that the shrink crank member is rotationally fixed relative to the first shrink link.

C9. The aircraft of clause C8, wherein the crank member receiver includes polygonal surfaces and the shrink crank member includes mating polygonal surfaces that couple with the polygonal surfaces of the crank member receiver.

C10. The aircraft of clause C6, wherein at least part of the shrink crank member extends through the outer cylinder.

C11. The aircraft of clause C1, further comprising:
a sensor actuator arm coupled to the first shrink link so as to rotate with the first shrink link; and
a sensor coupled to the outer cylinder;
wherein the sensor is configured to sense the sensor actuator arm upon extension of the shock strut assembly.

C12. The aircraft of clause C11, wherein the sensor actuator arm includes a target and the sensor is a proximity sensor configured to sense the target.

C13. The aircraft of clause C1, wherein the outer cylinder includes a shrink link cavity and the first shrink link member and the second shrink link member are disposed within the shrink link cavity and are enclosed by the outer cylinder.

C14. The aircraft of clause C13, wherein the outer cylinder includes a cover configured to enclose the first shrink link member and the second shrink link member within the shrink link cavity.

C15. The aircraft of clause C13, wherein the shrink link cavity includes a fluid drainage aperture.

C16. The aircraft of clause C1, wherein:
the first shrink link includes a first end rotatably coupled to the outer cylinder and a second end rotatably coupled to the second shrink link; and
the driven member is pivotally coupled to the first shrink link adjacent the second end so as to drive rotation of the first shrink link and effect extension or retraction of the shock strut assembly relative to the outer cylinder and along the longitudinal axis.

C17. The aircraft of clause C1, wherein the driven member is coupled to the first shrink link so as to effect, under impetus of the drive member, folding and unfolding of the second shrink link relative to the first shrink link.

C18. The aircraft of clause C1, wherein one or more of the drive member and the driven member has an adjustable length.

C19. The aircraft of clause C1, wherein the outer cylinder includes a first end having the trunnion axis of rotation and a second end longitudinally spaced from the first end, the crank member being pivotally coupled to the outer cylinder between the first end and the second end.

C20. The aircraft of clause C1, wherein the outer cylinder includes a first end having the trunnion axis of rotation and a second end longitudinally spaced from the first end, the crank member being pivotally coupled to the outer cylinder at the first end opposite, relative to the trunnion axis of rotation, the second end.

C21. The aircraft of clause C1, wherein the outer cylinder includes a shrink link cavity and the first shrink link member and the second shrink link member are disposed within the shrink link cavity.

C22. The aircraft of clause C21, wherein the shrink link cavity includes a fluid drainage aperture.

C23. The aircraft of clause C1, wherein the first shrink link member and the second shrink link member are rotatably coupled to each other so as to fold and unfold relative to each other and lock in an over-center position when unfolded.

C24. The aircraft of clause C23, wherein the outer cylinder includes an over-center stop surface configured to couple with one or more of the first shrink link member and the second shrink link member to effect over-center locking of the first shrink link member and the second shrink link member.

C25. The aircraft of clause C1, further comprising:
a door pivotally coupled to the frame about a door pivot axis; and
a door drive member coupling the door to the outer cylinder so that rotation of the outer cylinder about the trunnion axis of rotation effects pivoting of the door about the door pivot axis.

C26. The aircraft of clause C1, further comprising:
a door pivotally coupled to the frame about a door pivot axis; and
a door drive member coupling the door to the walking beam so that rotation of the outer cylinder about the trunnion axis of rotation effects pivoting of the door about the door pivot axis.

C27. The aircraft of clause C1, wherein the outer cylinder includes an inner cavity and the shock strut assembly comprises:
a bulk head movably coupled to the inner cavity so as to form a first seal with the inner cavity, the bulk head being coupled to the shrink mechanism; and
an inner cylinder movably coupled to both the inner cavity and the bulk head so as to form a second seal with the inner cavity and so that the inner cylinder is movable with the bulk head relative to the outer cylinder;
wherein the shrink mechanism effects relative movement of both the bulk head and the inner cylinder so as to one of both increase or decrease a length of the landing gear depending on a respective deployed or retracted configuration of the landing gear.

D1. A method of operating a landing gear of an aircraft, the method comprising:
rotating the landing gear about a trunnion axis of rotation, where the trunnion axis of rotation is defined by an outer cylinder of the landing gear; and
moving a shock strut assembly relative to the outer cylinder with a shrink mechanism, where the outer cylinder at least partially surrounds the shock strut assembly and the shrink mechanism includes:
a first shrink link member pivotally coupled to the outer cylinder,
a second shrink link member coupling the first shrink link member to the shock strut assembly,
a crank member pivotally coupled to the outer cylinder,
a drive member coupling the crank member to a walking beam (a.k.a. retract actuator beam) of a landing gear retract mechanism, and
a driven member coupling the crank member to the first shrink link member.

D2. The method of clause D1, further comprising:
pivoting the crank member about a first axis of rotation; and
pivoting the first shrink link member about a second axis of rotation that is spaced from the first axis of rotation along a longitudinal axis of the outer cylinder;
wherein the first axis of rotation and the second axis of rotation are substantially parallel with one another.

D3. The method of clause D1, further comprising:
pivoting the crank member about a first axis of rotation; and
pivoting the first shrink link member about a second axis of rotation that is spaced from the first axis of rotation along a longitudinal axis of the outer cylinder;
wherein the drive member and the driven member extend substantially along the longitudinal axis adjacent one another.

D4. The method of clause D1, further comprising:
pivoting the crank member about a first axis of rotation; and
pivoting the first shrink link member about a second axis of rotation that is spaced from the first axis of rotation along a longitudinal axis of the outer cylinder;
wherein the first axis of rotation and the second axis of rotation cross one another.

D5. The method of clause D1, further comprising:
coupling a shrink crank member coupled to the first shrink link so that the shrink crank member and the first shrink link rotate as a unit; and
driving rotation of the first shrink link, with the driven member coupled to the shrink crank member, and effecting extension and retraction of the shock strut assembly relative to the outer cylinder and along a longitudinal axis of the outer cylinder.

D6. The method of clause D5, further comprising:
rotatably coupling a first end of the first shrink link rotatably to the outer cylinder; and
rotatably coupling a second end of the first shrink link to the second shrink link;
wherein the shrink crank member is disposed adjacent the first end of the first shrink link.

D7. The method of clause D5, wherein the first shrink link includes a crank member receiver configured to receive the shrink crank member so that the shrink crank member is rotationally fixed relative to the first shrink link.

D8. The method of clause D1, further comprising:
sensing, with a sensor, a sensor actuator arm upon extension of the shock strut assembly wherein the sensor actuator arm is coupled to the first shrink link so as to rotate with the first shrink link and the sensor coupled to the outer cylinder.

D9. The method of clause D8, further comprising sensing a target of the sensor actuator arm with the sensor, where the sensor comprises a proximity sensor.

D10. The method of clause D1, wherein:
rotatably coupling a first end of the first shrink link to the outer cylinder; and
rotatably coupling a second end of the first shrink link to the second shrink link; and
driving rotation of the first shrink link, with the driven member that is pivotally coupled to the first shrink link adjacent the second end, and effecting extension or retraction of the shock strut assembly relative to the outer cylinder and along a longitudinal axis of the outer cylinder.

D11. The method of clause D1, further comprising folding and unfolding of the second shrink link relative to the first shrink link with the driven member, that is coupled to the first shrink link, under impetus of the drive member.

D12. The method of clause D1, further comprising adjusting a length of one or more of the drive member and the driven member.

D13. The method of clause D1, further comprising pivotally coupling the crank member to the outer cylinder between a first end of the outer cylinder and a second end of the outer cylinder.

D14. The method of clause D1, further comprising pivotally coupling the crank member to the outer cylinder at a first end of the outer cylinder opposite, relative to a trunnion axis of rotation, a second end of the outer cylinder, wherein the first end has the trunnion axis of rotation and the second end is longitudinally spaced from the first end.

D15. The method of clause D1, further comprising locking the first shrink link member and the second shrink link member in an over-center position when unfolded, wherein the first shrink link member and the second shrink link member are rotatably coupled to each other so as to fold and unfold relative to each other.

D16. The method of clause D15, stopping relative movement between the first shrink link and the second shrink link with an over-center stop surface of the outer cylinder to effect over-center locking of the first shrink link member and the second shrink link member.

D17. The method of clause D1, further comprising:
pivotally coupling a door to a frame of the aircraft about a door pivot axis; and
pivoting the door about the door pivot axis with a door drive member coupling the door to the outer cylinder, where rotation of the outer cylinder about the trunnion axis of rotation effects pivoting of the door about the door pivot axis.

D18. The method of clause D1, further comprising:
pivotally coupling a door to a frame of the aircraft about a door pivot axis; and
pivoting the door about the door pivot axis with a door drive member coupling the door to the walking beam, where rotation of the outer cylinder about the trunnion axis of rotation effects pivoting of the door about the door pivot axis.

D19. The method of clause D1, wherein the outer cylinder includes an inner cavity and the method further comprises:
moving, with the shrink mechanism, both a bulk head of the shock strut assembly and an inner cylinder of the shock strut assembly so as to increase or decrease a length of the landing gear depending on a respective deployed or retracted configuration of the landing gear; and
wherein:
the bulk head is movably coupled to the inner cavity so as to form a first seal with the inner cavity, the bulk head being coupled to the shrink mechanism; and
the inner cylinder is movably coupled to both the inner cavity and the bulk head so as to form a second seal with the inner cavity and so that the inner cylinder is movable with the bulk head relative to the outer cylinder.

In the figures, referred to above, solid lines, if any, connecting various elements and/or components may represent mechanical, electrical, fluid, optical, electromagnetic, wireless and other couplings and/or combinations thereof. As used herein, "coupled" means associated directly as well as indirectly. For example, a member A may be directly associated with a member B, or may be indirectly associated therewith, e.g., via another member C. It will be understood that not all relationships among the various disclosed elements are necessarily represented. Accordingly, couplings other than those depicted in the drawings may also exist. Dashed lines, if any, connecting blocks designating the various elements and/or components represent couplings similar in function and purpose to those represented by solid lines; however, couplings represented by the dashed lines may either be selectively provided or may relate to alternative examples of the present disclosure. Likewise, elements and/or components, if any, represented with dashed lines, indicate alternative examples of the present disclosure. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in the figures, may be combined in various ways without the need to include other features described in the figures, other drawing figures, and/or the accompanying disclosure, even though such combination or combinations are not explicitly illustrated herein. Similarly, additional features not limited to the examples presented, may be combined with some or all of the features shown and described herein.

In FIGS. 27-29, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 27-29 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

In the foregoing description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the scope of the present disclosure.

Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims, if any, are presented for illustrative purposes only and are not intended to limit the scope of the claimed subject matter to the specific examples provided in the present disclosure.

What is claimed is:

1. A shrink mechanism for use with a landing gear of an aircraft, the landing gear including an outer cylinder rotatably coupled to a frame of the aircraft about a trunnion axis of rotation and a shock strut assembly movably coupled to the outer cylinder so as to reciprocate along a longitudinal axis of the outer cylinder, the shrink mechanism comprising:
    a first shrink link member pivotally coupled to the outer cylinder;
    a second shrink link member coupling the first shrink link member to the shock strut assembly;
    a crank member pivotally coupled to the outer cylinder;
    a drive member coupling the crank member to a walking beam of a landing gear retract mechanism; and
    a driven member coupling the crank member to the first shrink link member.

2. The shrink mechanism of claim 1, wherein:
    the crank member pivots about a first axis of rotation; and
    the first shrink link member pivots about a second axis of rotation that is spaced, along the longitudinal axis of the outer cylinder, from the first axis of rotation.

3. The shrink mechanism of claim 2, wherein the first axis of rotation and the second axis of rotation are:
    substantially parallel with one another; or
    cross one another.

4. The shrink mechanism of claim 2, wherein the drive member and the driven member extend substantially along the longitudinal axis adjacent one another.

5. The shrink mechanism of claim 1, further comprising:
    a shrink crank member coupled to the first shrink link member so that the shrink crank member and the first shrink link member rotate as a unit; and
    wherein the driven member is coupled to the shrink crank member so as to drive rotation of the first shrink link member and effect extension and retraction of the shock strut assembly relative to the outer cylinder and along the longitudinal axis.

6. The shrink mechanism of claim 5, wherein the first shrink link member includes a first end rotatably coupled to the outer cylinder and a second end rotatably coupled to the second shrink link member, the shrink crank member being disposed adjacent the first end of the first shrink link member.

7. The shrink mechanism of claim 5, wherein the first shrink link member includes a crank member receiver configured to receive the shrink crank member so that the shrink crank member is rotationally fixed relative to the first shrink link member.

8. The shrink mechanism of claim 1, wherein:
    the first shrink link member includes a first end rotatably coupled to the outer cylinder and a second end rotatably coupled to the second shrink link member; and
    the driven member is pivotally coupled to the first shrink link member adjacent the second end so as to drive rotation of the first shrink link member and effect extension or retraction of the shock strut assembly relative to the outer cylinder and along the longitudinal axis.

9. The shrink mechanism of claim 1, wherein the first shrink link member and the second shrink link member are rotatably coupled to each other so as to fold and unfold relative to each other and lock in an over-center position when unfolded.

10. A shrink mechanism for use with a landing gear of an aircraft, the landing gear including an outer cylinder rotatably coupled to a frame of the aircraft about a trunnion axis of rotation and a shock strut assembly movably coupled to the outer cylinder so as to reciprocate along a longitudinal axis of the outer cylinder, the shrink mechanism comprising:
    a first shrink link member pivotally coupled to the outer cylinder;
    a second shrink link member coupling the first shrink link member to the shock strut assembly;
    a crank member pivotally coupled to the outer cylinder;
    a drive member coupling the crank member to a walking beam of a landing gear retract mechanism;
    a driven member coupling the crank member to the first shrink link member;
    a sensor actuator arm coupled to the first shrink link member so as to rotate with the first shrink link member; and
    a sensor coupled to the outer cylinder;
    wherein the sensor is configured to sense the sensor actuator arm upon extension of the shock strut assembly.

11. The shrink mechanism of claim 10, wherein the sensor actuator arm includes a target and the sensor is a proximity sensor configured to sense the target.

12. The shrink mechanism of claim 10, wherein the outer cylinder includes a shrink link cavity and the first shrink link member and the second shrink link member are disposed within the shrink link cavity and are enclosed by the outer cylinder.

13. The shrink mechanism of claim 10, wherein:
the first shrink link member includes a first end rotatably coupled to the outer cylinder and a second end rotatably coupled to the second shrink link member; and
the driven member is pivotally coupled to the first shrink link member adjacent the second end so as to drive rotation of the first shrink link member and effect extension or retraction of the shock strut assembly relative to the outer cylinder and along the longitudinal axis.

14. The shrink mechanism of claim 10, wherein the driven member is coupled to the first shrink link member so as to effect, under impetus of the drive member, folding and unfolding of the second shrink link member relative to the first shrink link member.

15. The shrink mechanism of claim 10, wherein one or more of the drive member and the driven member has an adjustable length.

16. The shrink mechanism of claim 10, wherein the outer cylinder includes a first end having the trunnion axis of rotation and a second end longitudinally spaced from the first end, the crank member being pivotally coupled to the outer cylinder between the first end and the second end.

17. The shrink mechanism of claim 10, wherein the outer cylinder includes a first end having the trunnion axis of rotation and a second end longitudinally spaced from the first end, the crank member being pivotally coupled to the outer cylinder at the first end opposite, relative to the trunnion axis of rotation, the second end.

18. The shrink mechanism of claim 10, wherein the outer cylinder includes a shrink link cavity and the first shrink link member and the second shrink link member are disposed within the shrink link cavity.

19. A shrink mechanism for use with a landing gear of an aircraft, the landing gear including an outer cylinder rotatably coupled to a frame of the aircraft about a trunnion axis of rotation and a shock strut assembly movably coupled to the outer cylinder so as to reciprocate along a longitudinal axis of the outer cylinder, the shrink mechanism comprising:
a first shrink link member pivotally coupled to the outer cylinder;
a second shrink link member coupling the first shrink link member to the shock strut assembly;
a crank member pivotally coupled to the outer cylinder;
a drive member coupling the crank member to a walking beam of a landing gear retract mechanism; and
a driven member coupling the crank member to the first shrink link member;
wherein the first shrink link member and the second shrink link member are rotatably coupled to each other so as to fold and unfold relative to each other and lock in an over-center position when unfolded.

20. The shrink mechanism of claim 19, wherein the outer cylinder includes an over-center stop surface configured to couple with one or more of the first shrink link member and the second shrink link member to effect over-center locking of the first shrink link member and the second shrink link member.

* * * * *